(12) United States Patent
Miller et al.

(10) Patent No.: US 11,247,885 B2
(45) Date of Patent: Feb. 15, 2022

(54) LIFT DEVICE WITH DEPLOYABLE OPERATOR STATION

(71) Applicant: Oshkosh Corporation, Oshkosh, WI (US)

(72) Inventors: Wenton S. Miller, Oshkosh, WI (US); Matthew Gilbride, Oshkosh, WI (US); Shane Mastronardi, Oshkosh, WI (US); Eko Prasetiawan, Oshkosh, WI (US); Ignacy Puszkiewicz, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/193,722

(22) Filed: Mar. 5, 2021

(65) Prior Publication Data
US 2021/0276848 A1     Sep. 9, 2021

Related U.S. Application Data

(60) Provisional application No. 62/985,955, filed on Mar. 6, 2020, provisional application No. 62/985,956, filed
(Continued)

(51) Int. Cl.
*B66F 11/04*     (2006.01)
*B66F 9/12*      (2006.01)
(Continued)

(52) U.S. Cl.
CPC ............... *B66F 9/12* (2013.01); *B25J 5/007* (2013.01); *B25J 9/1689* (2013.01); *B25J 11/005* (2013.01);
(Continued)

(58) Field of Classification Search
CPC ..... B66F 17/006; B66F 11/046; B66F 9/0759
See application file for complete search history.

(56) References Cited

U.S. PATENT DOCUMENTS

| | | |
|---|---|---|
| 3,676,211 A | 7/1972 | Kourtesis et al. |
| 3,757,895 A | 9/1973 | Knutson |
| | (Continued) | |

FOREIGN PATENT DOCUMENTS

| | | |
|---|---|---|
| CN | 106737548 A | 5/2017 |
| CN | 109434826 A | 3/2019 |
| | (Continued) | |

OTHER PUBLICATIONS

International Search Report and Written Opinion regarding PCT PCT/US2021/021241, dated May 4, 2021, 15 pps.
(Continued)

*Primary Examiner* — Alvin C Chin-Shue
(74) *Attorney, Agent, or Firm* — Foley & Lardner LLP

(57) ABSTRACT

A lift device includes a lift apparatus and a base assembly. The lift apparatus is configured to raise and lower an implement assembly. The base assembly is configured to support the lift apparatus. The base assembly includes a deployable operator station transitionable between a deployed position and a stowed position. In the deployed position, the deployable operator station is configured to provide a seating and control arrangement for an operator. In the stowed position, the deployable operator station is substantially sealed from an external environment to limit access to the deployable operator station.

6 Claims, 55 Drawing Sheets

Related U.S. Application Data on Mar. 6, 2020, provisional application No. 62/986,465, filed on Mar. 6, 2020, provisional application No. 62/986,357, filed on Mar. 6, 2020.

(51) Int. Cl.

| | |
|---|---|
| *B25J 5/00* | (2006.01) |
| *B25J 9/16* | (2006.01) |
| *B25J 11/00* | (2006.01) |
| *B60L 53/16* | (2019.01) |
| *B60L 1/00* | (2006.01) |
| *B66F 9/24* | (2006.01) |
| *B66F 17/00* | (2006.01) |
| *B66F 9/065* | (2006.01) |
| *B66F 9/075* | (2006.01) |

(52) U.S. Cl.
CPC ............... *B60L 1/003* (2013.01); *B60L 53/16* (2019.02); *B66F 9/24* (2013.01); *B66F 17/006* (2013.01); *B60L 2200/40* (2013.01); *B66F 9/0655* (2013.01); *B66F 9/0759* (2013.01); *B66F 9/07581* (2013.01); *B66F 11/046* (2013.01)

(56) References Cited

U.S. PATENT DOCUMENTS

| | | | |
|---|---|---|---|
| 3,787,086 A * | 1/1974 | Cosby | B66F 9/07545 |
| | | | 296/65.07 |
| 4,040,501 A * | 8/1977 | Haswell | B62D 25/10 |
| | | | 180/89.18 |
| 4,770,263 A * | 9/1988 | Yoshioka | B60N 2/38 |
| | | | 180/69.24 |
| 4,785,900 A * | 11/1988 | Nasky | B60N 2/38 |
| | | | 180/69.21 |
| 5,071,576 A | 12/1991 | Vernet et al. | |
| 5,411,450 A | 5/1995 | Gratton et al. | |
| 5,618,156 A | 4/1997 | Brown | |
| 5,919,027 A | 7/1999 | Christenson | |
| 5,934,858 A | 8/1999 | Christenson | |
| 5,934,867 A | 8/1999 | Christenson | |
| 5,938,394 A | 8/1999 | Christenson | |
| 5,951,235 A | 9/1999 | Young et al. | |
| 5,967,731 A | 10/1999 | Brandt | |
| 5,984,609 A | 11/1999 | Bartlett | |
| 6,012,544 A | 1/2000 | Backer et al. | |
| 6,033,176 A | 3/2000 | Bartlett | |
| 6,062,803 A | 5/2000 | Christenson | |
| 6,089,813 A | 7/2000 | McNeilus et al. | |
| 6,120,235 A | 9/2000 | Humphries et al. | |
| 6,123,500 A | 9/2000 | McNeilus et al. | |
| 6,189,964 B1 | 2/2001 | Henshaw et al. | |
| 6,210,094 B1 | 4/2001 | McNeilus et al. | |
| 6,213,706 B1 | 4/2001 | Christenson | |
| 6,224,318 B1 | 5/2001 | McNeilus et al. | |
| 6,315,515 B1 | 11/2001 | Young et al. | |
| 6,336,783 B1 | 1/2002 | Young et al. | |
| 6,350,098 B1 | 2/2002 | Christenson et al. | |
| 6,447,239 B2 | 9/2002 | Young et al. | |
| 6,474,928 B1 | 11/2002 | Christenson | |
| 6,565,305 B2 | 5/2003 | Schrafel | |
| 6,622,397 B1 | 9/2003 | Knoble | |
| 6,882,917 B2 | 4/2005 | Pillar et al. | |
| 7,070,382 B2 | 7/2006 | Pruteanu et al. | |
| 7,284,943 B2 | 10/2007 | Pruteanu et al. | |
| 7,392,122 B2 | 6/2008 | Pillar et al. | |
| 7,556,468 B2 | 7/2009 | Grata | |
| 7,559,735 B2 | 7/2009 | Pruteanu et al. | |
| 7,592,544 B2 | 9/2009 | Carscallen et al. | |
| 7,756,621 B2 | 7/2010 | Pillar et al. | |
| 7,871,117 B2 * | 1/2011 | Berger | B60R 7/043 |
| | | | 296/65.05 |
| 7,878,750 B2 | 2/2011 | Zhou et al. | |
| 8,162,194 B2 | 4/2012 | Gleason | |
| 8,182,194 B2 | 5/2012 | Pruteanu et al. | |
| 8,203,310 B2 | 6/2012 | McCabe | |
| 8,215,892 B2 | 7/2012 | Calliari | |
| 8,360,706 B2 | 1/2013 | Addleman et al. | |
| 8,540,475 B2 | 9/2013 | Kuriakose et al. | |
| 8,689,943 B2 | 4/2014 | McCabe | |
| 8,807,613 B2 | 8/2014 | Howell et al. | |
| 8,869,944 B2 | 10/2014 | McCabe et al. | |
| 9,008,913 B1 | 4/2015 | Sears et al. | |
| 9,216,856 B2 | 12/2015 | Howell et al. | |
| 9,315,210 B2 | 4/2016 | Sears et al. | |
| 9,387,985 B2 | 7/2016 | Gillmore et al. | |
| 9,776,846 B2 | 10/2017 | Ditty | |
| 9,791,071 B2 | 10/2017 | Ditty et al. | |
| 9,880,581 B2 | 1/2018 | Kuriakose et al. | |
| 9,890,024 B2 | 2/2018 | Hao et al. | |
| 9,981,803 B2 | 5/2018 | Davis et al. | |
| 10,174,868 B2 | 1/2019 | Ditty et al. | |
| 10,196,205 B2 | 2/2019 | Betz et al. | |
| 10,221,055 B2 | 3/2019 | Hao et al. | |
| 10,336,596 B2 | 7/2019 | Puszkiewicz et al. | |
| 10,357,995 B2 | 7/2019 | Palmer et al. | |
| 10,407,288 B2 | 9/2019 | Hao et al. | |
| 10,457,533 B2 | 10/2019 | Puszkiewicz et al. | |
| 10,472,889 B1 | 11/2019 | Betz | |
| 10,479,664 B2 | 11/2019 | Linsmeier et al. | |
| 10,558,234 B2 | 2/2020 | Kuriakose et al. | |
| 10,611,347 B1 | 4/2020 | Archer et al. | |
| 10,617,900 B1 | 4/2020 | Linsmeier et al. | |
| 10,781,090 B2 | 9/2020 | Puszkiewicz et al. | |
| D899,452 S | 10/2020 | Klimes et al. | |
| 10,800,605 B2 | 10/2020 | Rocholl et al. | |
| 10,829,355 B2 | 11/2020 | Puszkiewicz et al. | |
| 10,850,963 B2 | 12/2020 | Hackenberg et al. | |
| 10,858,184 B2 | 12/2020 | Betz et al. | |
| 10,858,230 B2 | 12/2020 | Hackenberg et al. | |
| 10,859,167 B2 | 12/2020 | Jax et al. | |
| 10,899,538 B2 | 1/2021 | Nelson et al. | |
| D910,670 S | 2/2021 | Klimes et al. | |
| 10,934,145 B2 | 3/2021 | Hao et al. | |
| 10,968,089 B2 | 4/2021 | Bhatia et al. | |
| 10,989,332 B2 | 4/2021 | Ditty et al. | |
| 11,001,440 B2 | 5/2021 | Yamazaki et al. | |
| 11,014,796 B2 | 5/2021 | Bafile et al. | |
| 2002/0159870 A1 | 10/2002 | Pruteanu et al. | |
| 2003/0045700 A1 | 3/2003 | Baker et al. | |
| 2003/0231944 A1 | 12/2003 | Weller et al. | |
| 2004/0071537 A1 | 4/2004 | Pruteanu et al. | |
| 2004/0156706 A1 | 8/2004 | Weller et al. | |
| 2004/0178018 A1 | 9/2004 | Christenson | |
| 2005/0113996 A1 | 5/2005 | Pillar et al. | |
| 2006/0032701 A1 | 2/2006 | Linsmeier et al. | |
| 2006/0032702 A1 | 2/2006 | Linsmeier et al. | |
| 2006/0045700 A1 | 3/2006 | Siebers et al. | |
| 2006/0086566 A1 | 4/2006 | Linsmeier et al. | |
| 2007/0138817 A1 | 6/2007 | Calliari et al. | |
| 2007/0154295 A1 | 7/2007 | Kuriakose | |
| 2008/0038106 A1 | 2/2008 | Spain | |
| 2009/0145871 A1 | 6/2009 | Bond | |
| 2010/0166531 A1 | 7/2010 | Bauer et al. | |
| 2012/0282077 A1 | 11/2012 | Alberts et al. | |
| 2015/0259185 A1 | 9/2015 | Ditty | |
| 2016/0085652 A1 | 3/2016 | Factor et al. | |
| 2017/0001846 A1* | 1/2017 | Paavolainen | B66F 9/0655 |
| 2017/0341860 A1 | 11/2017 | Dodds et al. | |
| 2018/0265289 A1 | 9/2018 | Davis et al. | |
| 2019/0359460 A1 | 11/2019 | Linsmeier et al. | |
| 2020/0071996 A1 | 3/2020 | Betz | |
| 2020/0231131 A1 | 7/2020 | Archer et al. | |
| 2020/0238115 A1 | 7/2020 | Linsmeier et al. | |
| 2020/0262328 A1 | 8/2020 | Nelson et al. | |
| 2020/0290853 A1 | 9/2020 | Neubauer et al. | |
| 2020/0290855 A1 | 9/2020 | Bruno et al. | |
| 2020/0317065 A1 | 10/2020 | Lombardo | |
| 2020/0317480 A1 | 10/2020 | Shankar et al. | |
| 2020/0317486 A1 | 10/2020 | Puszkiewicz et al. | |
| 2020/0317488 A1 | 10/2020 | Bafile et al. | |
| 2020/0317491 A1 | 10/2020 | Bafile et al. | |

(56) References Cited

U.S. PATENT DOCUMENTS

| | | |
|---|---|---|
| 2020/0317492 A1 | 10/2020 | Bhatia et al. |
| 2020/0317493 A1 | 10/2020 | Lombardo et al. |
| 2020/0317494 A1 | 10/2020 | Bafile et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2021/0002112 A1 | 1/2021 | Puszkiewicz et al. |
| 2021/0039934 A1 | 2/2021 | Hackenberg et al. |
| 2021/0039935 A1 | 2/2021 | Hackenberg et al. |
| 2021/0054942 A1 | 2/2021 | Jax et al. |
| 2021/0086991 A1 | 3/2021 | Betz et al. |
| 2021/0121340 A1 | 4/2021 | Malcolm et al. |
| 2021/0139237 A1 | 5/2021 | Nelson et al. |
| 2021/0155463 A1 | 5/2021 | Hao et al. |
| 2021/0276845 A1 | 9/2021 | Gilbride et al. |

FOREIGN PATENT DOCUMENTS

| | | | |
|---|---|---|---|
| EP | 0 921 094 A2 | 6/1999 | |
| EP | 2514708 A1 * | 10/2012 | ............ B66F 9/0759 |
| EP | 3 112 312 A1 | 1/2017 | |
| JP | H372123 | 3/1991 | |

OTHER PUBLICATIONS

Invitation to Pay Additional Fees and Partial Search Report regarding PCT PCT/US2021/021166, dated May 3, 2021, 9 pps.

Invitation to Pay Additional Fees and Partial Search Report regarding PCT PCT/US2021/021176, dated May 10, 2021, 8 pps.

International Search Report and Written Opinion regarding Appl. No. PCT PCT/US2021/021176, dated Jul. 1, 2021, 19 pps.

* cited by examiner

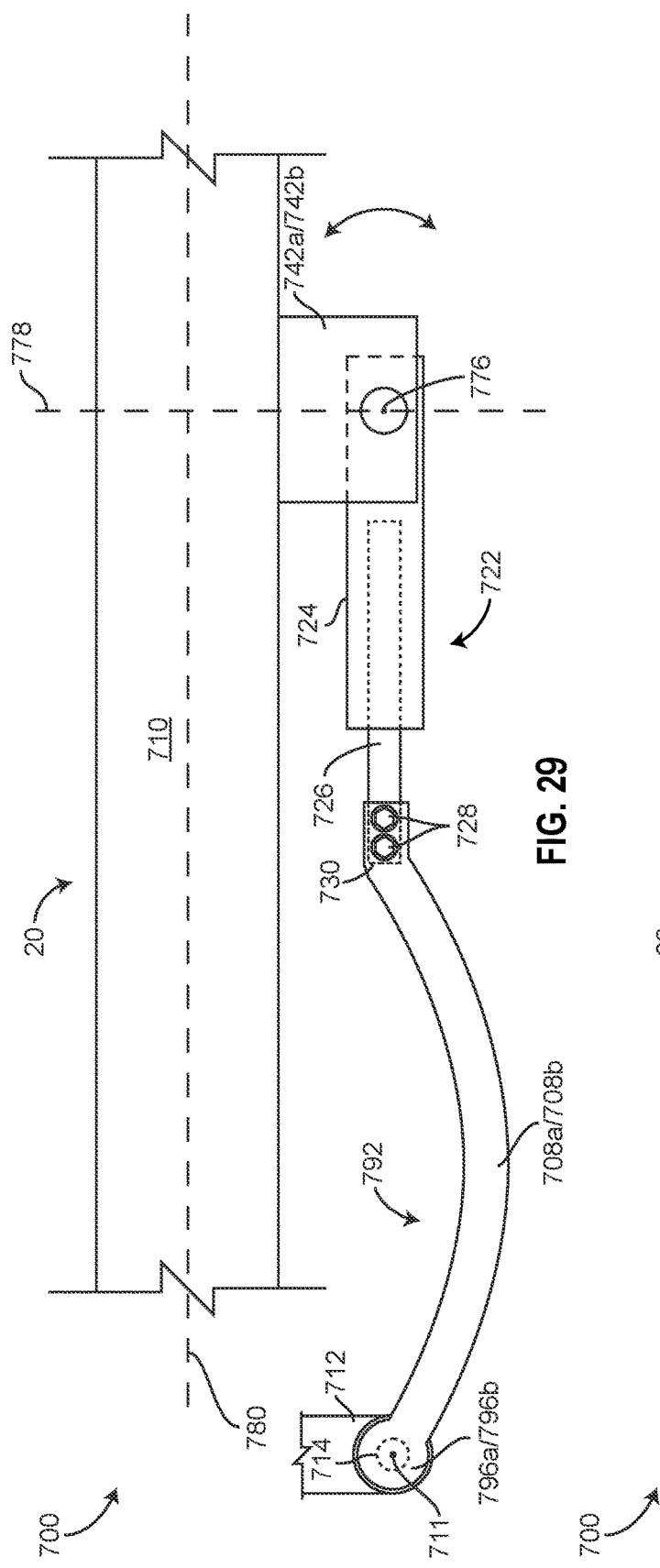
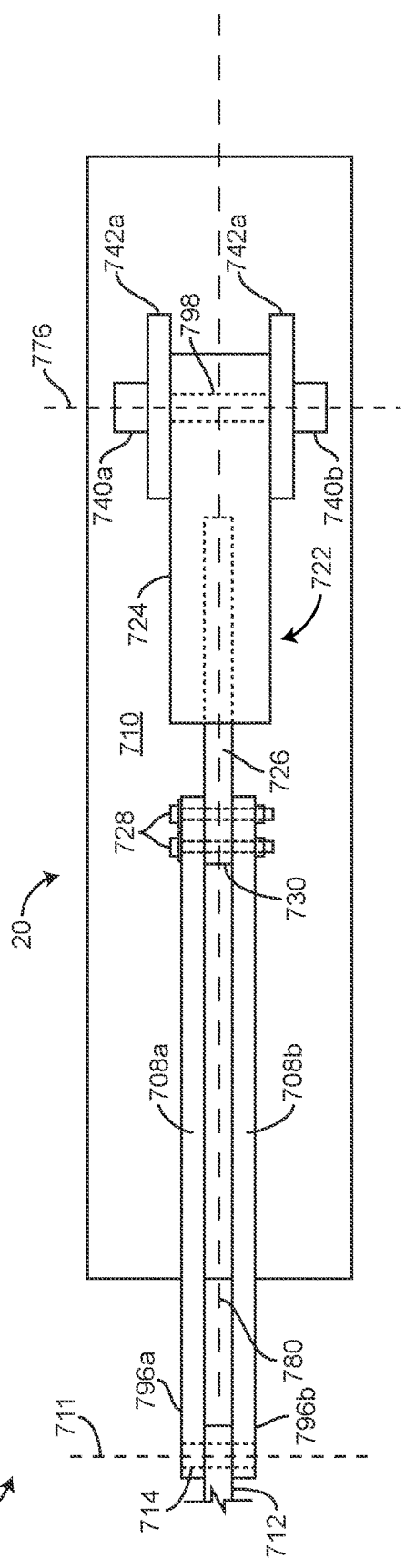
FIG. 29
FIG. 30

LIFT DEVICE WITH DEPLOYABLE OPERATOR STATION

CROSS-REFERENCE TO RELATED PATENT APPLICATION

This application claims the benefit of and priority to U.S. Provisional Application No. 62/985,955, filed Mar. 6, 2020, U.S. Provisional Application No. 62/986,465, filed Mar. 6, 2020, U.S. Provisional Application No. 62/985,956, filed Mar. 6, 2020, and U.S. Provisional Application No. 62/986,357, filed Mar. 6, 2020, the entire disclosures of which are incorporated by reference herein.

BACKGROUND

The present application generally relates to lift devices. More particularly, the present application relates to mobile elevated work platforms.

SUMMARY

One implementation of the present disclosure is a lift device, according to an exemplary embodiment. The lift device includes a lift apparatus and a base assembly. The lift apparatus is configured to raise and lower an implement assembly. The base assembly is configured to support the lift apparatus. The base assembly includes a deployable operator station transitionable between a deployed position and a stowed position. In the deployed position, the deployable operator station is configured to provide a seating and control arrangement for an operator. In the stowed position, the deployable operator station is substantially sealed from an external environment to limit access to the deployable operator station.

Another implementation of the present disclosure is a deployable operator station for a lift device, according to an exemplary embodiment. The deployable operator station includes a rollover protective structure, and an overhead protective structure. The rollover protective structure is rotatably coupled at a first end with a support structure. The overhead protective structure is pivotally coupled with a second end of the rollover protective structure. The overhead protective structure is pivotally coupled with the rollover protective structure through a selective engagement mechanism. The selective engagement mechanism is configured to selectively limit rotation between the overhead protective structure and the rollover protective structure and receive a user input to disengage the selective engagement mechanism for rotating the overhead protective structure relative to the rollover protective structure. The deployable operation station is transitionable between a deployed position and a stowed position.

Another implementation of the present disclosure is a lift device, according to an exemplary embodiment. The lift device includes a chassis, multiple tractive elements, an electric motor, and a deployable operator station. The multiple tractive elements are rotatably coupled to the chassis and are configured to support the chassis. The electric motor is configured to drive the multiple tractive elements for driving and steering operations. The deployable operator station is configured to transition between a deployed position and a tucked position. The deployable operator station includes a rollover protective structure and an overhead protective structure. The rollover protective structure is pivotally coupled with a support member at a first end and configured to be pivoted relative to the support member for deployment by a linear electric actuator. The overhead protective structure is pivotally coupled with a second end of the rollover protective structure. The overhead protective structure is pivotally coupled with the rollover protective structure through a selective engagement mechanism. The selective engagement mechanism is configured to receive a user input to selectively limit rotation between the overhead protective structure and the overhead protective structure.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIG. 29 is a top view of a portion of a steering system of the lift device of FIG. 1, according to an exemplary embodiment;

FIG. 30 is a front view of a portion of the steering system of the lift device of FIG. 1, according to an exemplary embodiment;

DETAILED DESCRIPTION

Figure 1:
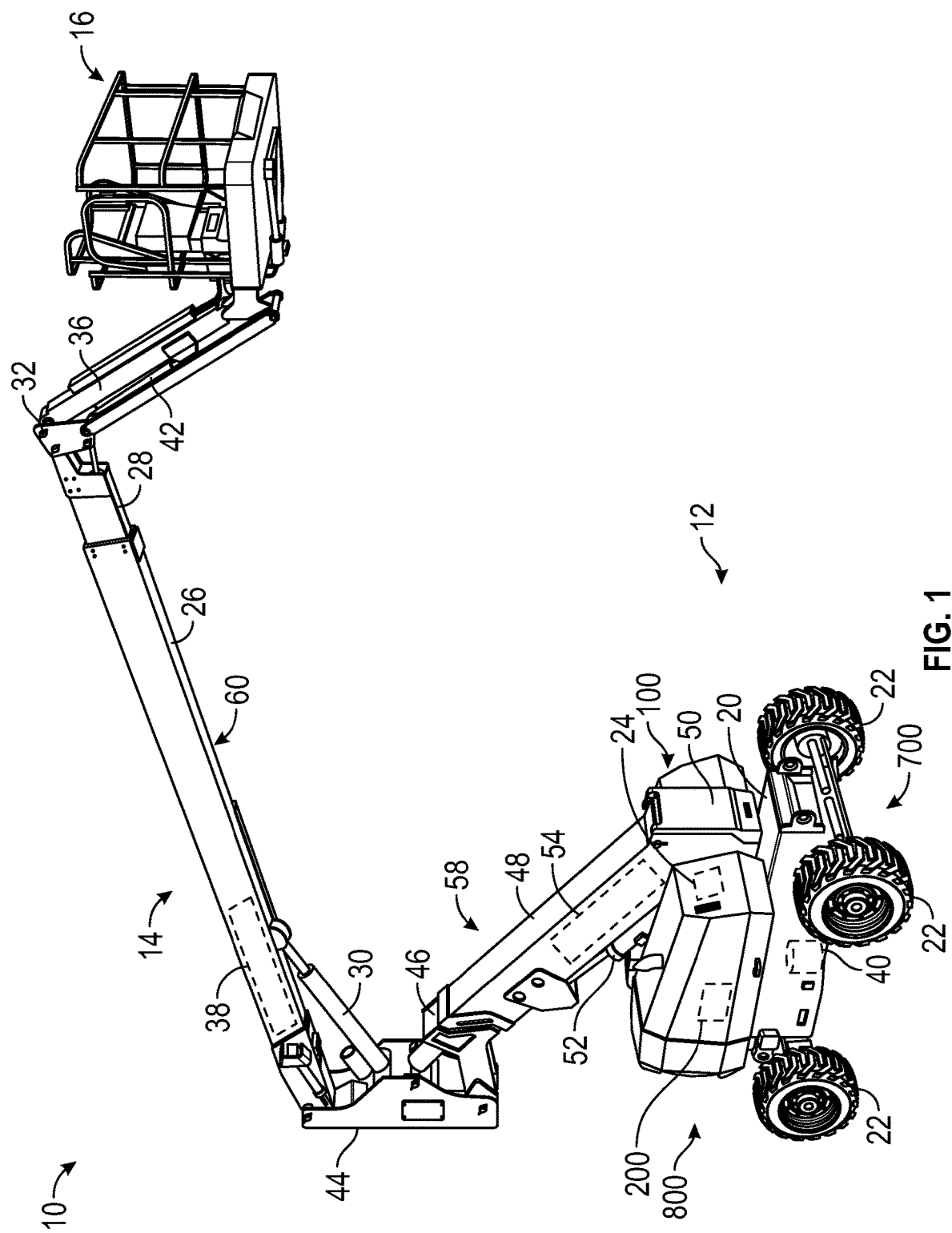
FIG. 1 is a perspective view of a lift device, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the FIGURES, a lift device includes a deployable operator station. The deployable operator station may include two frame assemblies that are pivotally coupled with each other, a first of which is pivotally coupled with a base of the lift device. The frame assembly that is pivotally coupled with the base may be driven by a linear electric actuator to automatically deploy. The second frame assembly may be selectably rotatably coupled with the first frame assembly through an engagement mechanism, which a user may selectively disengage and then manually deploy the second frame assembly. The deployable operator station can also include various hood or shell members that are configured to interlock with each other to seal the deployable operator station and to prevent unauthorized access to various input devices of the lift device that are positioned at the deployable operator station. The lift device can include multiple user interfaces. For example, the lift device may include a first user interface at a platform or implement assembly and a second user interface where an operator is seated or stands when operating the lift device. The lift device may be a fully electric lift device that includes a lift apparatus that uses electric linear actuators and/or electric motors to raise or lower an implement assembly that is positioned at an end of the lift apparatus.

The lift device may be a fully electric lift device and can include a first set of batteries at the base assembly and a second set of batteries at a turntable assembly of the lift device. The turntable assembly can include a slip ring transmission (e.g., an electro-mechanical slip ring transmission) that rotatably couples a turntable member with the base assembly or the frame. The lift apparatus may be positioned on the turntable member so that operation of the slip ring transmission drives the turntable member and the lift apparatus to rotate or pivot relative to the base assembly or the frame. The first set of batteries that are positioned on the base assembly may be configured to provide electrical power to electrical components of the base assembly (e.g., for driving, steering, or axle lock-out operations). The second set of batteries that are positioned on the turntable assembly may be configured to provide electrical power to electrical components of the lift apparatus (e.g., for raising or lowering operations).

The first set of batteries may be configured to connect to a facility power source for charging of the first set of batteries and the second set of batteries. A charger may connect with the facility power source and transfer charging power or charging energy to the first set of batteries. The first set of batteries can provide electrical power to any of the electrical components of the base assembly through an inverter. The first set of batteries may function as a main source of power and can be used to replenish or recharge the second set of batteries as required. For example, the controller may monitor a battery level of the second set of batteries and recharge the second set of batteries using electrical energy provided by the first set of batteries. The second set of batteries can be recharged by the first set of batteries through the slip ring transmission. Specifically, the first set of batteries may transfer electrical energy through the inverter and the slip ring transmission to a charger of the turntable assembly. The charger of the turntable assembly may use the electrical power provided through the slip ring transmission to charge the second set of batteries. In this way, the slip ring transmission may serve or function as both a primary mover to drive relative rotation between the turntable member and the frame of the base assembly as well as facilitating the transfer of electrical energy from the first set of batteries to the second set of batteries.

In some embodiments, the controller is also configured to prevent or restrict operations of the lift apparatus based on the battery level of the second set of batteries. For example, if the battery level of the second set of batteries decreases below a first threshold, the controller may prevent operations of the lift apparatus that raise the implement assembly. The controller may also determine if the first set of batteries have sufficient battery capacity to charge the second set of batteries and may charge the second set of batteries using the first set of batteries. If the first set of batteries do not have sufficient battery capacity to charge the second set of batteries, the controller may determine that the first set of batteries should be connected to a power source for recharge and can notify an operator of the lift device (e.g., by operating a display screen, providing a visual alert, providing an aural alert, etc.). If the battery level of the second set of batteries decreases below a second threshold level and the first set of batteries still do not have sufficient capacity to recharge the second set of batteries, the controller may restrict operation of the lift apparatus completely until the first set of batteries are connected to a power source for recharging.

In some examples, the lift device can be used as part of an autonomous or semi-autonomous jobsite fleet. The lift device can include a controller that is configured to communicate over one or more wireless communication protocols that enable remote lift device monitoring and control. The lift device can include a communication gateway that monitors a status of the lift device (e.g., battery charge level, health, location, etc.) and transmits the status of the lift device to one or more network devices (e.g., computers, smart phones, tablets, etc.). The same network devices can be used to send remote commands, which can include driving, lifting, or other instructions that can then be performed by the lift device without needing an operator to be present. In some examples, remote commands can be sent to a human machine interface on the lift device, and provide instructions related to a specific task that can then be read or otherwise presented to an operator positioned within the lift device. In still other examples, the lift device is configured to operate with auxiliary equipment (e.g., a drone, a mobile device, etc.) that can provide tasks and specific targeted locations to the lift device for performing autonomous jobs. The lift device can include one or more cameras that can be used to provide a point-of-view on the network device that will allow for precise manual remote control of the lift device.

Lift Device

Referring particularly to FIG. 1, a lift device, a boom, an articulated boom, a lift, a MEWP, a telehandler, etc., shown as lift device 10 includes a base assembly 12 (e.g., a base, a main body, a vehicle, etc.), a lift apparatus 14 (e.g., a telescoping arm, an articulated arm, a boom arm, a boom, etc.), and an implement assembly 16 (e.g., a platform, a platform assembly, a work platform, a fork assembly, an apparatus, etc.). As shown in FIG. 1, lift device 10 is provided as a mobile elevated work platform (MEWP) where the implement assembly 16 is a work platform. Implement assembly 16 may be replaceable with different implement assemblies (e.g., a fork assembly) to transition the lift device 10 from being a MEWP to being a material handler (MH). When lift device 10 is a MH, implement assembly 16 can be a fork carriage that may serve as a versatile attachment interface where a work platform designed with forklift pockets can be attached, a pair of forks for material handliner, etc. Additionally, the fork carriage can be used for other tool attachments so that the implement assembly 16 is interchangeable.

Base assembly 12 includes a frame 20 (e.g., a carriage, a structural member, a support member, a chassis, a frame member, etc.), and multiple tractive elements 22 (e.g., wheels, treads, rotatable members, rollers, etc.). Base assembly 12 also includes a primary mover (e.g., an electric motor, an internal combustion engine, a hydraulic motor, a pneumatic motor, etc.), shown as electric motor 24. Electric motor 24 can be configured to provide mechanical power (e.g., rotational kinetic energy) to tractive elements 22 (e.g., through a transmission, a power transmitting system, one or more gearboxes, etc.) for transportation of lift device 10. Electric motor 24 may also provide mechanical power for operation of lift apparatus 14, a steering system of lift device 10, deployment of a deployable operator station of lift device 10, etc., or for any other function, feature, etc., of lift device 10 that requires mechanical power to operate. Electric motor 24 may represent a single or a collection of electric motors that are configured to consume or receive electrical energy from one or more batteries, power cells, capacitors, power storage devices, power storage systems, etc., shown as electrical energy storage devices 40 to generate the mechanical power. Tractive elements 22 can receive the mechanical power from electric motor 24 and rotate relative to frame 20. Tractive elements 22 can each be pivotally or rotatably coupled with frame 20 so that tractive elements 22 can rotate relative to frame 20 to facilitate a driving or transport operation of lift device 10 (e.g., to transport lift device 10 from one jobsite to another jobsite).

Tractive elements 22 may include a first or a front pair of tractive elements and a second or rear pair of tractive elements. The pairs of tractive elements 22 may each be rotatably or pivotally coupled with a corresponding axle (e.g., a front axle and a rear axle, respectively) that is fixedly coupled, integrally formed, welded, fastened, etc., with frame 20. One or both of the axles may include one or more steering members (e.g., tie-rods, elongated members, etc.) that are configured to pivot or rotate tractive elements about a steering axis to indicate a direction of turn of lift device 10. In this way, electric motor 24 and tractive elements 22 can facilitate the transportation of lift device 10 from one location to another.

Referring still to FIG. 1, base assembly 12 includes an operator station, shown as deployable operator station 100 (e.g., a cab, a housing, an enclosure, a space, a zone, a station, a standing station, a platform, etc.). Deployable operator station 100 can be fixedly coupled with frame 20 or a body of lift device 10 so that an operator may sit or stand at deployable operator station 100 and be transported with lift device 10 as lift device 10 drives and steers. Deployable operator station 100 can include a body, a frame, sidewalls, a roof, doors, windows, etc., or may otherwise form an enclosure for the operator. Deployable operator station 100 can be positioned on a left side or a right side of lift device 10, or may be centered above frame 20. In some embodiments, deployable operator station 100 is deployable or transitionable between an un-deployed state, position, mode, etc., and a deployed state, position, mode, etc. Deployable operator station 100 may be a complete or a partial enclosure that provides protection for the operator or shielding from environmental elements.

Referring still to FIG. 1, lift apparatus 14 is or includes a pair of articulated telescoping members, shown as first telescoping member 58 and second telescoping member 60 that are pivotally or hingedly coupled at intermediate member 44. Second telescoping member 60 includes an outer member 26 (e.g., a first member) and an inner member 28. Inner member 28 can be received within an inner volume of outer member 26 and may be configured to slide, translate, etc., relative to outer member 26. In some embodiments, inner member 28 and outer member 26 are slidably coupled so that an overall length of the second telescoping member 60 can be increased or decreased to facilitate raising or lowering implement assembly 16. Inner member 28 and outer member 26 may be configured to extend or retract through operation of a primary mover, a linear electric actuator, an electric motor, a hydraulic cylinder, a pneumatic cylinder, etc., shown as linear electric actuator 38. Linear electric actuator 38 may draw electrical power or electrical energy from one or more batteries, power sources, energy storage devices, etc., of lift device 10 (e.g., from electrical energy storage devices 40) and use the electrical energy to operate to extend or retract, thereby driving inner member 28 to translate relative to outer member 26 (and thereby raising or lowering implement assembly 16 to reach an elevated location).

Outer member 26 can receive inner member 28 through a first or proximate end and may be rotatably or hingedly coupled with intermediate member 44 at a second or opposite end. Specifically, outer member 26 may be hingedly or rotatably coupled with an upper portion or corner of intermediate member 44. Outer member 26 can be driven to rotate or pivot relative to intermediate member 44 to raise or lower implement assembly 16 by a linear actuator, an electric motor, a linear electric actuator, a pneumatic actuator, a hydraulic cylinder, etc., shown as linear electric actuator 30. Linear electric actuator 30 can be pivotally coupled at a first end with outer member 26 and at a second end with a portion of intermediate member 44.

Lift apparatus 14 can include an intermediate member, an elongated member, etc., shown as medial member 36. Medial member 36 can be pivotally coupled with inner member 28 through a hinge, a pin, a hinged coupling, etc., shown as pin 32. Inner member 28 may extend into an inner volume of outer member 26 at a first end and rotatably couple with medial member 36 at an opposite or second end. Medial member 36 can be configured to be driven to rotate about pin 32 to pivot or rotate implement assembly 16 through a linear electric actuator 42. Linear electric actuator 42 may be pivotally coupled at a first end with medial member 36 and pivotally coupled at a second end with inner member 28 so that extension or retraction of linear electric actuator 42 drives rotation of medial member 36 and implement assembly 16 about pin 32 relative to inner member 28.

Referring still to FIG. 1, the first telescoping member 58 of lift apparatus 14 can include an outer member 48 and an inner member 46. Outer member 48 may receive inner member 46 through an inner volume so that inner member 46 can slidably couple with outer member 48. Inner member 46 may be rotatably or hingedly coupled with intermediate member 44 (e.g., at a bottom portion of intermediate member 44). In some embodiments, a first or proximate end of inner member 46 extends into outer member 48 and a second or distal end of inner member 46 is rotatably or hingedly coupled with intermediate member 44. Outer member 26 may also hingedly or rotatably couple with intermediate member 44 (e.g., at an upper end of intermediate member 44). In this way, intermediate member 44 may be a linkage or intermediate member that hingedly, rotatably, or pivotally couples with outer member 26 at a first end (e.g., an upper end) and hingedly, rotatably or pivotally couples with inner member 46 at a second end (e.g., a lower end). Intermediate member 44 may be an upright structural member that forms a linkage between the second telescoping member 60 formed by outer member 26 and inner member 28 and the first telescoping member 58 or apparatus formed by inner member 46 and outer member 48. Inner member 46 and outer member 48 may form a telescoping member that is the same as or similar to the second telescoping member 60 formed by inner member 28 and outer member 26. The first telescoping member 58 (formed by outer member 48 and inner member 46) may extend from a front or forwards portion of lift device 10 in a rearwards direction (e.g., from base assembly 12 or frame 20) while the first telescoping member (formed by outer member 26 and inner member 28) may extend from a rearwards portion or area of lift device 10 (e.g., from intermediate member 44) in a forwards direction.

Referring still to FIG. 1, outer member 48 can be rotatably, pivotally, or hingedly coupled with base assembly 12 through a support member 50. Support member 50 can be fixedly coupled with base assembly 12 or frame 20 and can include a portion that is configured to receive an end of outer member 48 and pivotally couple with the end of outer member 48. Lift apparatus 14 also includes a linear electric actuator 52 that is configured to pivotally or hingedly couple at one end with base assembly 12 (e.g., with support member 50) and a second end or an opposite end with outer member 48. Linear electric actuator 52 can be configured to extend or retract to pivot outer member 48 relative to support member 50.

Referring still to FIG. 1, lift apparatus 14 can include a linear electric actuator 54 that is configured to extend or retract to drive inner member 46 to translate relative to outer member 48. In some embodiments, linear electric actuator 54 is positioned within outer member 48 so that extension of linear electric actuator 54 drives inner member 46 to translate to increase an overall length of inner member 46 and outer member 48 while retraction of linear electric actuator 54 drives inner member 46 to translate to decrease the overall length of inner member 46 and outer member 48. It should be understood that linear electric actuator 52 and linear electric actuator 54 may be the same as or similar to any of the other linear electric actuators described herein (e.g., linear electric actuator 42) and can be configured to receive or obtain electrical energy or electrical power from electrical energy storage devices 40. In some embodiments, linear electric actuator 52 and linear electric actuator 54 are also configured to receive control signals from controller 200 and use the control signals to operate to perform a requested function of lift apparatus 14.

Figure 45:
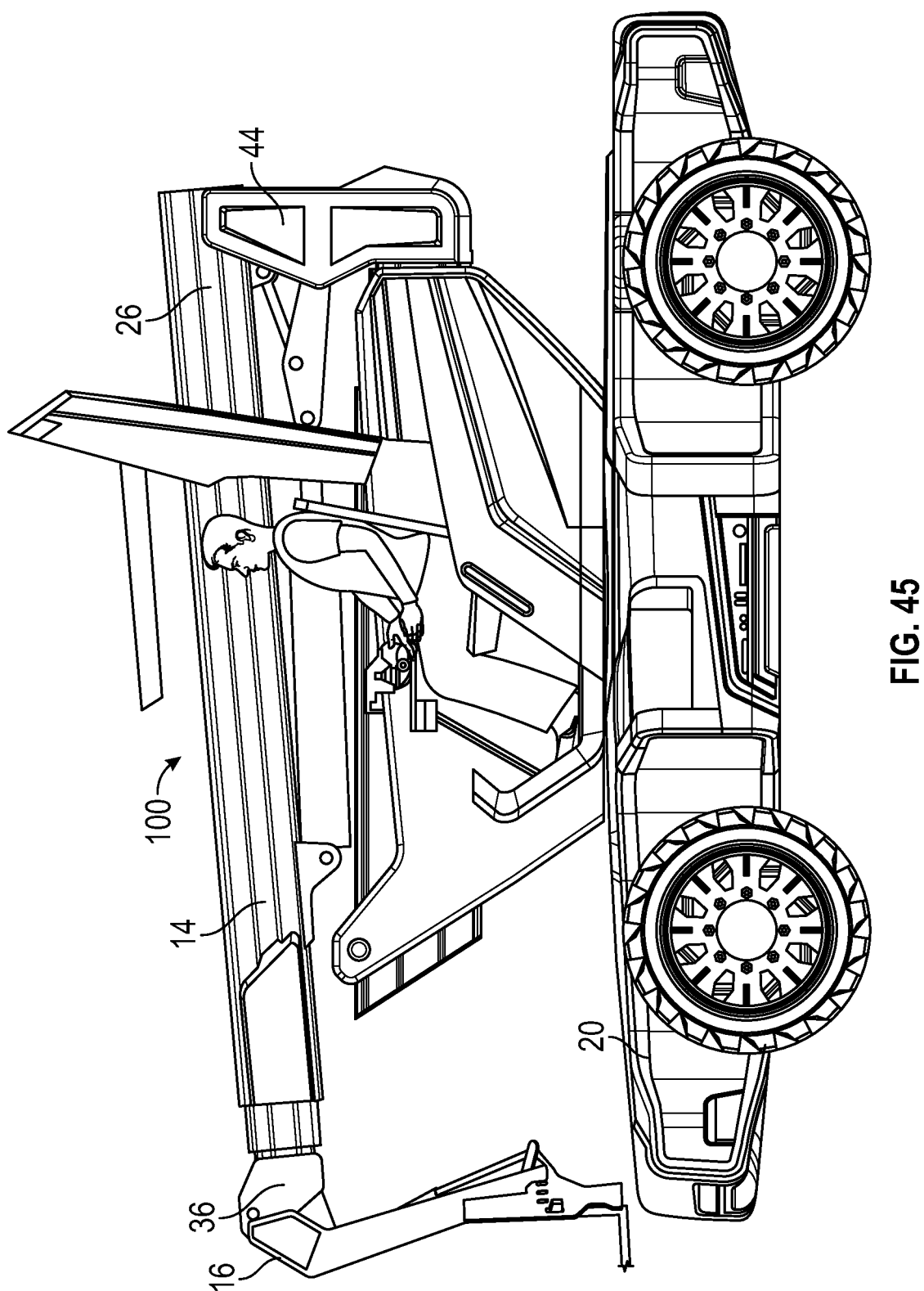
FIG. 45 is a side view of the lift device of FIG. 44, according to an exemplary embodiment.
Figure 46:
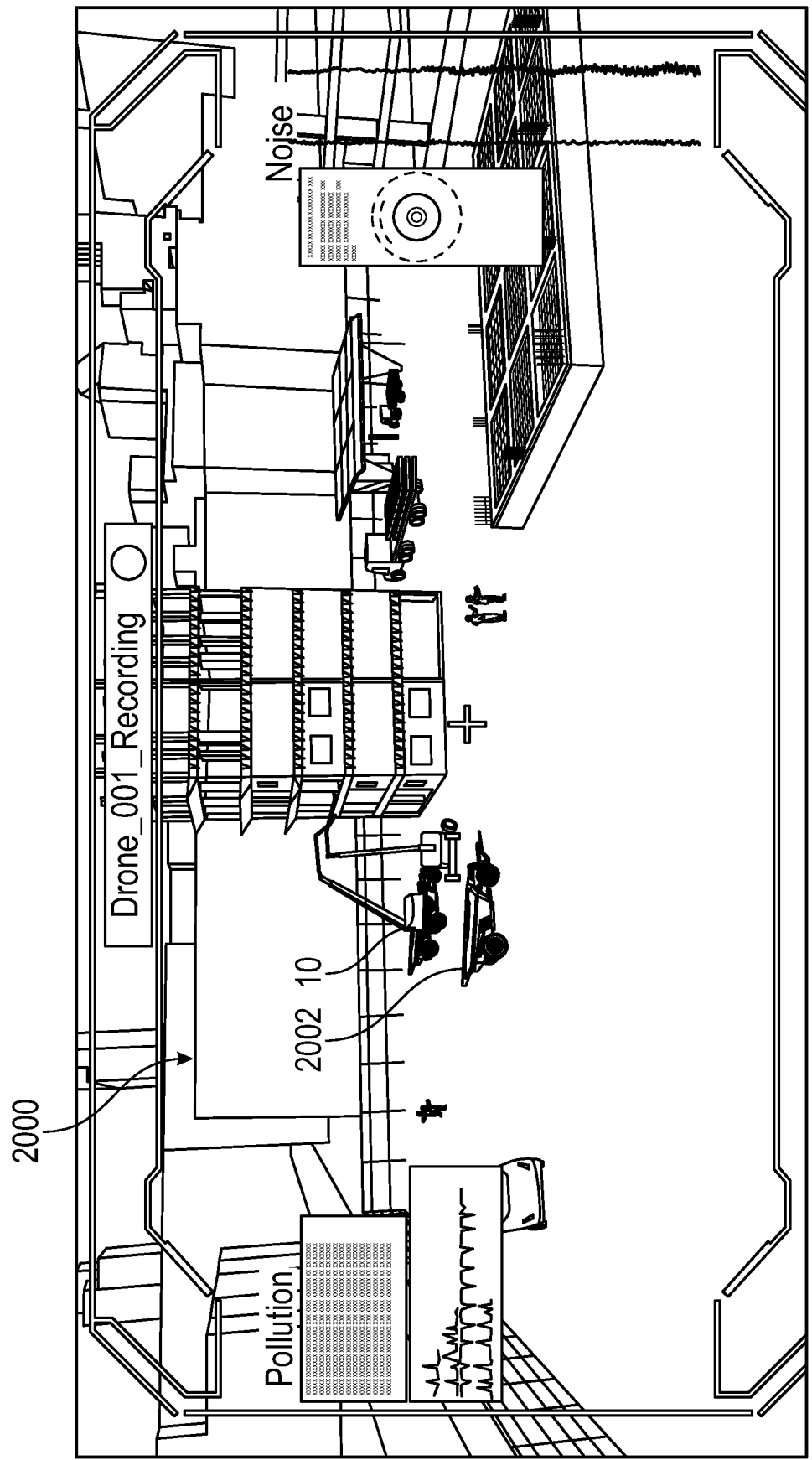
FIG. 46 is pictorial view of a drone monitoring a jobsite, according to an exemplary embodiment.

As depicted in FIG. 45, the lift device 10 is configured to move between an extended work configuration and a more compact travel position. In the work configuration, the lift apparatus 14 and implement assembly 16 is extended outward, forward from the frame 20 and forward from the lift device 10, generally. In the compact travel position, the implement assembly 16 is retracted inward, nearer the frame 20. The medial member 36 can be rotated rearward, so that the implement assembly rotates upward, over a portion of the frame 20. Similarly, the intermediate member 44 can also rotate rearward, which urges the outer member 26 and entire lift apparatus 14 and implement assembly 16 rearward, toward and over the frame 20. Traditional lift devices have very long booms, which typically results in the implement assembly being positioned well forward of the lift chassis. This conventional configuration makes transportation difficult, as the distance between the chassis and implement significantly limits over-the-road transport on trailers. Using the multi-telescoping boom lift apparatus 14 of the lift device 10, significant space savings are realized. The implement assembly 16 is retracted and rotated to be positioned nearly entirely (e.g., at least 50%) over the frame 20. Accordingly, trailer or other types of transport are significantly improved relative to conventional lifts, as the footprint of the lift device 10 is significantly limited.

Figure 2:
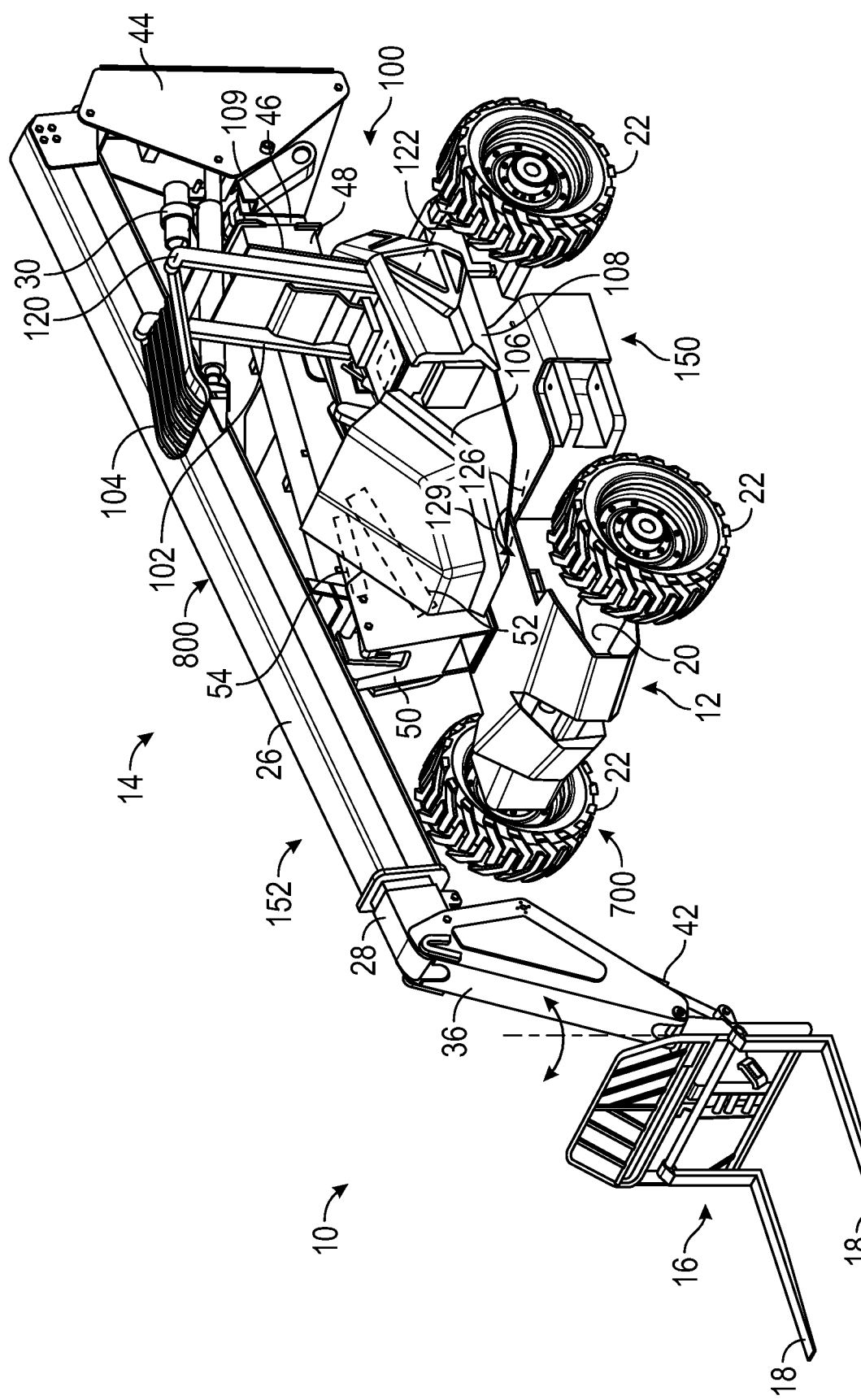
FIG. 2 is a perspective view of the lift device of FIG. 1 including a deployable operator station in a deployed position, according to an exemplary embodiment.

Referring particularly to FIG. 2, lift device 10 is shown in a material handler mode where implement assembly 16 include a pair of elongated members, shown as forks 18. Implement assembly 16 can be fixedly coupled with medial member 36 of lift apparatus 14 so that implement assembly 16 is raised or lowered through operation of lift apparatus 14. Implement assembly 16 may also include a bucket, a platform (e.g., an aerial work platform as shown in FIG. 1), a drill, an auger, etc., or any other equipment.

Figure 3:
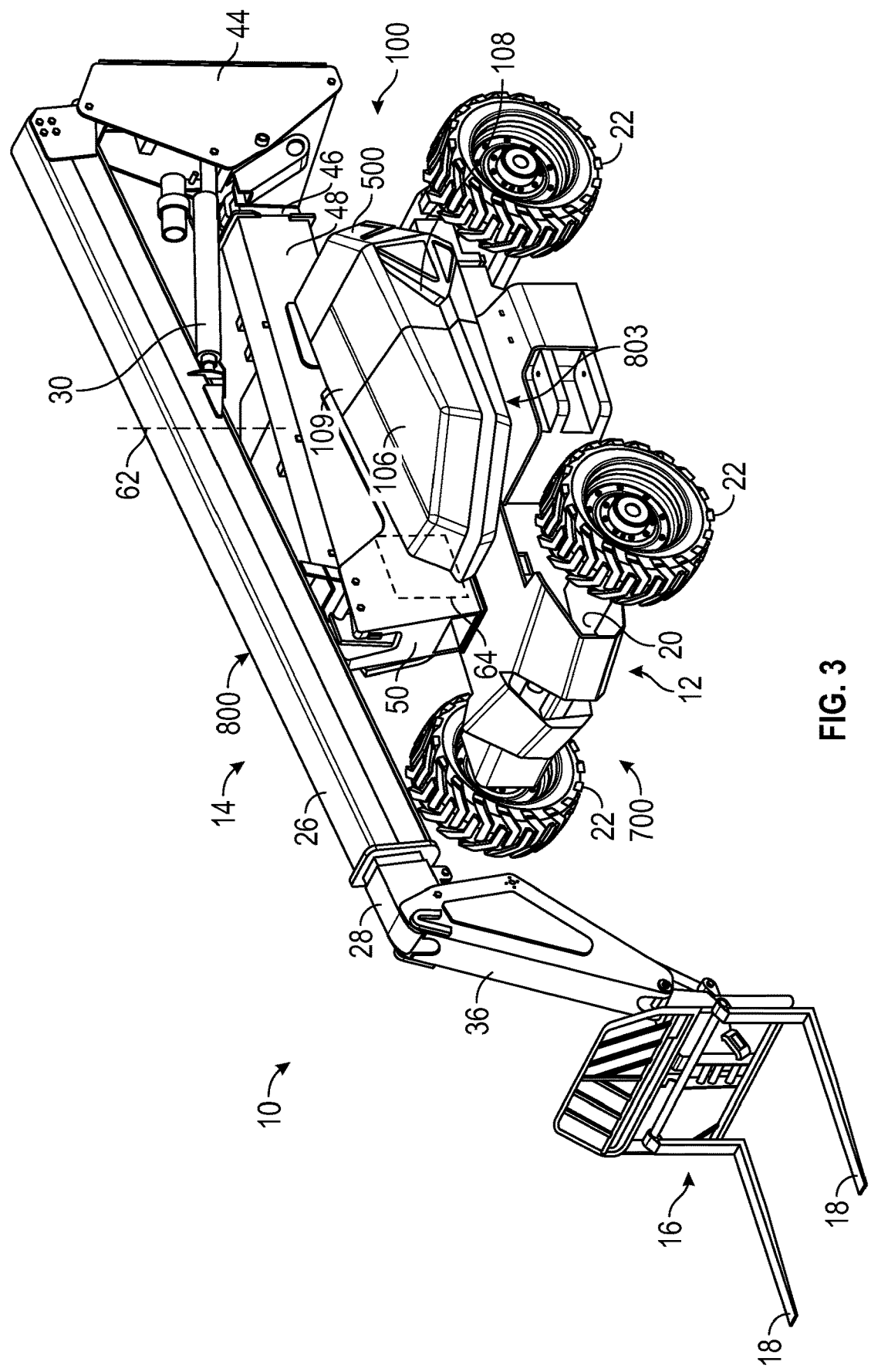
FIG. 3 is a perspective view of the lift device of FIG. 1 showing the deployable operator station in a tucked or stowed position, according to an exemplary embodiment.

Referring again to FIG. 1, lift device 10 can include a controller 200 that is configured to operate lift device 10 to perform the various functions described herein. For example, controller 200 may monitor a status, battery health, state of health, state of charge, capacity, etc., of electrical energy storage devices 40 and can operate a human machine interface (HMI) (e.g., HMI 500 as shown in FIG. 3), a user interface, a display screen, etc., to provide the operator of lift device 10 with indications or notifications regarding status or performance characteristics of electrical energy storage devices 40. Controller 200 can also generate control signals for electric motor 24 and the steering system (e.g., that may include linear electric actuators to pivot tractive elements 22 to indicate a direction of turn). Controller 200 can also generate control signals for any of linear electric actuator 52, linear electric actuator 54, linear electric actuator 30, linear electric actuator 38, or linear electric actuator 42 to operate lift apparatus 14 (e.g., to raise or lower implement assembly 16). Controller 200 may generate control signals to operate lift device 10 in response to receiving a user input to operate lift device 10 through an HMI or user input device (e.g., HMI 500). The HMI or user input device may be positioned at operator station 34 or on an exterior surface of lift device 10 (as represented by HMI 500 in FIG. 3). The HMI or user input device may include any number of buttons, levers, touchscreens, joysticks, user input devices, display screens, steering wheels, etc., that are configured to receive a user input and provide controller 200 with a signal indicating the user input. Controller 200 can then use the signal to determine which operations of lift device 10 are being requested to be performed and can generate control signals for various controllable elements of lift device 10 (e.g., electric motor 24, linear electric actuator 30, linear electric actuator 38, linear electric actuator 42, etc.) to perform the requested function or operation.

Deployable Operator Station

Referring to FIGS. 2-3, 11-23, and 34-45, the deployable operator station 100 is operable or transitionable between a first position or state (e.g., a stowed state, a tucked state, a stowed position, a tucked position, etc.) as shown in FIG. 3 and a second position or state (e.g., a deployed state, a deployed position, etc.) as shown in FIG. 2. Advantageously, deployable operator station 100 can be transitioned into the stowed position to facilitate restricting or limiting access to various control panels, HMIs, operator panels, control devices, etc., of lift device 10 that may be positioned within or at deployable operator station 100. This can prevent a likelihood that an unauthorized individual may access and operate lift device 10 (e.g., reduce a likelihood of theft, provide protection for the various control panels, HMIs, operator panels, control devices, etc., reduce a likelihood of damage to the various components of the deployable operator station 100, etc.).

Figure 11:
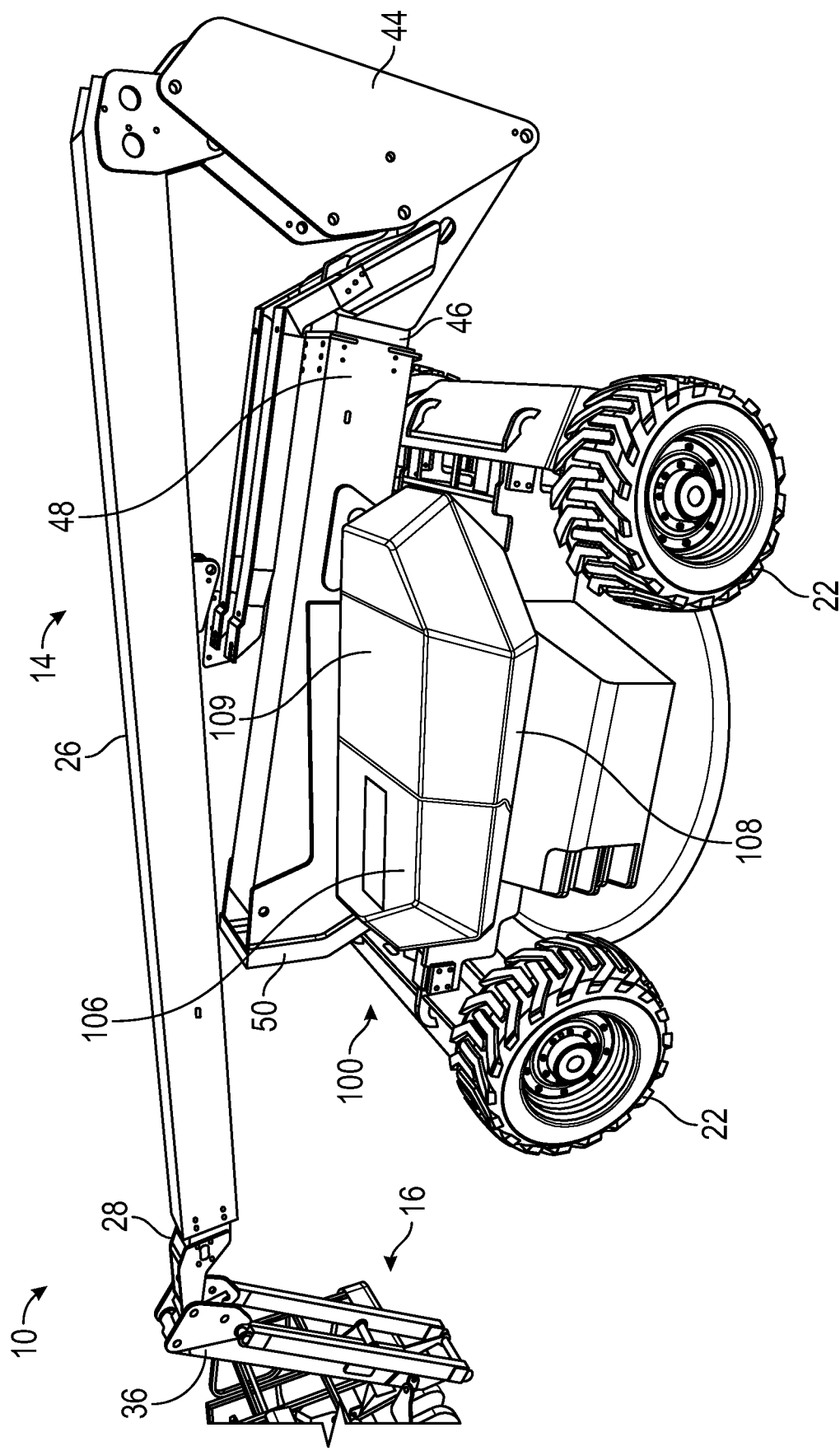
FIG. 11 is a perspective view of the lift device of FIG. 1 showing the deployable operator station in a tucked or stowed position, according to an exemplary embodiment.

Referring particularly to FIGS. 2-3 and 11, deployable operator station 100 can be transitioned between the deployed position shown in FIG. 2 and the tucked or stowed position as shown in FIGS. 3 and 11. Deployable operator station 100 can include a first shell member 106 (e.g., a first planar member, a first housing member, a hood member, a hood, etc.), a second shell member 108 (e.g., a planar member, a housing member, a hood, etc.), and a third shell member 109 (e.g., a planar member, a housing member, a hood, etc.). First shell member 106, second shell member 108 and third shell member 109 can be configured to interlock, abut, engage, contact, etc., each other when deployable operator station 100 is transitioned into the tucked or stowed position (as shown in FIGS. 3 and 11). In some embodiments, first shell member 106 is configured to rotate or pivot about an axis 126 as deployable operator station 100 is transitioned from the tucked or stowed position (as shown in FIGS. 3 and 11) to the deployed position (as shown in FIG. 2). Specifically, first shell member 106 can rotate in direction 129 about axis 126 as deployable operator station 100 is deployed. First shell member 106 may be hingedly or pivotally coupled with base assembly 12 so that first shell member 106 can be driven to rotate or pivot about axis 126 as deployable operator station 100 is deployed. Alternatively, and as depicted in FIGS. 34-45, the first shell member 106 can be pivotally coupled with the base assembly 12 at a rear of the first shell member 106.

Figure 4:
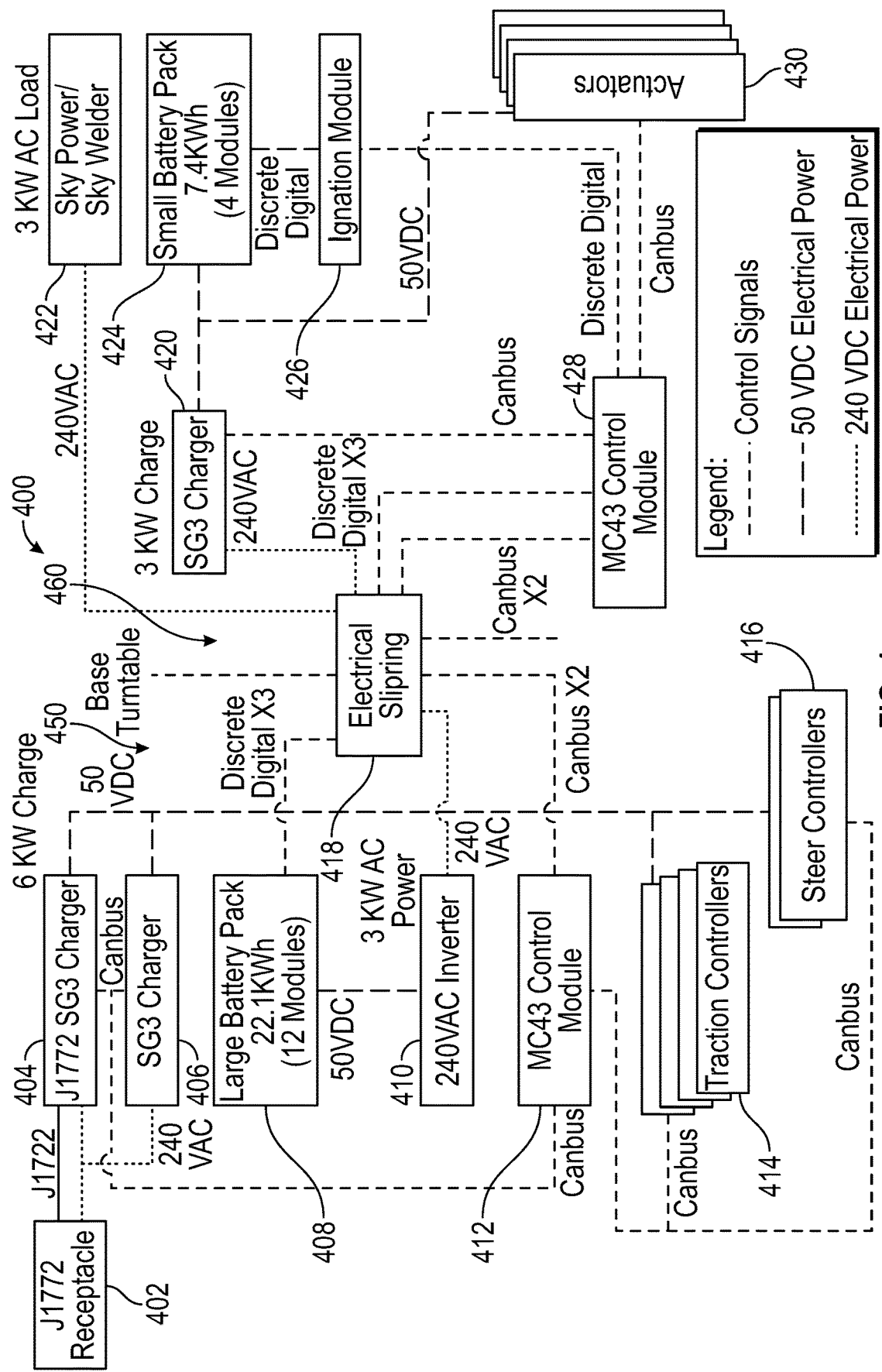
FIG. 4 is a block diagram of a control system for a turntable assembly of the lift device of FIG. 1, according to an exemplary embodiment.
Figure 34:
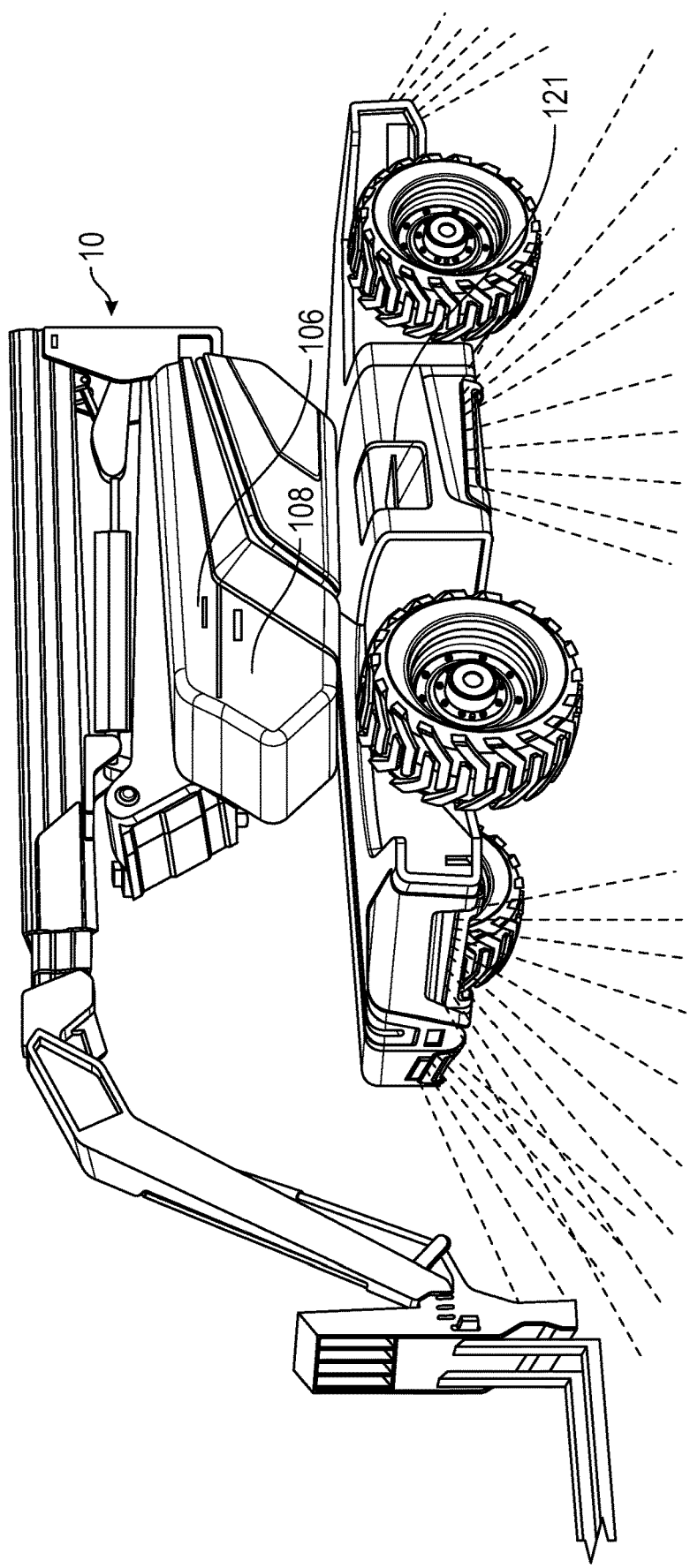
FIG. 34 is a perspective view of a lift device including a deployable operator station in a stowed position, according to another exemplary embodiment.
Figure 35:
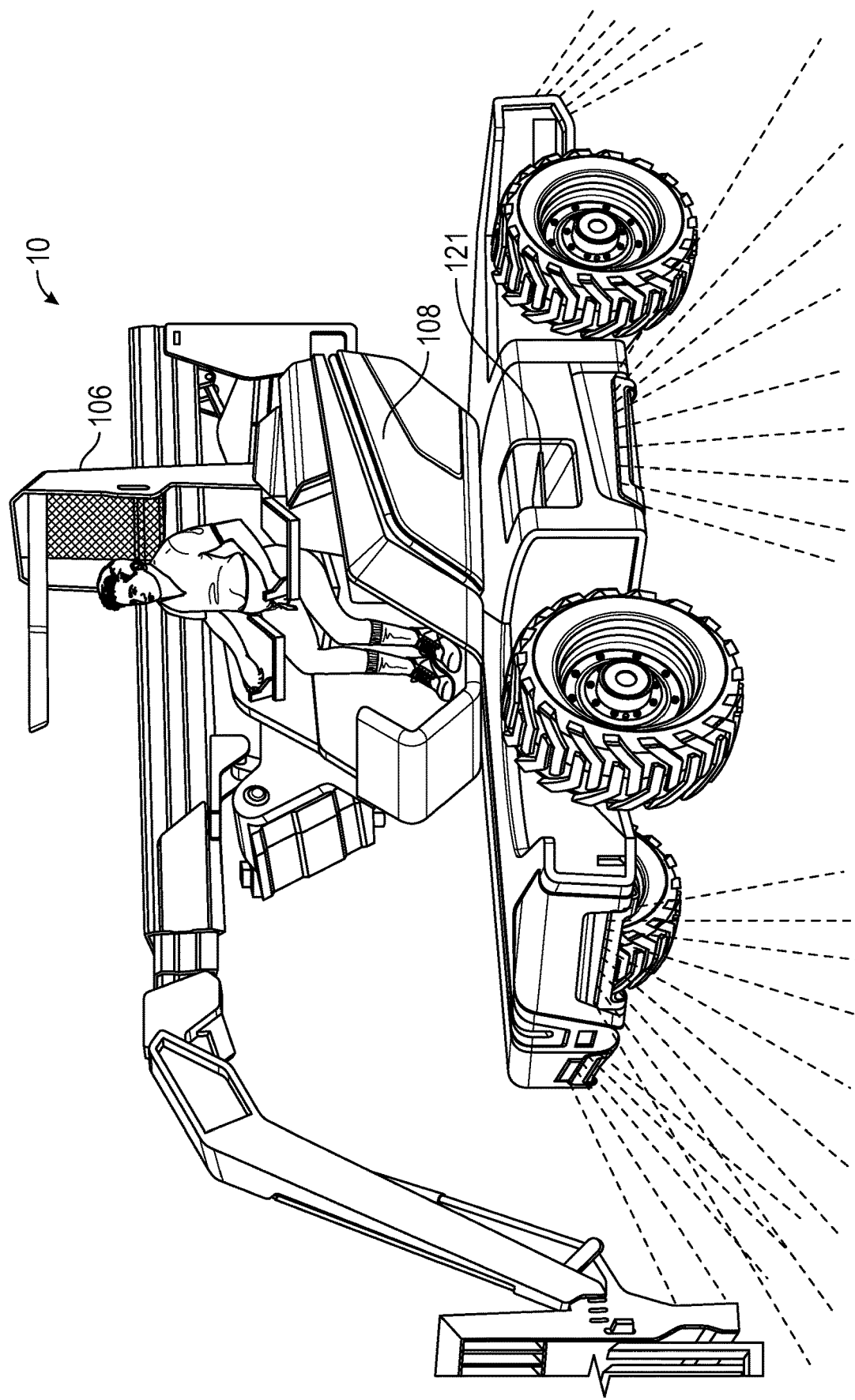
FIG. 35 is another perspective view of the lift device of FIG. 34 including the deployable operator station in a deployed position, according to an exemplary embodiment.
Figure 36:
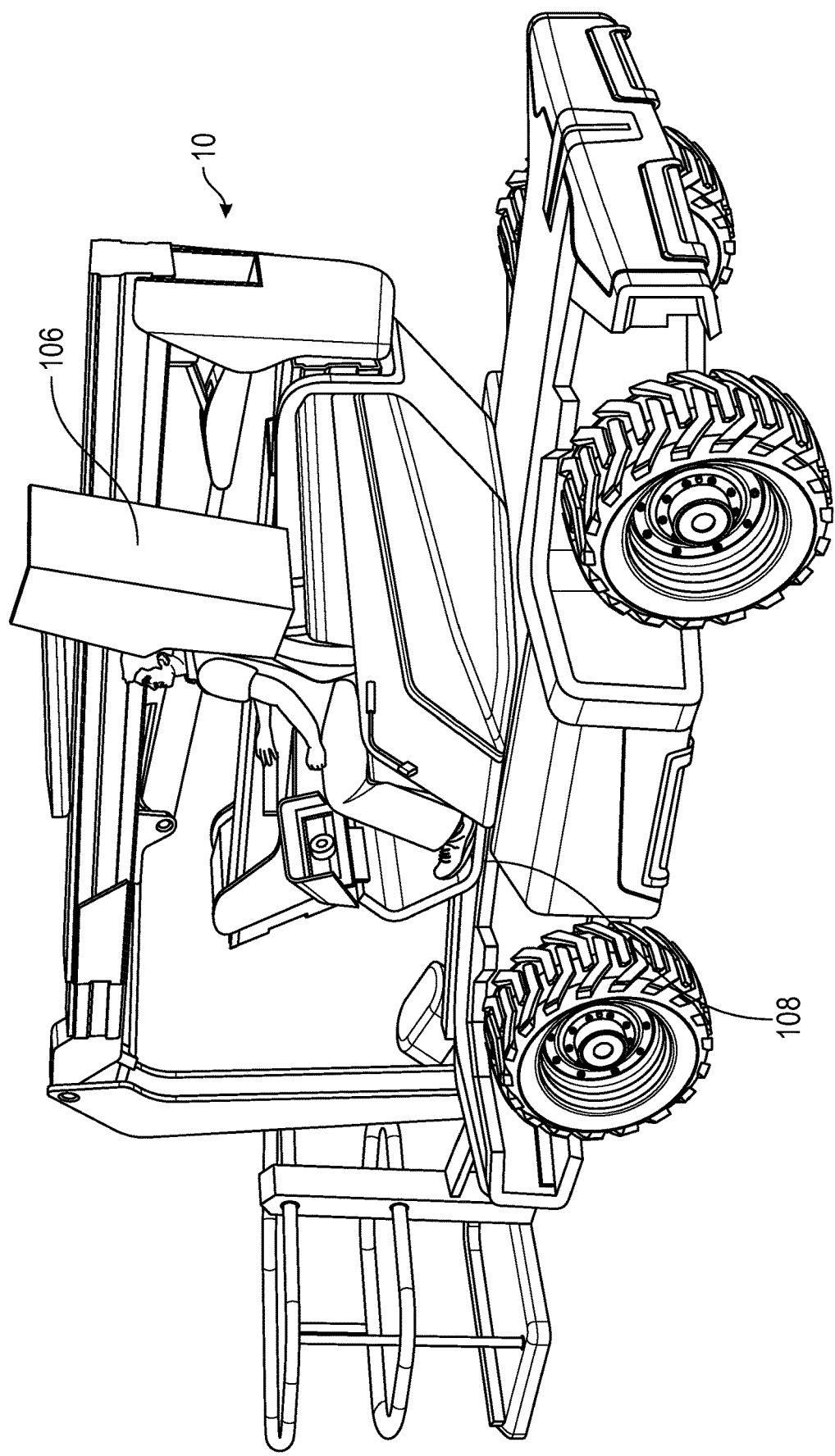
FIG. 36 is a rear perspective view of the lift device of FIG. 34 including the deployable operator station in a deployed position, according to an exemplary embodiment.

Second shell member 108 can be fixedly coupled with base assembly 12 or frame 20 and may remain stationary as deployable operator station 100 is deployed or tucked/stowed. For example, second shell member 108 may be a vertically extending sidewall that interlocks, abuts, engages, fits with, etc., first shell member 106 when deployable operator station is tucked or stowed (as shown in FIGS. 3 and 4). Third shell member 109 can be fixedly coupled with a first frame assembly 102 (e.g., a rollover protective structure, ROPS) of deployable operator station 100 which rotates about axis 122. Thus, as deployable operator station 100 is transitioned between the deployed or tucked positions, third shell member 109 may rotate or pivot about axis 122. When deployable operator station 100 is tucked (e.g., transitioned into the position shown in FIGS. 3-4), third shell member 109 may interlock with, abut, contact, engage, fit with, etc., first shell member 106 and second shell member 108 to form a shell, a structure, a housing, a container, etc. to enclose various components of deployable operator station 100. Alternatively, and as depicted in FIGS. 34-35, the third shell member 109 is omitted and the first shell member 106 rotates rearwardly relative to the second shell member 108 to transition to the deployed position. In some examples, the first shell member 106 is biased toward the open position by a spring or other biasing element. Accordingly, unlocking or unlatching the first shell member 106 from the second shell member 108 allows the first shell member 106 to naturally and passively raise away from the second shell member 108 to the deployed position. Alternatively, motors and/or actuators can be used to raise the first shell member 106 away from the second shell member 108. One or more buttons can be positioned along the outside of the second shell member 108 that can be pressed or otherwise manipulated by a user to both unlock and transition the first shell member 106 to the open position. In some examples, the button(s) are positioned beneath a locked, shielded cabinet that prevents unauthorized access to the buttons and to the deployable operator station 100, more generally. In still other examples, one or more of the lock and/or actuators can be remotely controlled, and can transition from a locked to unlocked position using wireless communication. Various different types of locking mechanisms can be used, including mechanical key-style locks as well as automatic or electronic locks having RFID readers, Bluetooth readers, near field communication (NFC) tag readers, and the like, to open and transition the first shell member 106 to the deployed position.

Figure 37:
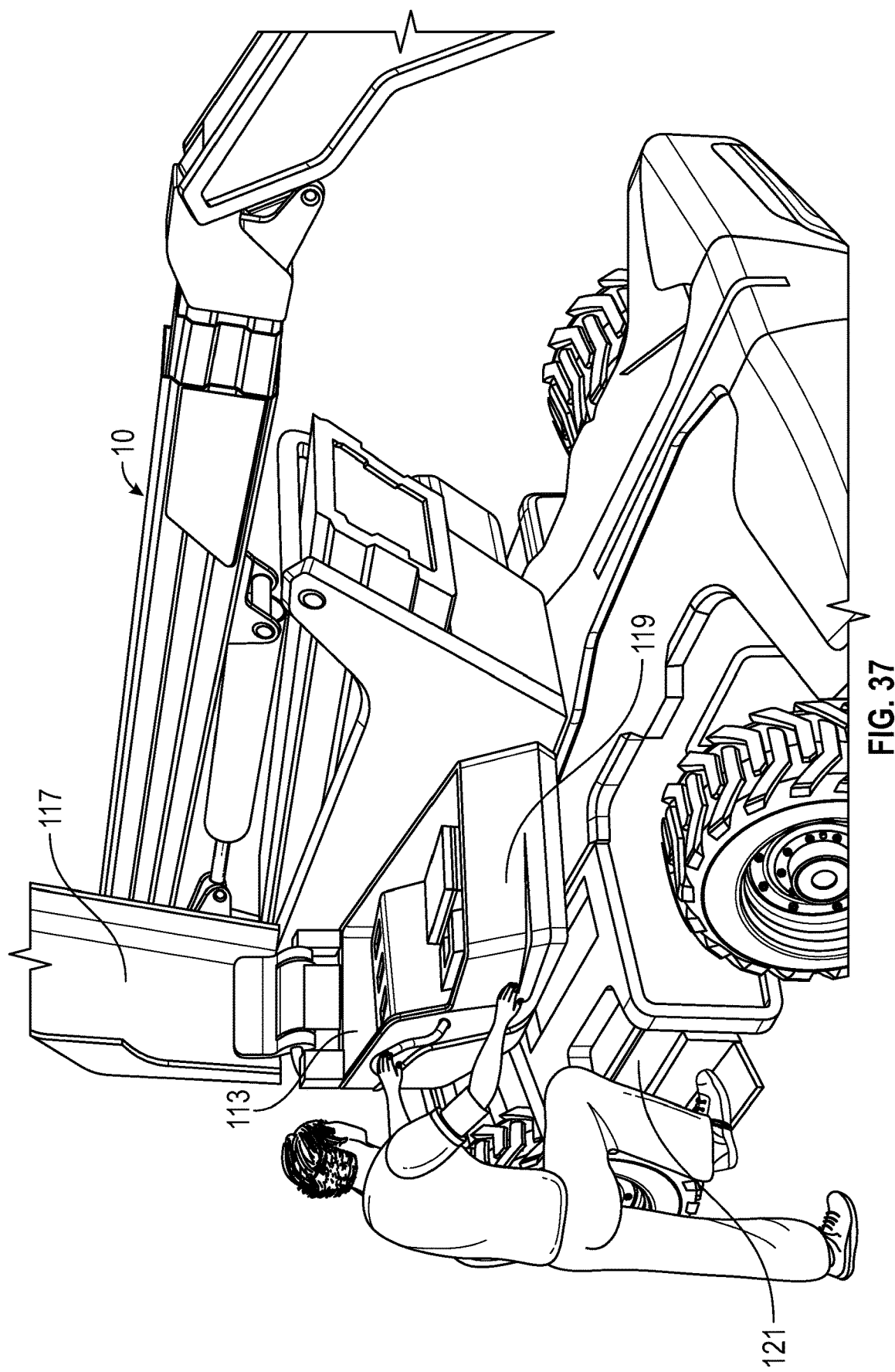
FIG. 37 is another perspective view of the lift device of FIG. 34 including a deployable storage compartment in a deployed position, according to an exemplary embodiment.
Figure 38:
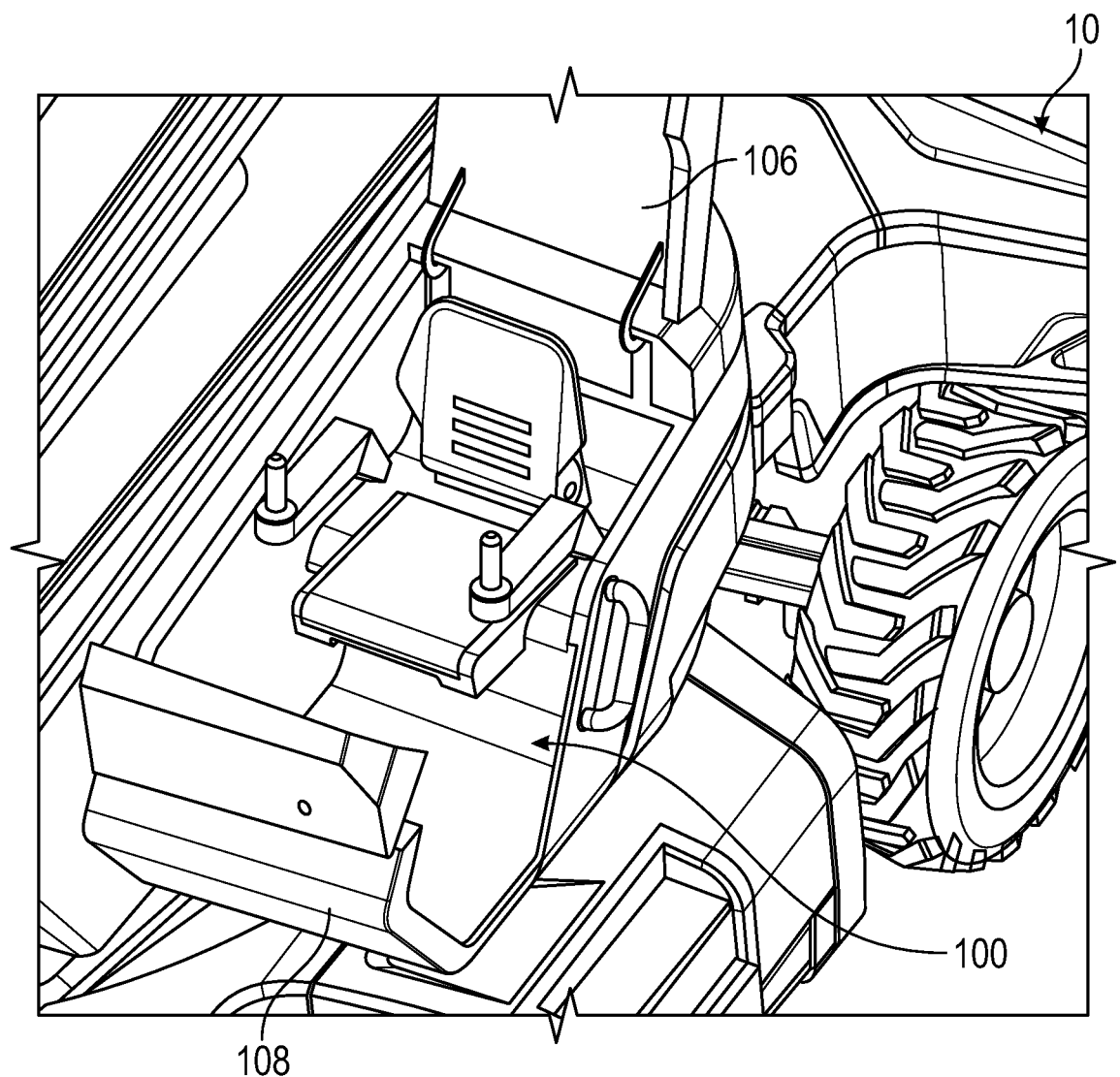
FIG. 38 is a top perspective view of the lift device of FIG. 34, depicting an interior of the deployable operator station, according to an exemplary embodiment.
Figure 39:
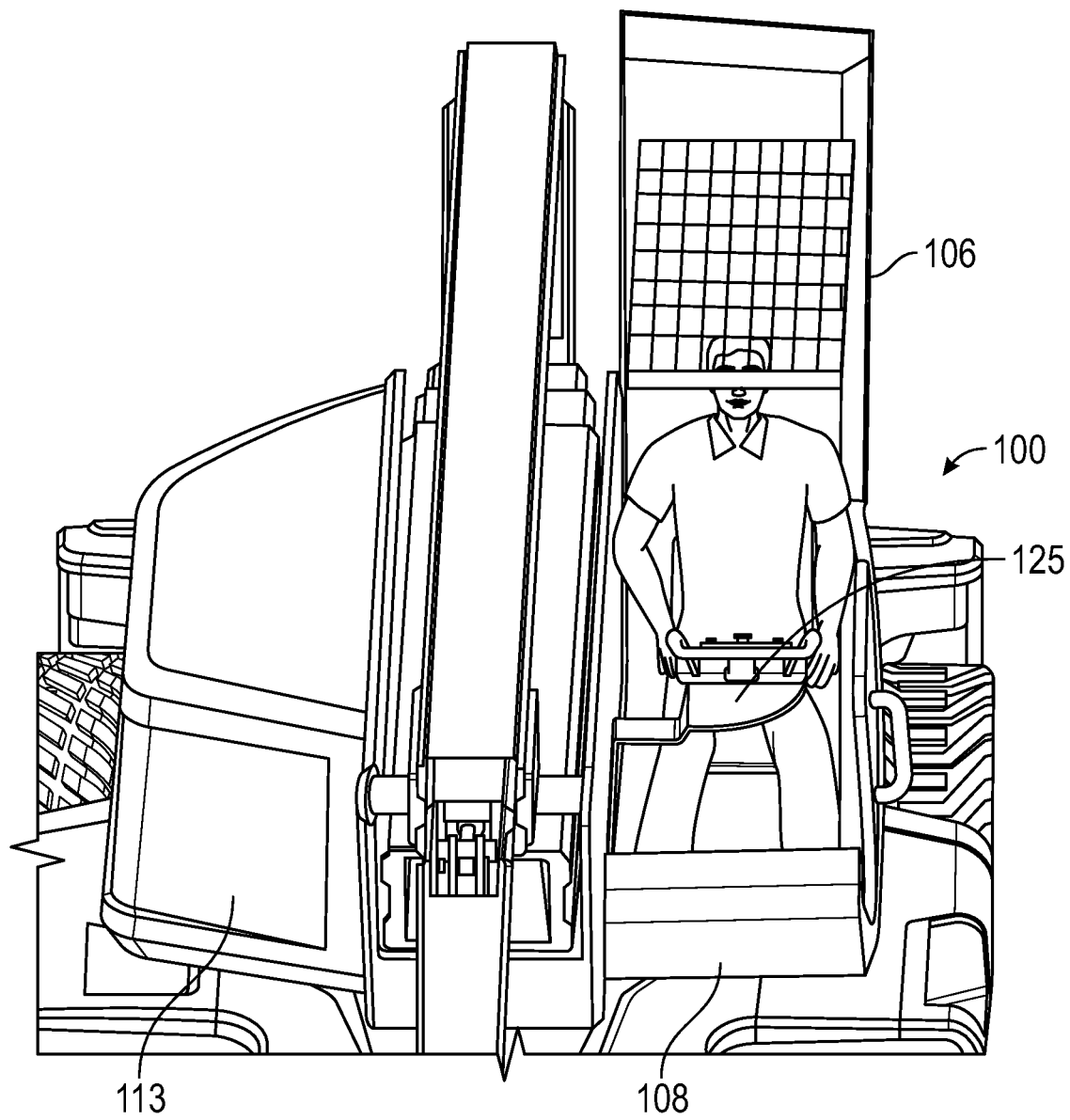
FIG. 39 is a front perspective view of the lift device of FIG. 34, depicting an operator present within the deployable operator station, according to an exemplary embodiment.
Figure 40:
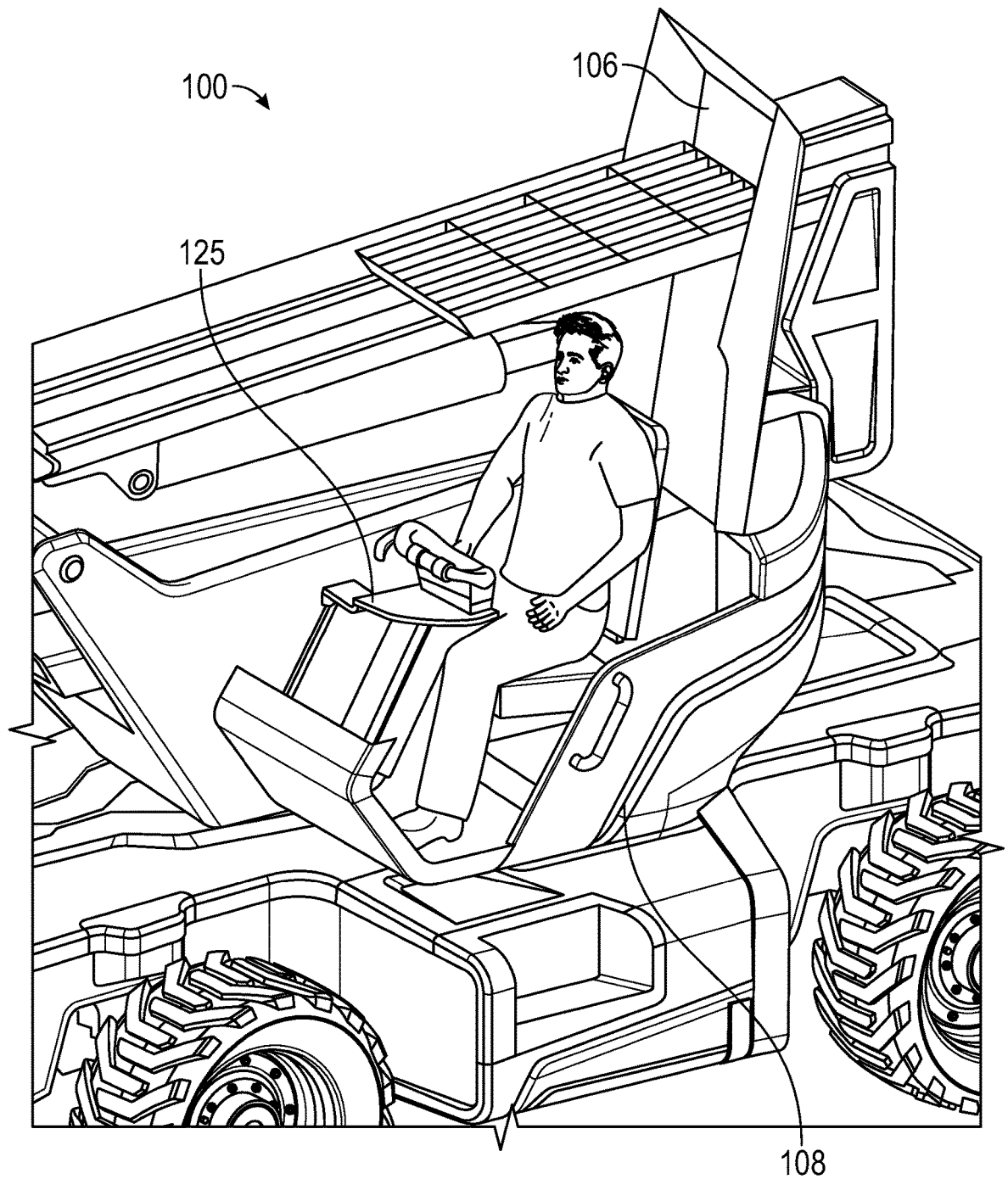
FIG. 40 is another front perspective view of the lift device of FIG. 34, according to an exemplary embodiment.

In addition to the deployable operator station 100, the lift device 10 can include a deployable or selectively accessible storage compartment 113. As depicted in FIGS. 37 and 39, the storage compartment 113 is generally configured like the operator station 100, with a first shell member 117 that is rotatably and/or hingedly coupled to a second shell member 119. The first shell member 117 and second shell member 119 together define the storage compartment 113, which can be used to hold tools, fuel, food, and/or other necessary materials for performing tasks at a jobsite. The storage compartment 113 can be incorporated into versions of the lift device 10 that do not include an engine (e.g., versions that are fully battery powered, etc.).

In some examples, and as shown in FIGS. 34-35 and 37-40, the lift device 10 includes one or more sets of steps 121 to help a user board the operator station 100 or access the storage compartment 113. The steps 121 can be positioned on one or both sides of the lift device 10, and can be directly mounted to or otherwise formed in the base assembly 12. The steps 121 extend downward, toward the ground below the lift device 10. Alternatively, the steps 121 can be selectively deployed. For example, the steps 121 can be part of a retractable assembly that only extends downward when the first shell member 106 is in the open or deployed position. When the first shell member 106 is transitioned to the back to the tucked or stowed position, the steps 121 can automatically retract inward, to reduce the outer perimeter of the lift device 10 and further restrict unauthorized access or tampering with the deployable operator station 100 or the storage compartment 113, since these components are elevated off the ground. In some examples, a button or switch can be positioned within the deployable operator station 100 so that a user within the operator station 100 can retract the steps 121 once the user is properly positioned within the operator station 100. In some embodiments, a seat 124 within the operator station 100 includes a sensor (e.g., a pressure sensor, switch, load sensor, etc.) that detects a load upon the seat 124. When a load is detected on the seat 124 (which would correspond to a user being seated within the operator station 100), the steps 121 will retract. When no load is detected, the steps 121 deploy (or remain deployed) to allow a user to enter or exit the operator station 100 easily.

Referring particularly to FIG. 2, deployable operator station 100 can include the first frame assembly 102, and a second frame assembly 104 (e.g., a falling object protective structure, FOPS, an overhead protective structure, etc.). First frame assembly 102 can be rotatably or pivotally coupled with base assembly 12 (e.g., with frame 20) at a first end, and pivotally or rotatably coupled with second frame assembly 104 at a second or distal end. Second frame assembly 104 may be configured to rotate or pivot about an axis 120 relative to first frame assembly 102. In this way, first frame assembly 102 and second frame assembly 104 may rotate or pivot relative to base assembly 12 about axis 122 while second frame assembly 104 can be configured to rotate or pivot relative to first frame assembly 102 about axis 120 as deployable operator station 100 is transitioned between the deployed position and the tucked/stowed position. Deployable operator station 100 can also include a seat 124.

Referring particularly to FIG. 3, lift device 10 can include a rotator assembly, a platform rotator assembly, a turntable, etc., shown as turntable assembly 800. Turntable assembly 800 can include a turntable member 803 that is configured to pivot or rotate about a central axis 62. Lift apparatus 14 can be coupled with base assembly 12 through turntable assembly 800 to facilitate rotation of lift apparatus 14 relative to base assembly 12 about central axis 62. In particular, support member 50 can be fixedly coupled with turntable member 803 so that lift apparatus 14 can be rotated or pivoted about central axis 62 relative to frame 20. Deployable operator station 100 can be positioned on turntable member 803 so that rotation of turntable member 803 relative to base assembly 12 or relative to frame 20 results in rotation of deployable operator station 100 relative to frame 20.

Referring still to FIG. 3, turntable assembly 800 can include a platform rotator, a motor, an electric motor, etc., shown as turntable motor 64. Turntable motor 64 is shown as an electric motor that can consume electrical energy from energy storage device 40 to generate rotational kinetic energy to drive turntable member 803 to rotate relative to frame 20. Turntable motor 64 can also be an internal combustion engine, a hydraulic motor, a pneumatic motor, etc., or any other primary mover. In some embodiments, turntable motor 64 receives control signals from controller 200 so that controller 200 operates turntable motor 64 (e.g., to rotate turntable assembly 800 a predetermined or desired angular amount based on a user input or a user request). Turntable motor 64 can be configured to drive turntable member 803 through a gear box, a transmission, a spur gear, a ring gear, a worm gear, etc., or any other gear or power transmitting configuration or combination thereof. Rotation of turntable assembly 800 relative to frame 20 can facilitate access of elevated locations that are angularly offset relative to lift device 10.

Referring particularly to FIGS. 5-9, a portion of deployable operator station 100 is shown in greater detail, according to an exemplary embodiment. Deployable operator station 100 includes a frame, a base, a support structure, etc., shown as support structure 110. Support structure 110 is fixedly coupled with base assembly 12 or with frame 20 and provides structural support for deployable operator station 100. Support structure 110 can vertically extend a distance from a planar member 111. Support structure 110 can be formed from multiple structural members that are stacked and have various widths. Support structure 110 is configured to support first frame assembly 102 and second frame assembly 104.

First frame assembly 102 is hingedly or pivotally coupled with support structure 110 so that first frame assembly 102 can rotate or pivot about axis 122 relative to support structure 110. As shown in FIGS. 12-16, first frame assembly 102 can include a first frame member, a first elongated member, etc., shown as first member 112a and a second frame member, a second elongated member, etc., shown as second member 112b. First member 112a and second member 112b are laterally offset a distance 130 from each other. First frame member 112a and second frame member 112b are each pivotally or rotatably coupled with support structure 110 at a first end and pivotally or rotatably coupled with second frame assembly 104 at an opposite or distal end. First frame member 112a and second frame member 112b may each be pivotally coupled with support structure 110 through a pin 134. First frame assembly 102 can also include one or more laterally extending frame members 132 that extend between first frame member 112a and second frame member 112b. Laterally extending frame members 132 can provide additional structural support for first frame assembly 102.

First frame member 112a and second frame member 112b are each fixedly coupled or integrally formed with a corresponding connecting member 118. Specifically, first frame member 112a is fixedly coupled or integrally formed with a first connecting member 118a and second frame member 112b is fixedly coupled or integrally formed with a second connecting member 118b. First frame assembly 102 is pivotally or hingedly coupled with second frame assembly 104 through first connecting member 118a and second connecting member 118b. First frame assembly 102 is pivotally or hingedly coupled with support structure 110 through pins 134 at a first end of frame members 112a-112b and pivotally or hingedly coupled with second frame assembly 104 through connecting members 118a-118b at a second or distal end of frame members 112a-112b.

Figure 12:
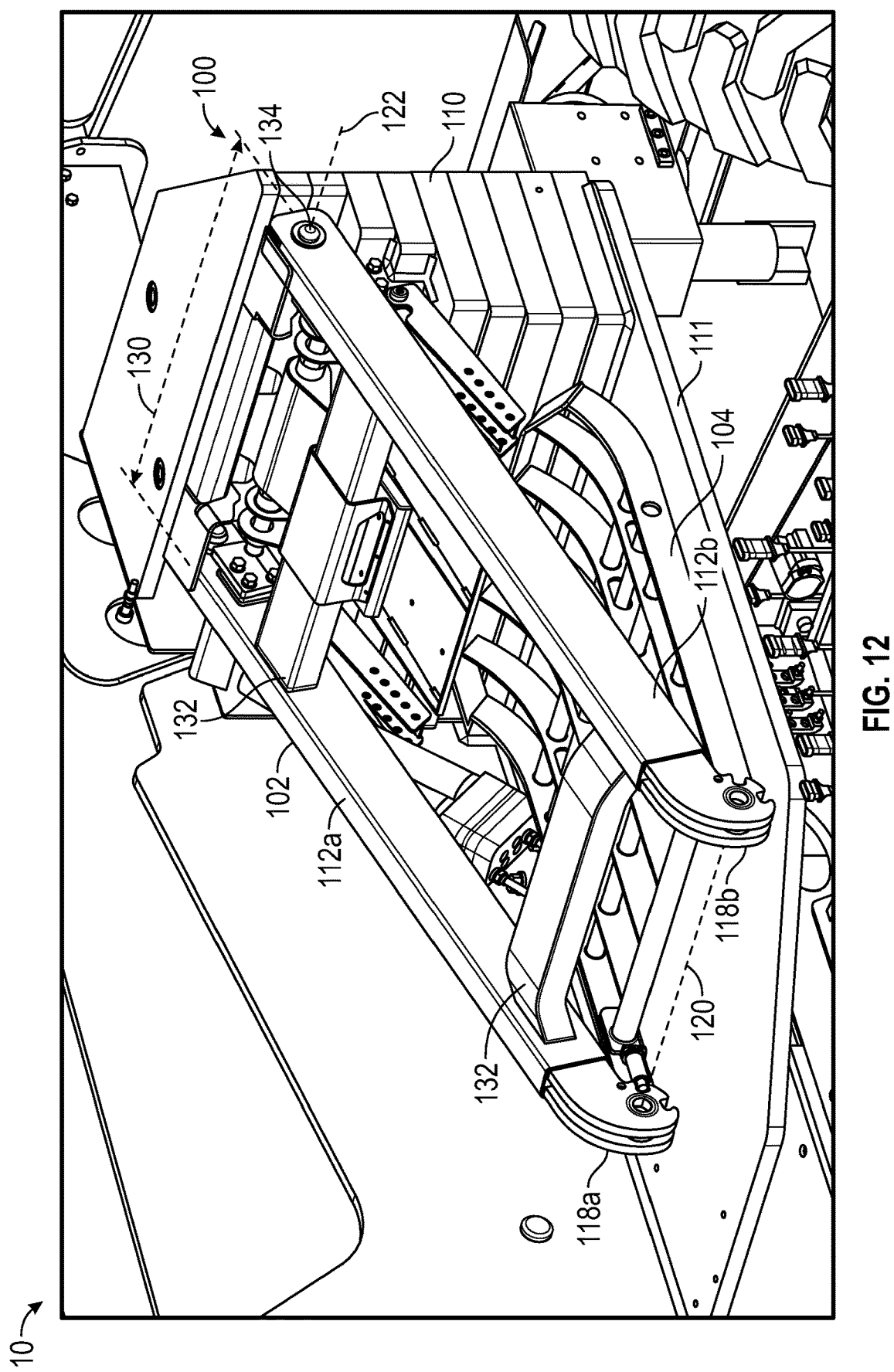
FIG. 12 is perspective view of the deployable operator station of the lift device of FIG. 1 including a first frame assembly and a second frame assembly, according to an exemplary embodiment.
Figure 13:
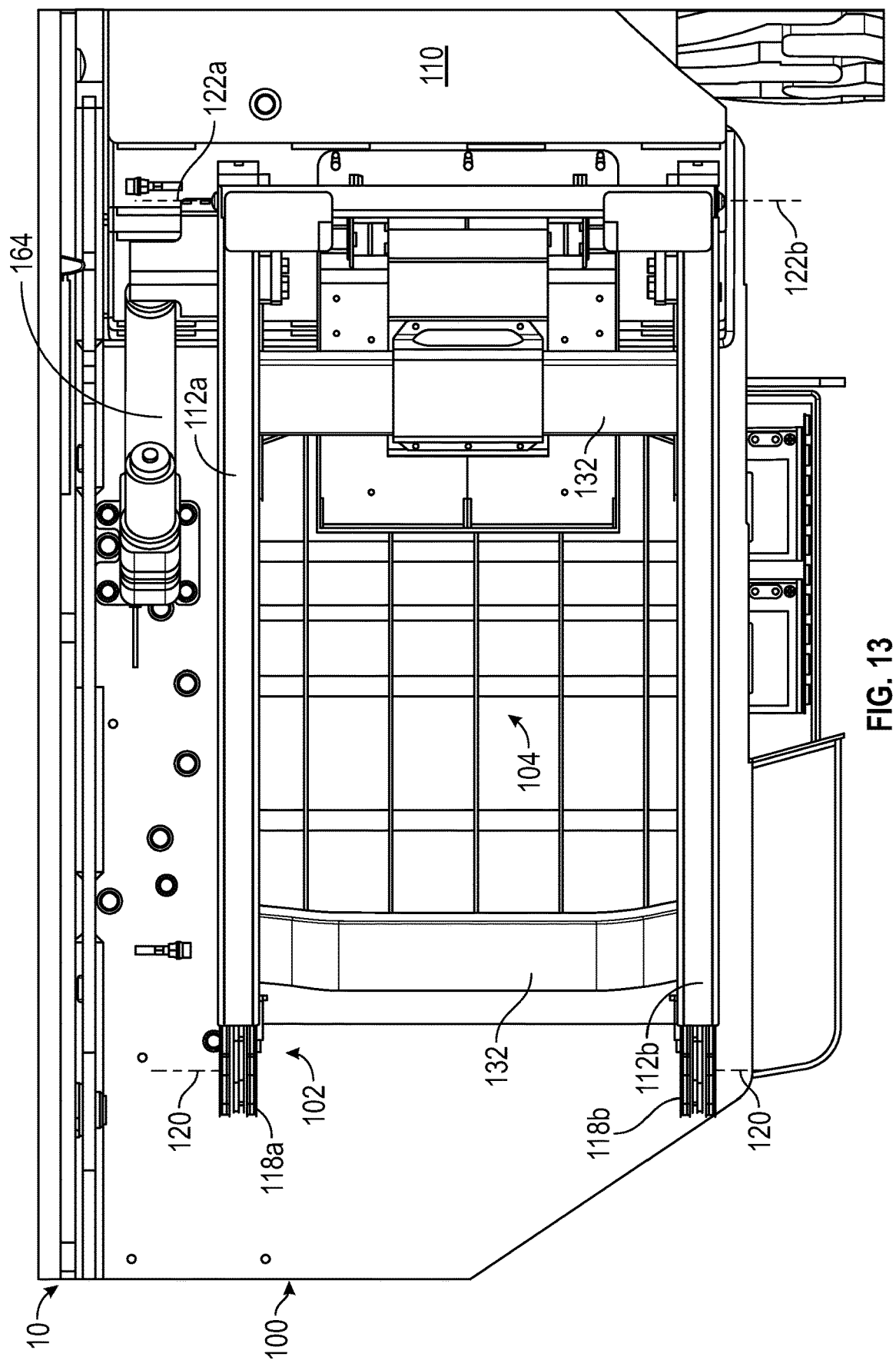
FIG. 13 is a top view of the deployable operator station of the lift device of FIG. 1, according to an exemplary embodiment.
Figure 14:
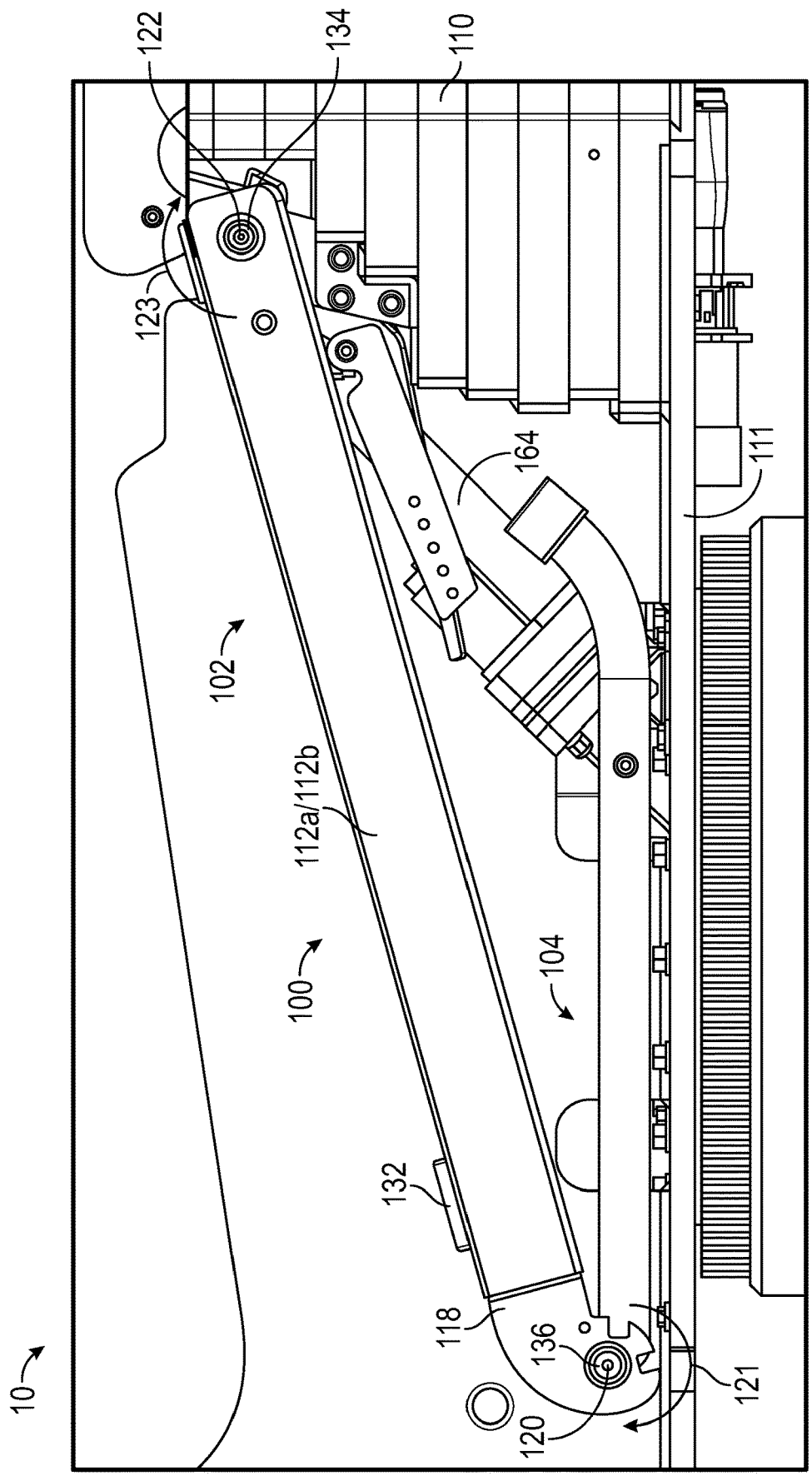
FIG. 14 is a side view of the deployable operator station of the lift device of FIG. 1 in a stowed or tucked position, according to an exemplary embodiment.
Figure 15:
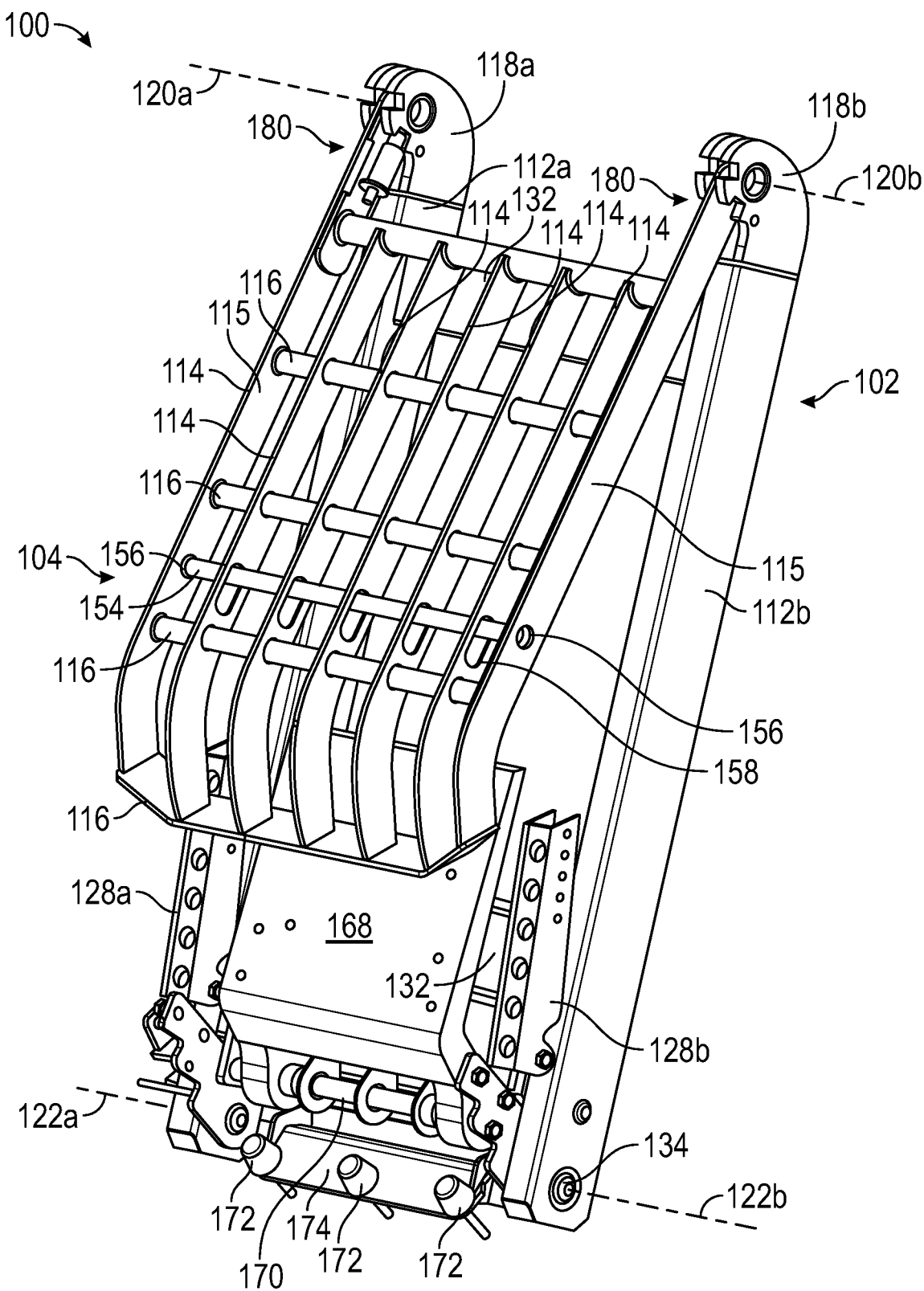
FIG. 15 is a perspective view of a portion of the deployable operator station of the lift device of FIG. 1 in a partially deployed position, according to an exemplary embodiment.
Figure 16:
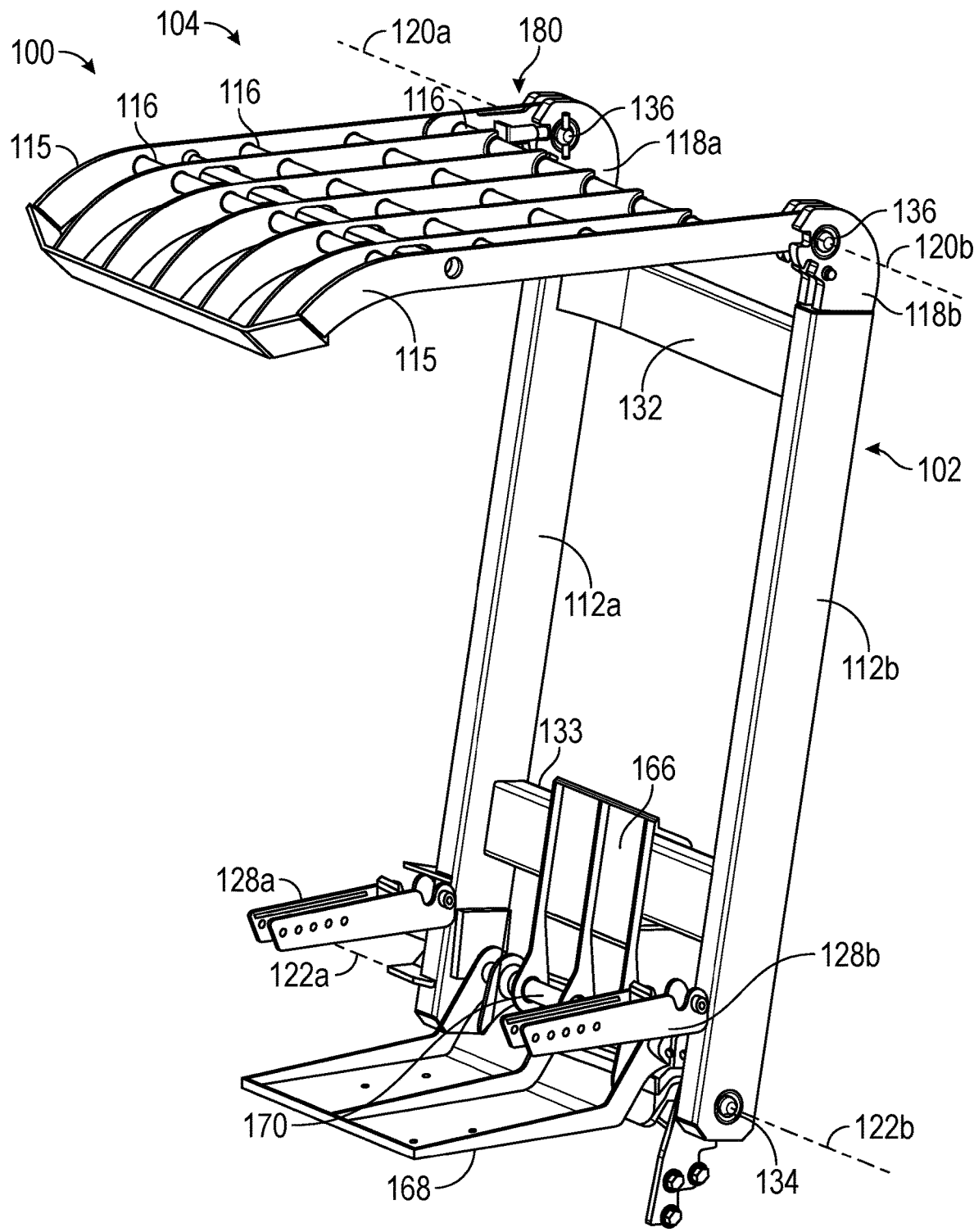
FIG. 16 is a perspective view of a portion of the deployable operator station of the lift device of FIG. 1 in a deployed position, according to an exemplary embodiment.
Figure 17:
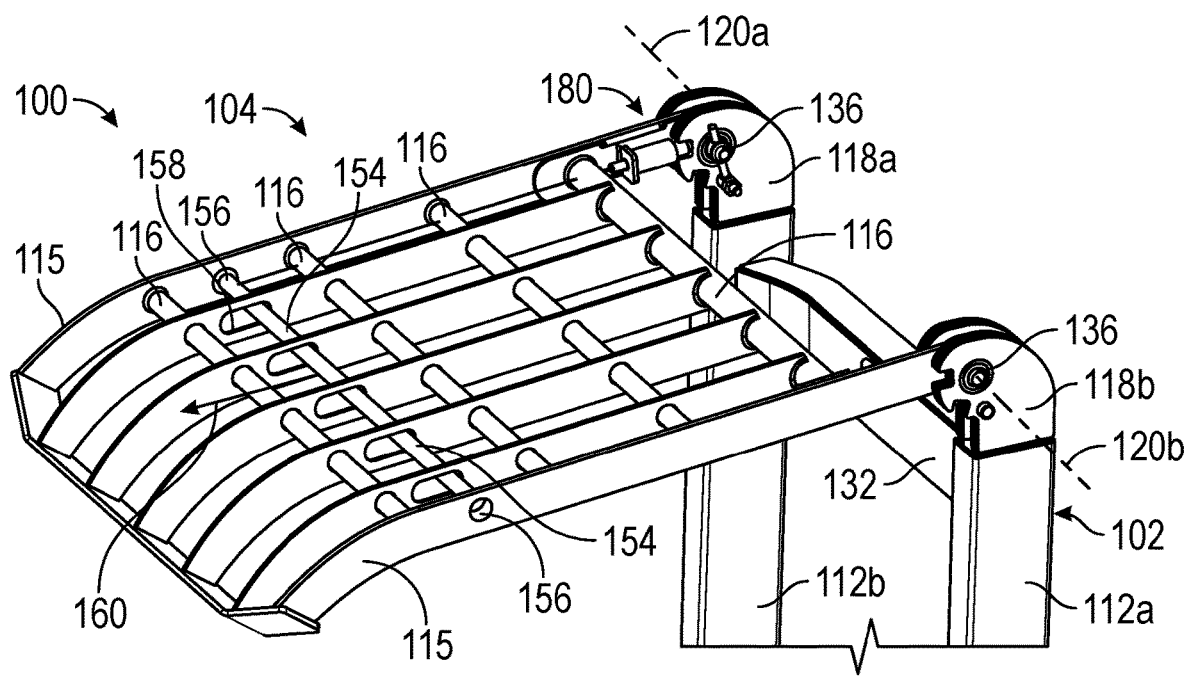
FIG. 17 is a perspective view of a portion of the deployable operator station of the lift device of FIG. 1 including an engagement mechanism, according to an exemplary embodiment.

Referring particularly to FIGS. 14-18, connecting members 118 each include a corresponding pin, cylindrical member, rotatable member, interfacing member, etc., shown as pin 136. Pin 136 may define axis 120 about which second frame assembly 104 rotates or pivots relative to first frame assembly 102. Connecting members 118 can each include parallel or laterally offset members between which a corresponding portion of second frame assembly 104 extends. The corresponding portion of second frame assembly 104 may rotatably couple with first frame assembly 102 through connecting members 118. Deployable operator station 100 also includes an engagement mechanism 180 that is configured to selectably lock or limit relative rotation between first frame assembly 102 and second frame assembly 104. Engagement mechanism 180 can be transitioned between a locked position or state and an unlocked or disengaged position or state through a user input. Engagement mechanism 180 facilitates locking angular orientation of second frame assembly 104 relative to first frame assembly 102 at various predetermined positions (e.g., at a stowed or tucked angular position of second frame assembly 104 relative to first frame assembly 102 as shown in FIGS. 12, 14 and 15, and a deployed angular position or second frame assembly 104 relative to first frame assembly 102 as shown in FIGS. 16-17).

Referring particularly to FIGS. 15-17, second frame assembly 104 includes one or more frame members 114 and one or more laterally extending frame members 116. Laterally extending frame member 116 may have a square or circular cross-sectional shape and can provide additional structural support for frame members 114. In some embodiments, each frame member 114 includes a corresponding aperture through which laterally extending frame member 116 extend. As shown in FIG. 15, a pair of outermost members 115 of the frame members 114 are received within connecting members 118 and rotatably or pivotally couple with connecting members 118 through pins 136. The members 114 that are between outermost members 115 can each include a slot 158 along which a bar, beam, elongated member, etc., of engagement mechanism 180, shown as bar 154 can extend and translate. Frame members 114 may be evenly laterally spaced between outermost members 115. Outermost members 115 can also each include an opening, aperture, hole, bore, etc., shown as aperture 156 into which bar 154 can be inserted and stored (e.g., by a user, an operator, a technician, etc.).

Figure 18:
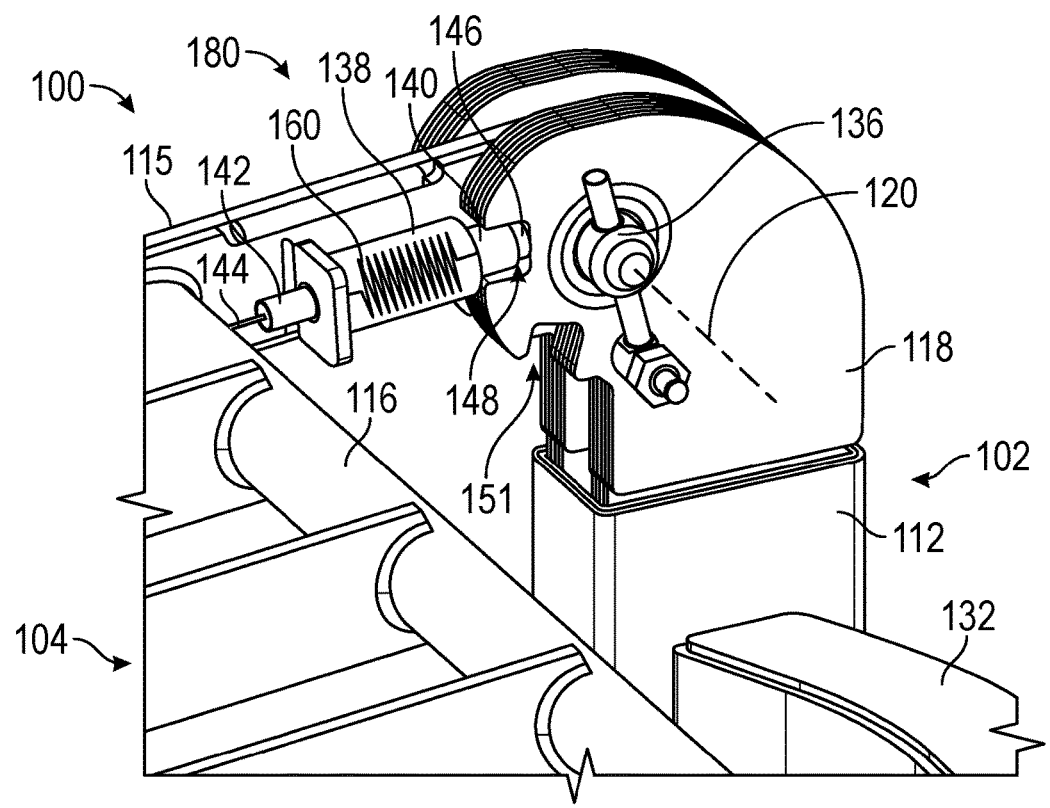
FIG. 18 is a perspective view of a portion of the engagement mechanism of FIG. 10, according to an exemplary embodiment.

Referring particularly to FIGS. 17-18, engagement mechanism 180 is shown in greater detail, according to an exemplary embodiment. Engagement mechanism 180 is configured to facilitate interlocking first frame assembly 102 and second frame assembly 104 at predetermined relative angular positions. Engagement mechanism 180 can be transitioned between an engaged or a locked state and an unlocked state through a user input at bar 154. For example, a user may translate bar 154 along slots 158 by providing a force in direction 160 on bar 154 to transition engagement mechanism 180 into the unlocked state. Once engagement mechanism 180 is transitioned into the unlocked state, the user may provide a rotational force or a torque to second frame assembly 104 to rotate second frame assembly 104 relative to first frame assembly 102 to various predetermined angular positions (e.g., a deployed angular position and a tucked or stowed angular position). Once the user has rotated the second frame assembly 104 to one of the predetermined angular positions, the user may release bar 154 to lock second frame assembly 104 at a current angular position relative to first frame assembly 102.

Referring still to FIGS. 17-18, engagement mechanism 180 includes connecting members 118. Connecting members 118 each include a first notch, a first slot, etc., shown as deployed slot 148, and a second notch, a second slot, etc., shown as stowed slot 151. Second frame assembly 104 includes a housing member, a guide member, etc., shown as guide member 138. Guide member 138 is fixedly coupled with an interior or inwards facing surface of outermost member 115 so that guide member 138 is configured to rotate or pivot with outermost member 115 as second frame assembly 104 is rotated or pivoted relative to first frame assembly 102 about axis 120. Guide member 138 includes an inner volume, a track, a channel, an opening, a hollow portion, etc., that is configured to receive a plunger, an engagement member, an interlocking member, etc., shown as plunger 140. Plunger 140 may be configured to translate or slidably couple with an interior surface or an interior periphery of guide member 138. Plunger 140 can have a circular cross-sectional shape and guide member 138 may have an inner volume with a correspondingly shaped cross-section so that plunger 140 can translate relative to guide member 138. In some embodiments, plunger 140 is configured to translate relative to guide member 138 to engage, interlock with, be positioned within, abut, contact, be received within, etc., deployed slot 148 and stowed slot 151. When plunger 140 translates into engagement with connecting member 118 at deployed slot 148 or at stowed slot 151, an angular position of second frame assembly 104 relative to first frame assembly 102 is locked or fixed.

In some embodiments, a first end 146 of plunger 140 is configured to interlock with, engage, interface with, be received within, etc., slot 148 and/or slot 151. An opposite end 142 of plunger 140 may extend outwards from an opposite side of guide member 138 and can be fixedly coupled, attached, secured, etc., with a cable, a rope, etc., shown as tensile member 144. Tensile member 144 extends in a same direction as frame members 114 or outermost members 115 of second frame assembly 104. Tensile member 144 can extend through aligned or corresponding apertures of each laterally extending frame member 116 and may be fixedly coupled with bar 154. A first end of tensile member 144 is fixedly coupled or attached with plunger 140 at opposite end 142, while a second or distal or opposite end of tensile member 144 is fixedly coupled, attached, secured, etc., with bar 154. In this way, translation of bar 154 (e.g., through a user inputting a force in direction 160) in direction 160 is transferred through tensile member 144 and translates plunger 140 relative to guide member 138 so that first end 146 of plunger 140 is translated out of engagement with deployed slot 148 or stowed slot 151. This allows a user to selectively translate plunger 140 out of engagement with connecting members 118, thereby transitioning engagement mechanism out of the locked state into the unlocked state. The user may then maintain bar 154 at the translated position and rotate second frame assembly 104 until plunger 140 is proximate a desired one of deployed slot 148 or stowed slot 151. Once second frame assembly 104 is rotated to the angular position of deployed slot 148 or stowed slot 151 as desired by the operator, the operator may release bar 154 so that plunger 140 transitions into engagement with the desired one of deployed slot 148 or stowed slot 151.

Referring particularly to FIG. 18, engagement mechanism 180 can include a spring or a resilient member, shown as spring 161. Spring 161 may bias translation of plunger 140 relative to guide member 138 in a direction so that plunger 140 engages deployed slot 148 or stowed slot 151. In this way, engagement mechanism 180 may be spring loaded so that release of bar 154 results in automatic transition of engagement mechanism 180 into the locked state (depending on a current angular position of second frame assembly 104 relative to first frame assembly 102). In some examples, the second frame assembly 104 can be vertically adjustable relative to the first member 112a and second member 112b as well. The second frame assembly 104 can include proximity sensors to detect a position of an operator within the operator station 100, and a position of the second frame assembly 104 will automatically adjust to reduce the spacing between the head of an operator to provide further security.

Referring particularly to FIG. 14, deployable operator station 100 can include a linear electric actuator 164 that is configured to deploy, rotate, drive, pivot, etc., first frame assembly 102 and second frame assembly 104 relative to support structure 110 for deployment. In particular, linear electric actuator 164 can be configured to drive first frame assembly 102 to rotate about axis 122 to partially deploy deployable operator station 100. Linear electric actuator 164 can draw electrical power from electrical energy storage devices 40 and use the electrical energy to generate linear motion. The linear motion may be transferred to first frame assembly 102 to drive first frame assembly 102 to rotate about axis 122 (e.g., in direction 123) for deployment of deployable operator station 100. For example, linear electric actuator 164 can be translationally fixedly coupled and pivotally coupled at opposite ends with support structure 110 (or planar member 111) and first frame assembly 102 (e.g., first member 112a or second member 112). In this way, extension and retraction of linear electric actuator 164 drives rotation of first frame assembly 102 and second frame assembly 104 about axis 122 for deployment or retraction/stowing. In some embodiments, controller 200 is configured to generate control signals for linear electric actuator 164 to deploy deployable operator station 100 in response to receiving a user input from HMI 500. In some embodiments, controller 200 only generates control signals to deploy deployable operator station 100 if the operator or user provides credentials (e.g., via the HMI 500) that indicate that the user has access. In other embodiments, the HMI is physically secured (e.g., in a locked box) so that only users with keys to access the HMI can deploy deployable operator station 100.

Referring still to FIG. 14, second frame assembly 104 may be manually rotated about axis 120 for complete deployment of deployable operator station 100. For example, deployable operator station 100 may be automatically partially deployed (e.g., through operation of linear electric actuator 164) and then fully deployed through manual actuation or translation of bar 154 and rotation of second frame assembly 104 relative to first frame assembly 102.

Referring particularly to FIG. 16, deployable operator station 100 can include a seatback 166, a first armrest 128a, a second armrest 128b, and a seat pan 168. Seatback 166 can be fixedly coupled with laterally extending frame member 133. In some embodiments, seatback 166 and laterally extending frame member 133 are both rotatably coupled with a laterally extending member 170 that extends between first member 112a and second member 112b. In this way, seatback 166 and laterally extending frame member 133 can be pivoted or rotated (e.g., automatically through operation of an electric motor, a linear electric actuator, etc.) between a deployed position and a tucked position. In other embodiments, laterally extending frame member 133 is fixedly coupled or integrally formed with first member 112a and second member 112b.

Figure 8:
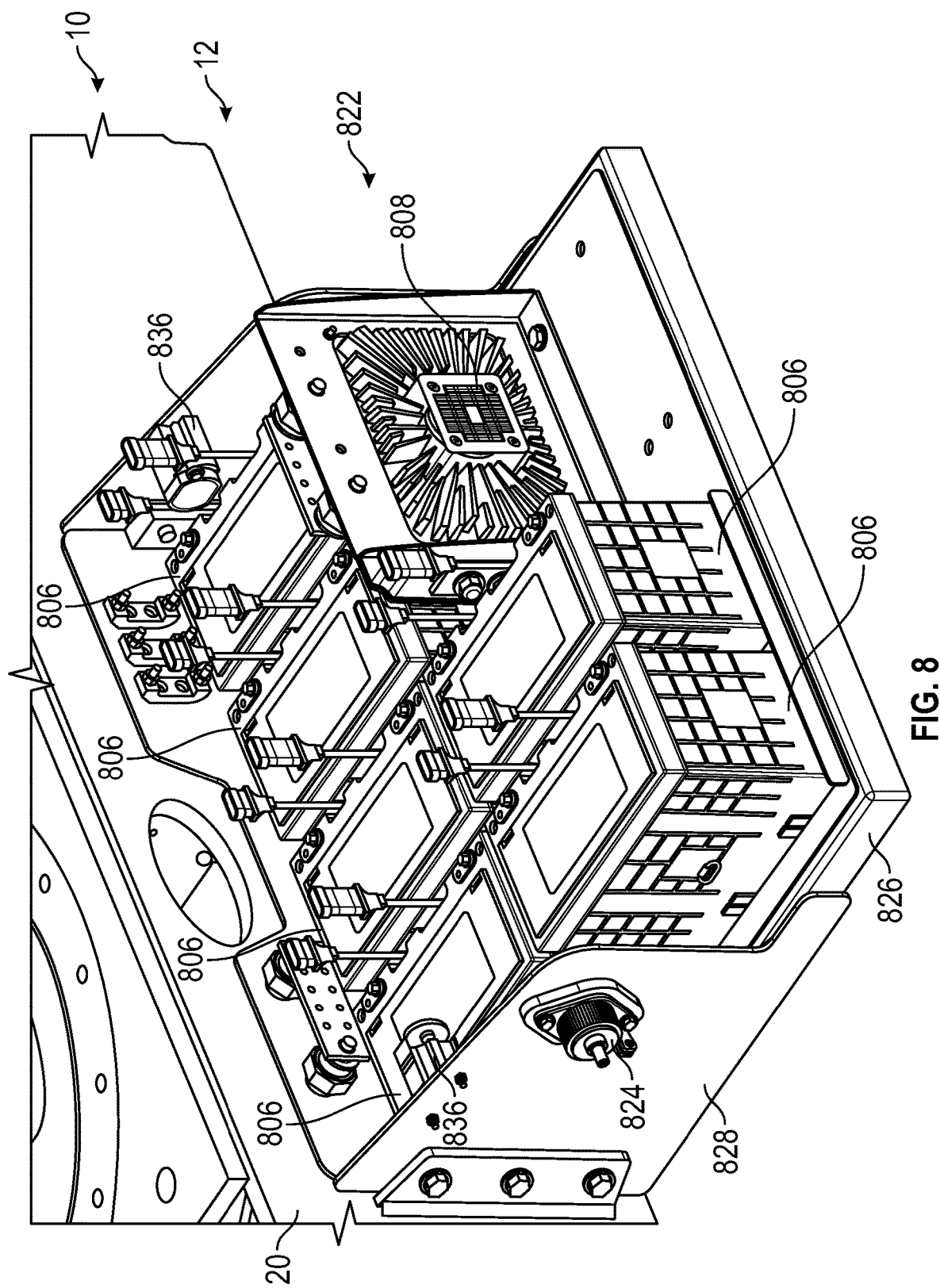
FIG. 8 is a perspective view of a battery storage portion of the base assembly of the lift device of FIG. 1, according to an exemplary embodiment.
Figure 9:
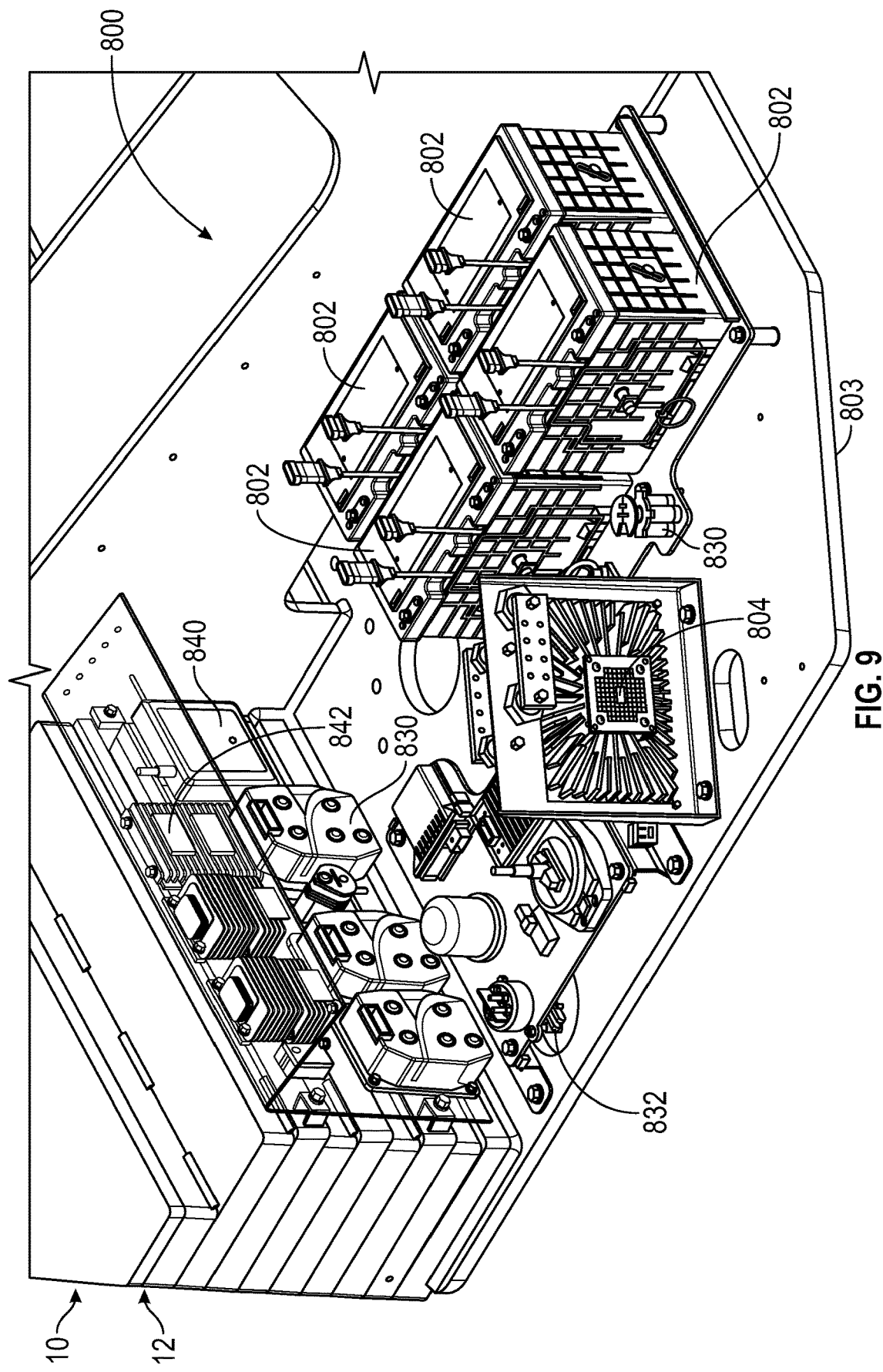
FIG. 9 is a perspective view of a battery storage portion of the base assembly of the lift device of FIG. 1, according to an exemplary embodiment.

Referring still to FIG. 16, first armrest 128a and second armrest 128b may be hingedly, pivotally, or rotatably coupled with first frame member 112a and second frame member 112b, respectively. First armrest 128a and second armrest 128b may be rotatable or pivotable between a deployed position (as shown in FIG. 9) and a tucked or stowed position (as shown in FIG. 8). In some embodiments, first armrest 128a and second armrest 128b are configured to be transitioned between the deployed position and the tucked or stowed position manually (e.g., by a user) or may be automatically transitioned between the deployed position and the tucked or stowed position automatically (e.g., by operation of a corresponding linear electric actuators or electric motors that may receive control signals generated by controller 200 in response to receiving a user input via HMI 500).

Referring still to FIG. 16, seat pan 168 can be rotatably or pivotally coupled with laterally extending member 170 and may be transitionable between a deployed position (as shown in FIG. 16) and a tucked or stowed position (as shown in FIG. 15). Seat pan 168 can be transitioned manually between the deployed position and the tucked or stowed position or may be automatically transitioned between the tucked or stowed position and the deployed position (e.g., through operation of a linear electric actuator).

Referring particularly to FIG. 15, deployable operator station 100 can include multiple rubber members, rubber stoppers, absorbing members, etc., shown as rubber stoppers 172. Rubber stoppers 172 can be positioned along (e.g., spaced along) a laterally extending frame member 174 that extends between first frame member 112a and second frame member 112b near the ends of first frame member 112a and second frame member 112b that include pins 134 (e.g., the ends of first frame member 112a and second frame member 112b that pivotally couple with support structure 110). Rubber stops 172 can be configured to engage, abut, contact, etc., a corresponding portion of a surface of seat pan 168 when seat pan 168 is transitioned into the deployed position.

Figure 20:
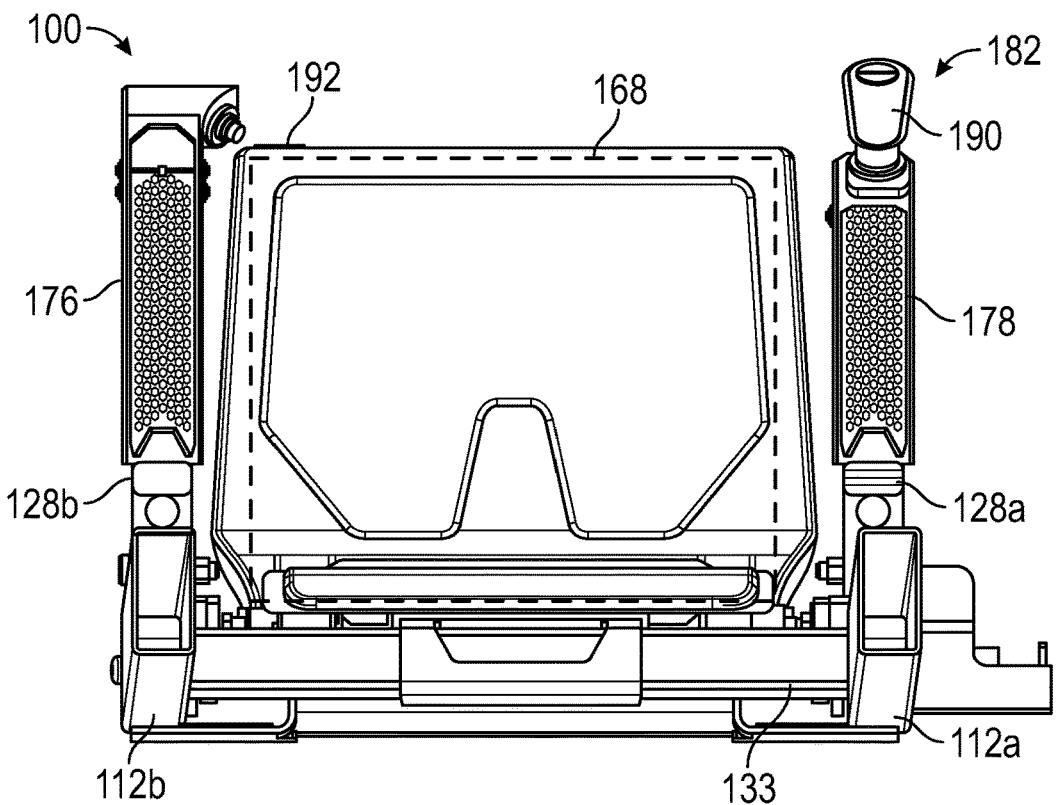
FIG. 20 is a front view of the deployable operator station of the lift device of FIG. 1, according to an exemplary embodiment.

Referring particularly to FIG. 20, a portion of deployable operator station 100 is shown in greater detail. FIG. 20 specifically shows a seating arrangement of deployable operator station 100. Seat pan 168 can be covered with a cushion or a padding 192 to facilitate user comfort when seated. First armrest 128a includes a cover, a rest member, etc., shown as rest member 178. Rest member 178 may be a rigid or flexible material that provides an area for an operator to rest their arm.

Figure 21:
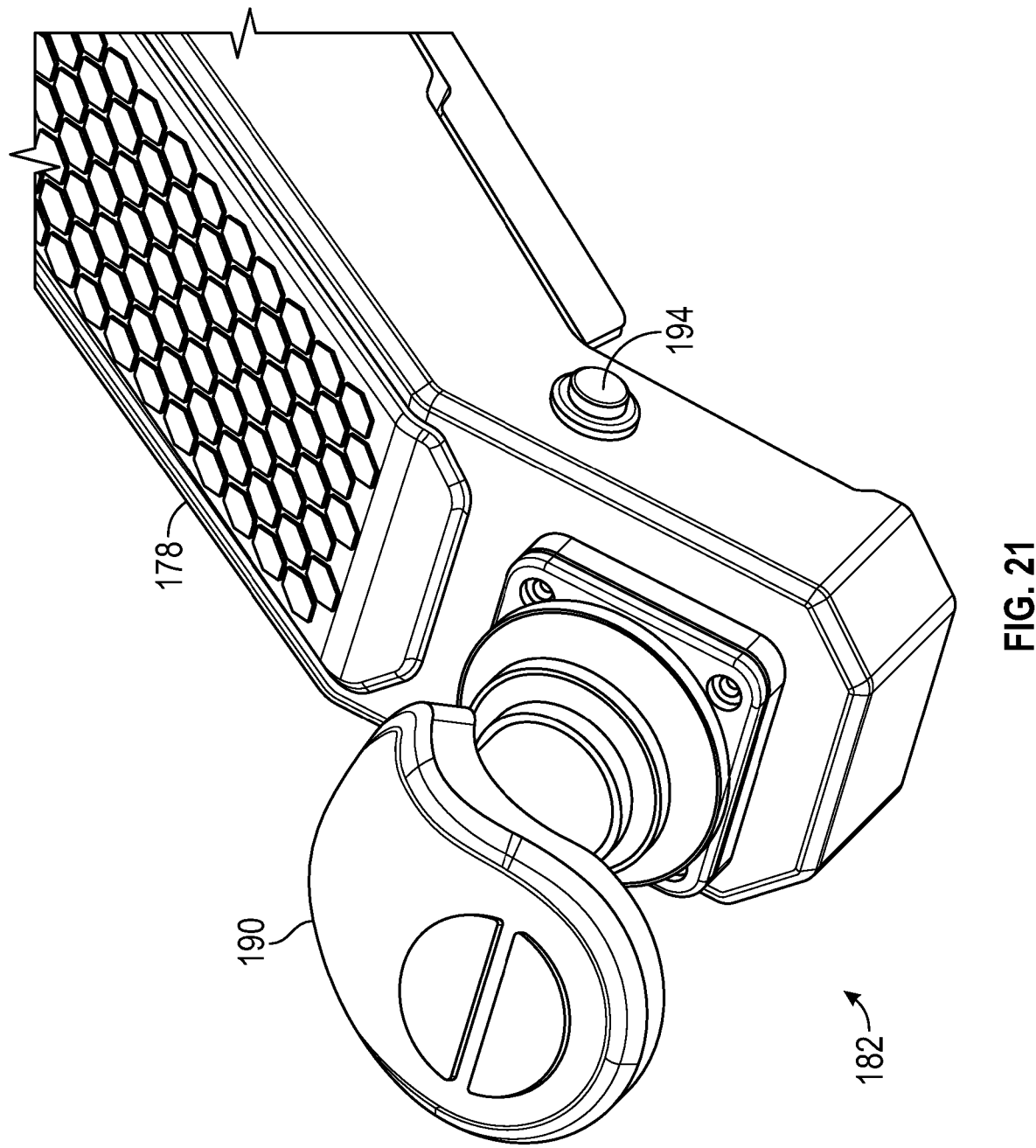
FIG. 21 is a perspective view of an armrest of the deployable operator station of the lift device of FIG. 1, according to an exemplary embodiment.

Referring particularly to FIGS. 20 and 21, first armrest 128a may include a joystick or a pivotable user input device, shown as joystick 190. Joystick 190 is a user input device that is configured to pivot relative to first armrest 128a to operate lift apparatus 14. In some embodiments, first armrest 128a is an armrest for a user's right hand so that the user can operate lift apparatus 14 with their right hand. Joystick 190 may be pivoted or rotated by the user and can generate input signals for controller 200. Controller 200 receives the input signals from joystick 190 and operates lift apparatus 14 (e.g., the various controllable elements or linear electric actuators that are configured to raise or lower lift apparatus 14) according to the input signals obtained from joystick 190.

Referring still to FIGS. 20 and 21, first armrest 128a may include a lever twist input device 194. In some embodiments, lever twist input device 194 is configured to receive a user input (e.g., to rotate between various predetermined selections or positions) to select a different function of lift apparatus 14 or to select a different function of joystick 190. For example, when lever twist input device 194 is in a first position, joystick 190 may operate lift apparatus 14, or operate a first function of lift apparatus 14, while in a second position, joystick 190 may be used to operate a different subsystem or system of lift device 10 or may operate a second function of lift apparatus 14. As shown in FIG. 20, joystick 190 can be positioned at an outer end 182 of first armrest 128a.

Figure 19:
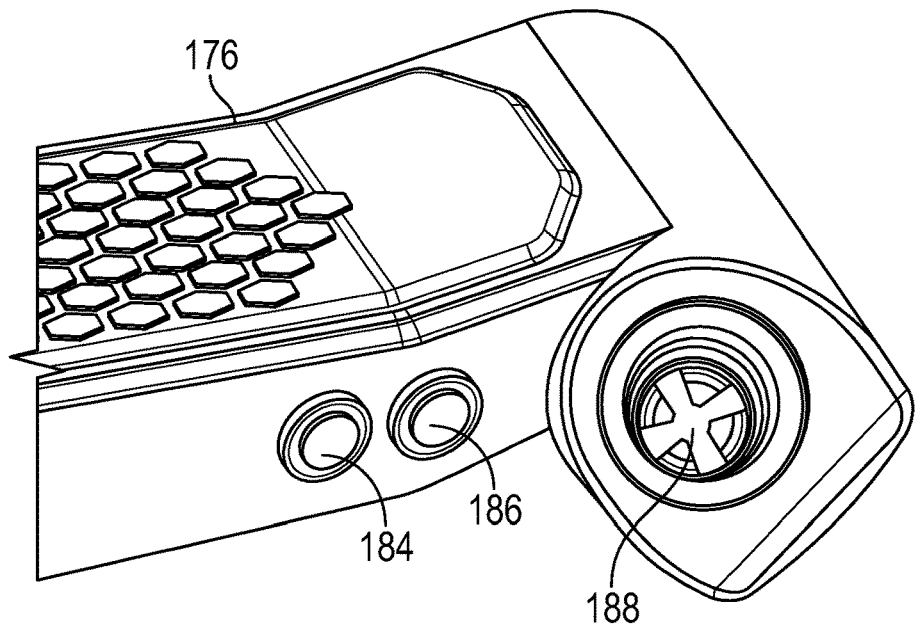
FIG. 19 is a perspective view of an armrest of the deployable operator station of the lift device of FIG. 1, according to an exemplary embodiment.

Referring particularly to FIGS. 20 and 19, second armrest 128b includes a driving and steering joystick 188, a drive and steer enable switch 186, and a button 184. Driving and steering joystick 188 can be a thumb joystick that is configured to be operated or pivoted by a user's thumb. In some embodiments, driving and steering joystick 188 is the same as or similar to joystick 190. For example, driving and steering joystick 188 can be actuated or pivoted by the user's thumb and may generate input signals for controller 200. Controller 200 can use the input signals to generate control signals for electric motor 24 or a driving system and/or steering system of lift device 10 that drives tractive elements 22 for driving and/or steering operations. The user may actuate drive and steer enable switch 186 to generate input signals for controller 200 to activate or deactivate driving and steering operations of lift device 10.

Figure 22:
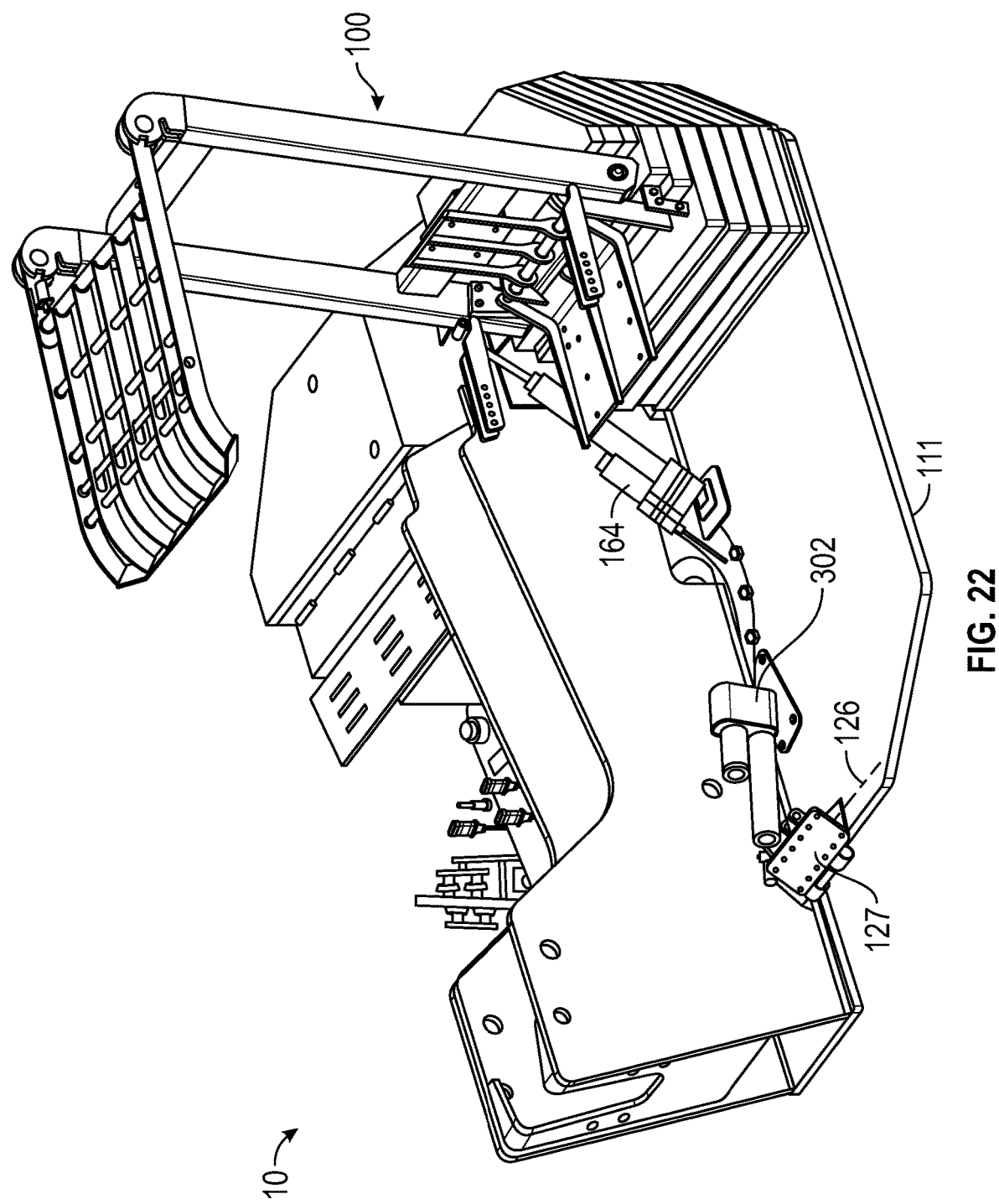
FIG. 22 is a perspective view of a portion of the deployable operator station of the lift device of FIG. 1 including a linear electric actuator that pivots a hood member, according to an exemplary embodiment.
Figure 23:
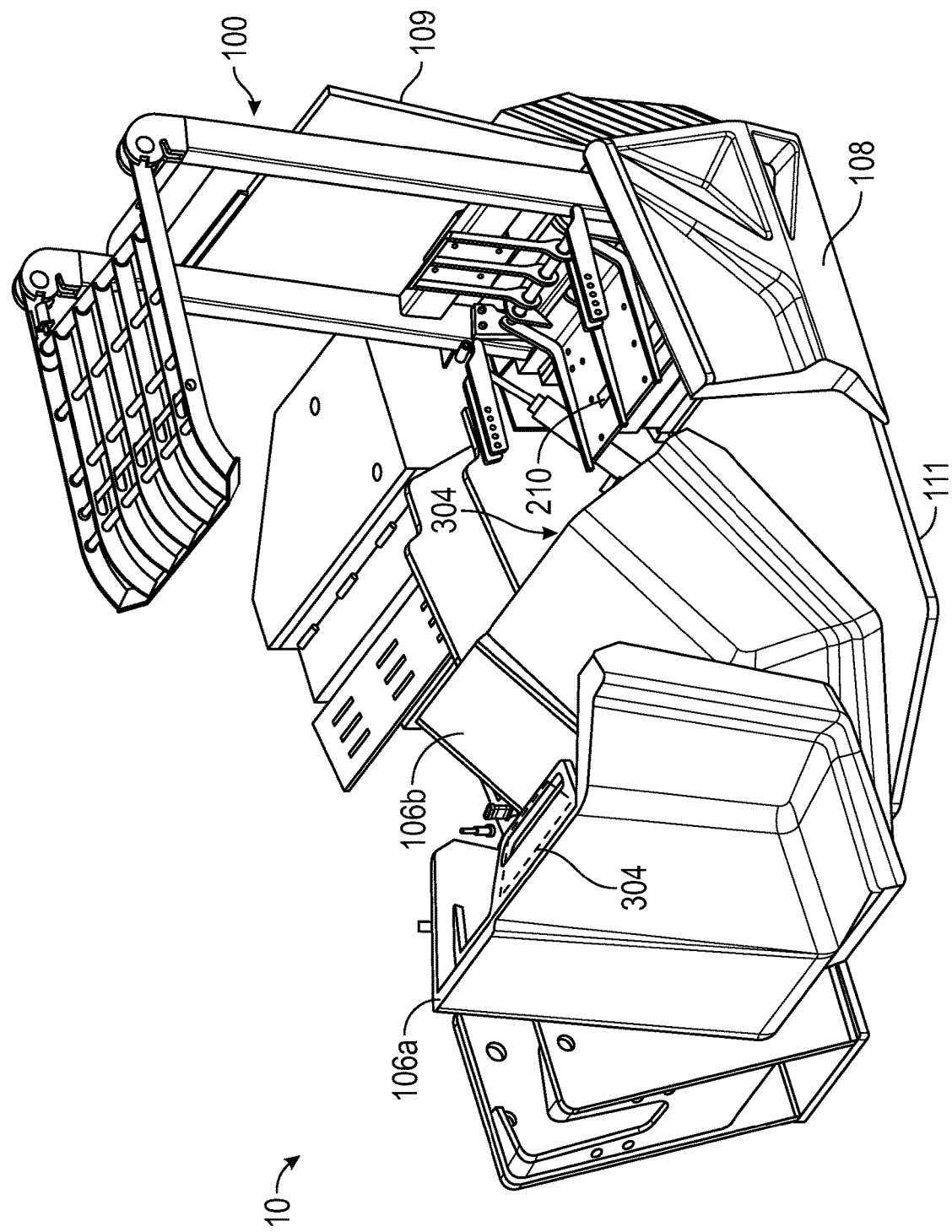
FIG. 23 is a perspective view of a portion of the deployable operator station of the lift device of FIG. 1, including the hood member, according to an exemplary embodiment.

Referring particularly to FIGS. 22 and 23, deployable operator station 100 can include a linear electric actuator 164 that is configured to drive first shell member 106 to pivot or rotate relative to base assembly 12 about axis 126. First shell member 106 may be supported by and hingedly couple with base assembly 12 through a support structure 127 that fixedly couples with planar member 111 and includes a corresponding engagement portion that fixedly couples with first shell member 106. Support structure 127 can include a hinged coupling therebetween to facilitate rotation of first shell member 106 about axis 126. As shown in FIG. 23, first shell member 106 can be driven by linear electric actuator 302 to rotate between various angular positions (e.g., a deployed position and a tucked or stowed position), as represented by reference numbers 106a and 106b. Extension of linear electric actuator 302 may cause first shell member 106 to rotate or pivot about axis 126 in a first direction for deployment of deployable operator station 100, while retraction of linear electric actuator 302 causes first shell member 106 to rotate about axis 126 in a second direction for stowing deployable operator station 100.

Figure 24:
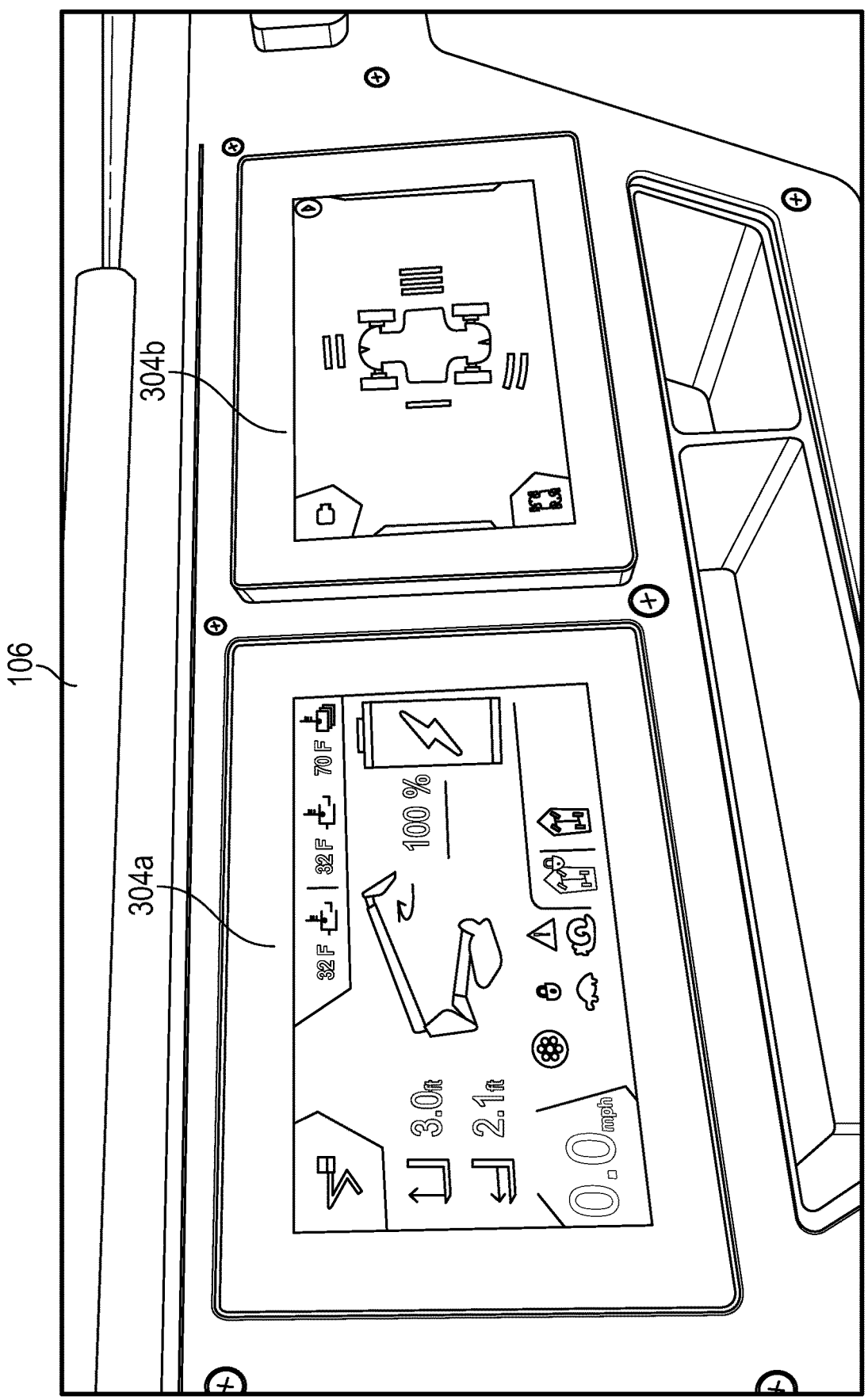
FIG. 24 is a perspective view of various display screens that may be positioned at the deployable operator station of the lift device of FIG. 1, according to an exemplary embodiment.

Referring particularly to FIGS. 23 and 24, deployable operator station 100 can include one or more display screens 304 (e.g., HMIs). In some embodiments, display screens 304 are configured to display various operational data of lift device 10 (e.g., elevation, position, battery status, mode, speed of travel, direction of travel, warnings, etc.). Display screens 304 can be positioned on first shell member 106 or may be otherwise positioned so that when deployable operator station 100 is deployed, the operator may view and access display screens 304. In some embodiments, display screens 304 (e.g., display screen 304a and display screen 304b) are touch screens and can be configured to generate input signals for controller 200 to control or operate various functions of lift device 10.

Split Battery Architecture

Referring particularly to FIG. 4, lift device 10 can use a split battery system 400. Split battery system 400 may be a sub-system of base assembly 12 or turntable assembly 800. Split battery system 400 includes base components 450 (e.g., electrical components such as actuators, batteries, chargers, controllers, etc., of the base assembly 12) and turntable components 460 (e.g., electrical components such as actuators, batteries, chargers, controllers, etc., of the turntable assembly 800). Base components 450 can be positioned (e.g., secured, attached, stored, fixedly coupled with, etc.) on frame 20. Turntable components 460 may be positioned (e.g., secured, attached, stored, fixedly coupled with, etc.) with turntable member 803. In some embodiments, base components 450 are stationary and are fixedly coupled with frame 20 (e.g., directly or indirectly). Turntable components 460 may be fixedly coupled with turntable member 803 so that turntable components 460 rotate or pivot with turntable member 803 relative to frame 20.

Base components 450 include a receptacle 402, a first charger 404, a second charger 406, a first battery pack 408, an inverter 410, a base control module 412, at least one traction controller 414, and at least one steering controller 416. Base control module 412 may be the same as or similar to controller 200 and can include a processing circuit, a processor, and memory. In some embodiments, base control module 412 is an MC43 control module. Base control module 412 can be configured to generate control signals for first charger 404, second charger 406, traction controllers 414, steering controllers 416, and an electrical slip ring 418. Base control module 412 can be communicably coupled with first charger 404, second charger 406, traction controllers 414, steering controllers 416, and electrical slip ring 418 through a controller area network bus (CANBUS). In some embodiments, base control module 412 is communicably coupled with first charger 404, second charger 406, traction controllers 414, and steering controllers 416 through a first CANBUS and is communicably coupled with electrical slip ring 418 through a second CANBUS.

First charger 404 can be removably coupled with receptacle 402 and may be configured to output 50 volt DC electrical power to first battery pack 408, inverter 410, traction controllers 414, and steering controllers 416. First charger 404 may also be configured to exchange 240 volt AC electrical power with receptacle 402. Second charger 406 can be configured to exchange 240 volt AC electrical power with receptacle 402 and first charger 404. Second charger 406 can also be configured to output 50 volt DC to first battery pack 408, inverter 410, traction controllers 414, and steering controllers 416.

In some embodiments, first battery pack 408 is a primary, main, or large battery pack that is used by lift device 10. First battery pack 408 can be positioned on frame 20 or otherwise on base assembly 12 and may be transported with lift device 10 as lift device 10 performs transportation operations. First battery pack 408 can be the same as or similar to energy storage device(s) 40. First battery pack 408 can be configured to provide inverter 410, traction controllers 414, and/or steering controllers 416 with 50 volt DC electrical energy/power to perform their respective functions. First battery pack 408 can be a 22.1 KWh battery pack and may include twelve modules (e.g., twelve battery cells).

Inverter 410 is configured to receive 50 volt DC electrical power/energy from first battery pack 408, first charger 404, or second charger 406 and convert the DC electrical power/energy to 3 KW AC electrical power/energy. Inverter 410 may be a 240 VAC inverter that is configured to receive the 50 volt DC power and output 240 volt AC power. Electrical slip ring 418 can receive the 240 volt AC power and use the 240 volt AC power to operate turntable assembly 800 (e.g., to rotate the turntable relative to base assembly 12 or frame 20). Electrical slip ring 418 can be communicably coupled with first battery pack 408 and may be configured to exchange discrete digital control signals with first battery pack 408. Advantageously, electrical slip ring 418 may be a high-current slip ring that is sized for traction or battery current (e.g., greater than 500 amps) to facilitate continuous rotation of turntable assembly 800. Other telehandlers do provide continuous rotation of their turntable assemblies.

Referring still to FIG. 4, turntable components 460 can include a third charger 420, a load 422, a second battery pack 424, a starter or ignition module 426, a turntable control module 428, and at least one actuator 430. Third charger 420 is electrically coupled with second battery pack 424 and actuators 430. Actuators 430 can draw 50 volt DC electrical power or electrical energy from second battery pack 424 and/or third charger 420 to perform their respective functions. Actuators 430 may be any of the linear electric actuators described herein (e.g., linear electric actuator 52, linear electric actuator 54, linear electric actuator 42, linear electric actuator 30, linear electric actuator 38, etc.). Third charger 420 may be configured to generate electrical power or electrical energy for second battery pack 424 and can provide the electrical power or electrical energy to second battery pack 424 to charge second battery pack 424. Third charger 420 can be configured to provide 240 volt AC electrical power or electrical energy to electrical slip ring 418. Load 422 may be a sky or a welder electrical load. Third charger 420 can also be configured to provide electrical power or electrical energy to load 422. Load 422 may be or include a plug (e.g., an outlet) at implement assembly 16 for powering one or more electrical devices at implement assembly 16 (e.g., a welder).

Turntable control module 428 is configured to generate control signals for any of electrical slip ring 418, actuators 430, third charger 420, or ignition module 426. Turntable control module 428 can be the same as or similar to base control module 412. Turntable control module 428 may be configured to provide the control signals to any of electrical slip ring 418, actuators 430, charger 420, or ignition module 426 through a CANBUS of lift device 10.

Second battery pack 424 can be a secondary or smaller battery pack compared to first battery pack 408. For example, second battery pack 424 can be a 7.4 KWh battery pack that includes four modules. Advantageously, split battery system 400 uses first battery pack 408 positioned at base assembly 12 (or on frame 20) and second battery pack 424 positioned at turntable assembly 800 to drive electrical slip ring 418 to perform turntable functions of lift device 10.

Figure 5:
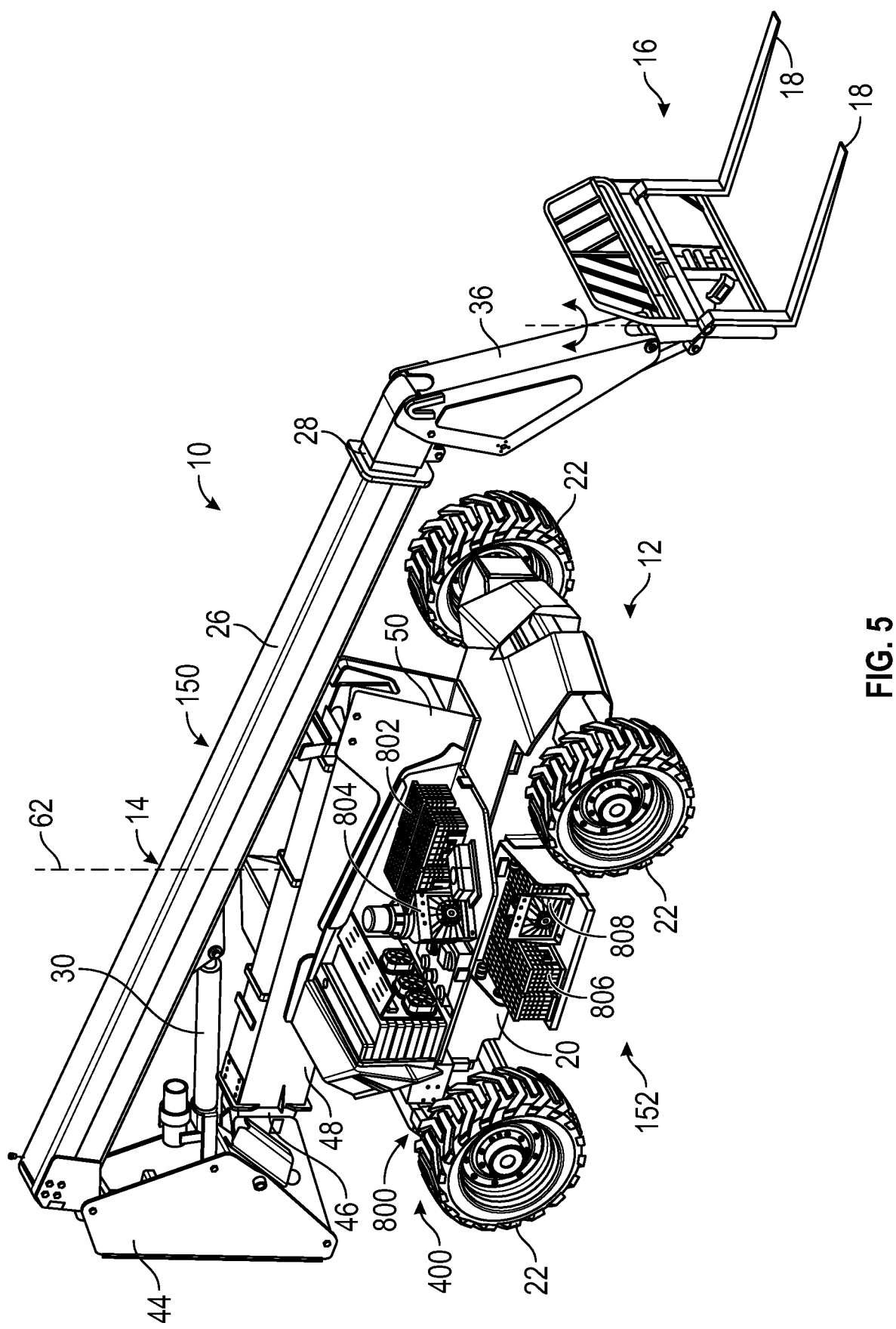
FIG. 5 is a perspective view of the lift device of FIG. 1 showing portions of a base assembly and a turntable assembly of the lift device in greater detail and a split battery architecture, according to an exemplary embodiment.

Referring particularly to FIG. 5, lift device 10 includes turntable assembly 800 and base assembly 12. Base assembly 12 includes base assembly batteries 806, while turntable assembly 800 includes turntable batteries 802. Turntable batteries 802 can be the same as or similar to second battery pack 424. Base assembly batteries 806 can be the same as or similar to first battery pack 408. In this way, electrical energy for lift device 10 can be primarily stored at base assembly batteries 806 (e.g., for operating electric motors 24 to drive/steer lift device 10, for actuators 430, to operate turntable assembly 800, etc.) and also stored at turntable batteries 802. Base assembly batteries 806 may function as a primary energy storage device or system, while turntable assembly batteries 802 may function as a secondary energy storage device or system.

Referring still to FIG. 5, base assembly 12 can include a charger 808 that is configured to operate to charge base assembly batteries 806 to maintain a minimum charge level in base assembly batteries 806. Charger 808 can be a smart charging device that monitors charge level of base assembly batteries 806. Turntable assembly 800 also includes a charger 804 that is configured to charge turntable batteries 802. Charger 804 can be the same as or similar to charger 808. Charger 804 may be third charger 420. Charger 808 may be first charger 404 and/or second charger 406.

Figure 6:
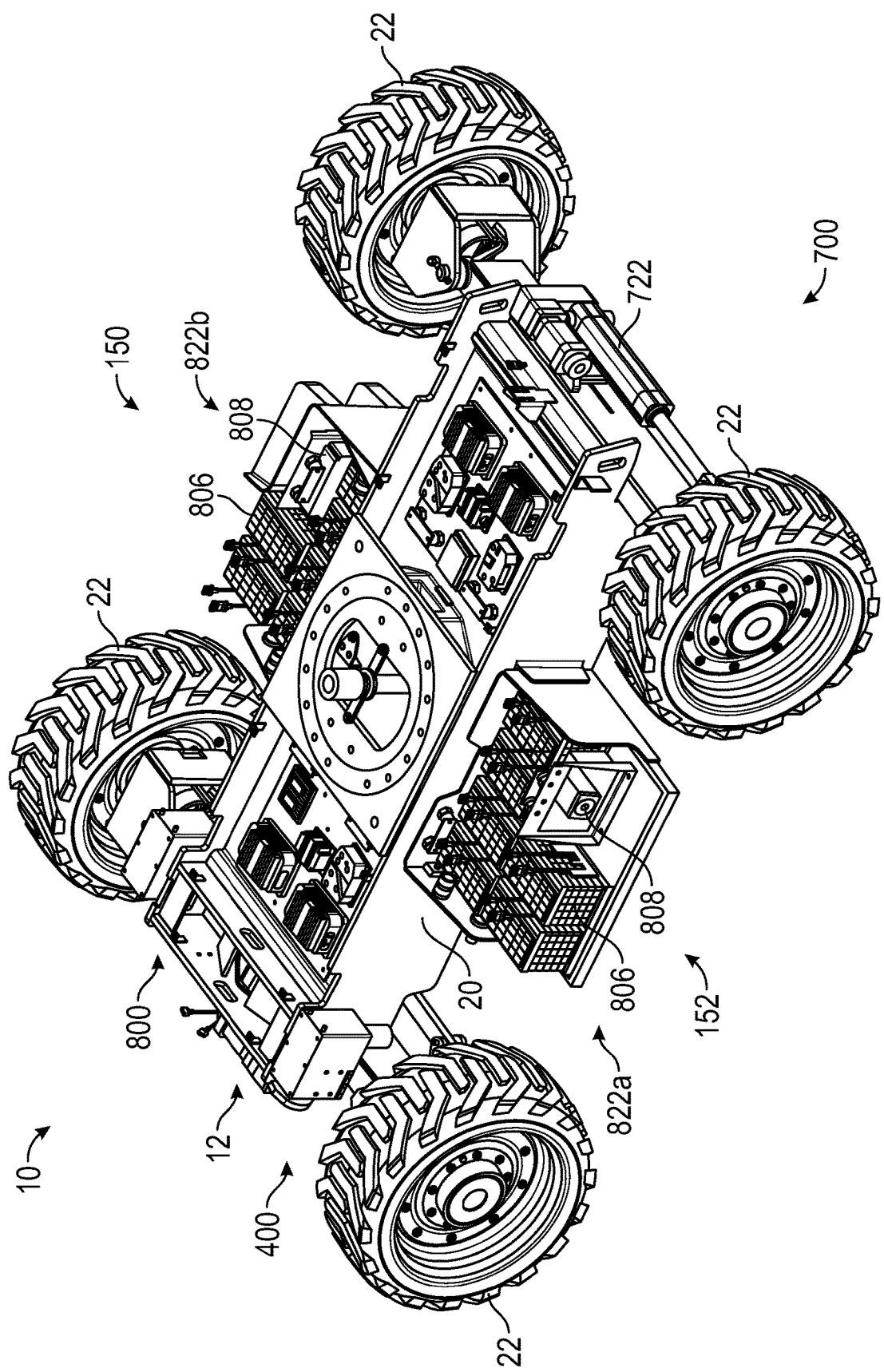
FIG. 6 is a perspective view of a base assembly of the lift device of FIG. 1 showing a split battery architecture, according to an exemplary embodiment.

Referring particularly to FIG. 6, a portion of lift device 10 is shown in greater detail. Specifically, FIG. 6 shows frame 20 and the various components of base assembly 12 thereof. Base assembly 12 can include a left side energy storage compartment 822a that is positioned at a left side 152 of lift device 10 and a right side energy storage compartment 822b that is positioned at a right side 150 of lift device 10. Left side energy storage compartment 822a can include one or more base assembly batteries 806. Likewise, right side energy storage compartment 822b can include one or more base assembly batteries 806. Left side energy storage compartment 822a and right side energy storage compartment 822b can be fixedly coupled with frame 20 on either side of frame 20 (e.g., on opposite longitudinal sides of frame 20).

Referring still to FIG. 6, steering system 700 can include a steering actuator 722 that is configured to pivot or rotate tractive elements 22 to indicate a direction of turn of lift device 10. Steering actuator 722 can be a linear electric steering actuator that is configured to extend or retract to pivot tractive elements 22 for steering lift device 10.

Referring still to FIG. 6, lift device 10 includes a base assembly controller 820 that is positioned on frame 20 and configured to operate various controllable elements of base assembly 12 or lift device 10. Base assembly controller 820 can be base control module 412. Base assembly controller 820 can be configured to operate a traction control system or steering system 700. Lift device 10 also includes a base battery management system 834 that is positioned at frame 20 and configured to monitor any of base assembly batteries 806 (e.g., a state of charge, a state of health, etc.).

Referring still to FIG. 6, lift device 10 includes a slip ring transmission 812 (e.g., a rotary electrical interface, a rotating electrical connector, a collector, a swivel, an electrical rotary joint, etc.) that is fixedly coupled with frame 20. Slip ring transmission 812 can be electrical slip ring 418. Slip ring transmission 812 can be configured to receive electrical power or electrical energy from base assembly batteries 806 and/or turntable batteries 802 to drive turntable member 803 to rotate relative to frame 20. Slip ring transmission 812 may define central axis 62 about which turntable assembly 800 rotates. Slip ring transmission 812 can be configured to transmit energy and/or data between base assembly 12 and turntable assembly 800.

Referring still to FIG. 6, lift device 10 includes a power inverter 810. Power inverter 810 is configured to receive electrical power (e.g., DC power) from base assembly batteries 806, convert the electrical power (e.g., into AC power) and output the converted electrical power to slip ring transmission 812 to operate turntable assembly 800.

Figure 7:
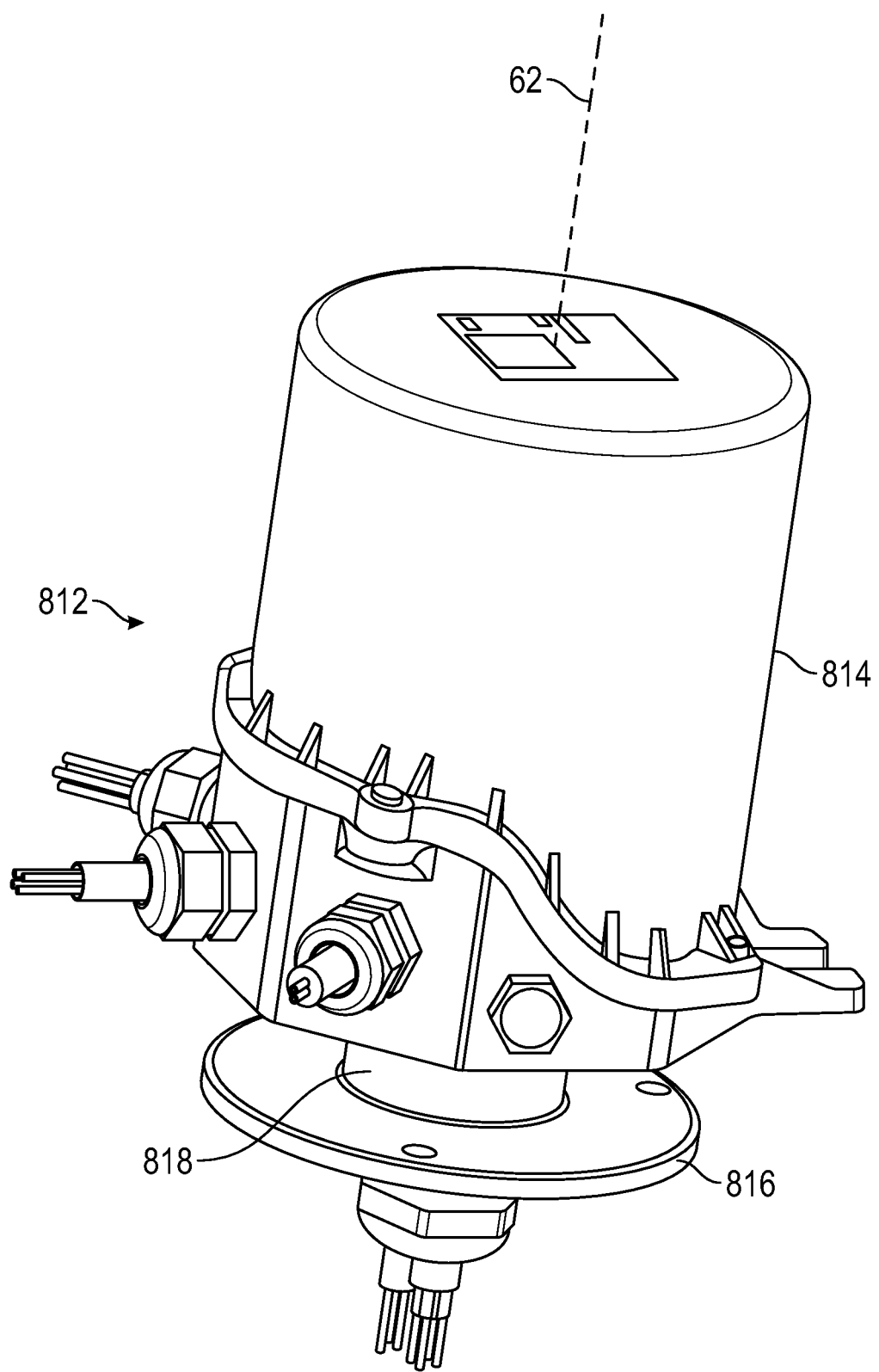
FIG. 7 is a perspective view of an electrical slip ring of the turntable assembly of the lift device of FIG. 1, according to an exemplary embodiment.

Referring particularly to FIG. 7, slip ring transmission 812 is shown to include a first portion 814 and a second portion 816. First portion 814 and second portion 816 can be co-axial with each other and may be configured to rotate relative to each other about central axis 62. First portion 814 can be rotatably coupled with second portion 816 through a central shaft 818. In some embodiments, central shaft 818 and second portion 816 are integrally formed with each other. First portion 814 can be fixedly coupled with turntable member 803, while second portion 816 can be fixedly coupled with frame 20. Slip ring transmission 812 can be configured to consume electrical energy to generate rotational kinetic energy to rotate first portion 814 relative to second portion 816.

Referring particularly to FIG. 8, one of energy storage compartments 822 is shown in greater detail, according to an exemplary embodiment. It should be understood that both left side energy storage compartment 822a and right side energy storage compartment 822b may be configured similarly such that whatever is said of left side energy storage compartment 822a may be said of right side energy storage compartment 822b or vice versa.

Referring still to FIG. 8, energy storage compartment 822 includes a first frame member 828 and a second frame member 826. First frame member 838 and second frame member 826 can be fixedly coupled with frame 20 and may extend from a lateral side of frame 20. In some embodiments, second frame member 826 is fixedly coupled with first frame member 828 (e.g., through fasteners). First frame member 828 can be fixedly coupled with frame 20.

First frame member 828 and second frame member 826 can be configured to support multiple base assembly batteries 806. First frame member 828 and second frame member 826 can also be configured to support charger 808. Lift device 10 also includes a manual on/off switch 824 that is configured to receive a user input. Manual on/off switch 824 may be actuated between a first position and a second position to provide a signal for controller 200, base battery management system 834, base assembly controller 820, traction controllers 414, steering controllers 416, base control module 412, or turntable control module 428 to activate or deactivate one or more functions of lift device 10 or to start lift device 10.

Referring still to FIG. 8, energy storage compartment 822 can also include one or more electrically controlled switches 836. Electrically controlled switches 836 can be fixedly coupled or positioned with one of first frame member 828 or second frame member 826. Electrically controlled switches 836 can also provide feedback for detecting switch failure.

In some embodiments, energy storage compartment 822 also includes base battery management system 834. For example, base battery management system 834 can be positioned at energy storage compartment 822 and supported by first frame member 828 and second frame member 826.

Referring particularly to FIGS. 7-8, base assembly batteries 806 can be configured to serve as a main power source for any electric motors, actuators, systems, functions, etc., of base assembly 12 and/or turntable assembly 800. For example, base assembly batteries 806 can provide electrical power to slip ring transmission 812 for rotating turntable member 803 relative to frame 20. Base assembly batteries 806 can also be configured to replenish or recharge turntable batteries 802. Similarly, turntable batteries 802 can be configured to provide electrical energy or electrical power for various electric actuators or motors of lift apparatus 14 (e.g., linear electric actuator 54, linear electric actuator 52, linear electric actuator 42, and/or linear electric actuator 30).

Referring particularly to FIG. 9, a portion of turntable assembly 800 is shown in greater detail, according to an exemplary embodiment. Turntable batteries 802 can be fixedly coupled, attached, secured, positioned on, etc., turntable member 803. Turntable batteries 802 can function as a main power source for various controllable elements of lift apparatus 14 and may be recharged by base assembly batteries 806.

Referring still to FIG. 9, turntable assembly 800 can include a manual on/off switch 832, and one or more turntable electrically-controlled switches 830. Manual on/off switch 832 can be the same as or similar to manual on/off switch 824 of base assembly 12. Turntable electrically-controlled switches 830 can be the same as or similar to electrically controlled switches 836 of base assembly 12.

Referring still to FIG. 9, turntable assembly 800 includes a turntable battery management system 840 that is configured to monitor a status of or control a discharge of turntable batteries 802 (e.g., based on sensor data). Turntable battery management system 840 can be the same as or similar to base battery management system 834. Turntable assembly 800 also includes a turntable master controller 842 that is responsible for operating the various controllable elements that draw power from turntable batteries 802 (e.g., the linear electric actuators of lift apparatus 14).

Turntable member 803 may support turntable batteries 802, charger 804, manual on/off switches 832, electrically-controlled switches 830, turntable battery management system 840, or turntable master controller 842. In this way, turntable batteries 802, charger 804, manual on/off switches 832, electrically-controlled switches 830, turntable battery management system 840, and turntable master controller 842 may rotate or pivot with turntable member 803 about central axis 62 relative to frame 20.

Referring to FIGS. 4-9, turntable batteries 802 can be replenished or recharged by base assembly batteries 806 through power inverter 810 (e.g., inverter 410), slip ring transmission 812, charger 808 (e.g., the charger 808 of base assembly 12 or the charger 804 of turntable assembly 800). Power inverter 810 may be configured to convert DC power from base assembly batteries 806 to AC power and provide AC power to slip ring transmission 812. Slip ring transmission 812 can transmit AC power or electrical energy from power inverter 810 to charger 804. Charger 804 may receive the AC power or electrical energy from slip ring transmission 812 and recharge or replenish turntable batteries 802 so that lift apparatus 14 or the various linear electric actuators thereof can draw electrical power from turntable batteries 802. Controller 200, turntable battery management system 840, turntable master controller 842, base assembly controller 820, base battery management system 834, base control module 412, or turntable control module 428 can cooperatively or individually regulate energy balance between turntable batteries turntable batteries 802 and base assembly batteries 806.

Referring again to FIG. 8, energy storage compartments 822 can be modular base energy storage compartments. Each energy storage compartment 822 may include six base assembly batteries 806, charger 808, manual on/off switch 824, and two electrically-controlled switches 836. Lift device 10 can include two energy storage compartments 822 positioned on either side of frame 20. Manual on/off switch 824 can be a manual disconnect switch to disconnect base assembly batteries 806.

Referring particularly to FIGS. 5 and 9, lift apparatus 14 can be configured to draw electrical power from turntable batteries 802 when operating to perform various lift apparatus functions such as raising or lowering implement assembly 16, telescoping outer member 26 relative to inner member 28, rotating turntable assembly 800, etc. The various linear electric actuators or electric motors that perform these functions may draw power from turntable batteries 802 as long as an energy or charge level of turntable batteries 802 is maintained above a certain level. Turntable batteries 802 may be replenished by base assembly batteries 806 to maintain turntable batteries 802 above the level. If turntable batteries 802 are unable to provide sufficient electrical energy to lift apparatus 14 or the various controllable elements required to performs the functions described herein, and replenishment from base assembly batteries 806 is not available, controller 200 may maintain a reserved energy to operate lift apparatus 14 according to a limp mode or a restricted mode (e.g., only allowing lift apparatus 14 to operate to lower implement assembly 16). If energy levels of turntable batteries 802 is decreased further and replenishment from base assembly batteries 806 is still unavailable, functions of lift apparatus 14 may be disabled or limited by controller 200 until energy replenishment is available. Controller 200 can also inhibit power delivery to various linear electric actuators of base assembly 12 (e.g., driving actuators, steering actuators such as steering actuator 722, axle lock-out actuators) if a battery level (e.g., a state of charge) of base assembly batteries 806 is below a threshold level.

During normal base assembly 12 functions such as driving and steering, energy required to activate the various controllable elements of base assembly 12 (e.g., linear electric actuators, electric motors 24, etc.) may be provided by base assembly batteries 806. If energy storage of base assembly batteries 806 is low or below a certain level and energy replenishment is not available, controller 200 may disable operations of base assembly 12 until replenishment is available.

When lift device 10 is connected to a facility energy source (e.g., an electric outlet or a charging station through receptacle 402), charger 808 may charge base assembly batteries 806 using energy provided by the facility energy storage. Concurrently, power inverter 810 may convert DC voltage or DC electrical power of base assembly batteries 806 to AC electrical power with a current sufficiently low to be consumed by slip ring transmission 812. This AC electrical power can then be transferred to turntable batteries 802 or charger 804 through slip ring transmission 812 for replenishment of turntable batteries 802. Charger 804 may then charge turntable batteries 802 until both turntable batteries 802 and base assembly batteries 806 achieve 100% state of charge.

When lift device 10 is not connected to a facility energy source, turntable batteries 802 may still be replenished or recharged by base assembly batteries 806 as described herein. In some embodiments, controller 200 or a control system of lift device 10 operate split battery system 400 so that turntable batteries 802 are maintained at a 75%-80% state of charge, provided that a charge level of base assembly batteries 806 is 10% or greater. Energy transmission from base assembly batteries 806 to turntable batteries 802 may stop once base assembly batteries 806 fall below a 10% state of charge.

Telehandler Modes

Referring to FIGS. 1-3, implement assembly 16 can interchangeably receive different implements or equipment or can be replaced with different implements. For example, in FIGS. 2-3, implement assembly 16 is shown configured with forks 18 so that lift device 10 is configured for material handling (e.g., configured as a material handler). However, implement assembly 16 may be removed and a different implement assembly may be installed (e.g., a platform implement as shown in FIG. 1) to configure lift device 10 for different applications (e.g., a mobile elevating work platform, MEWP).

Figure 26:
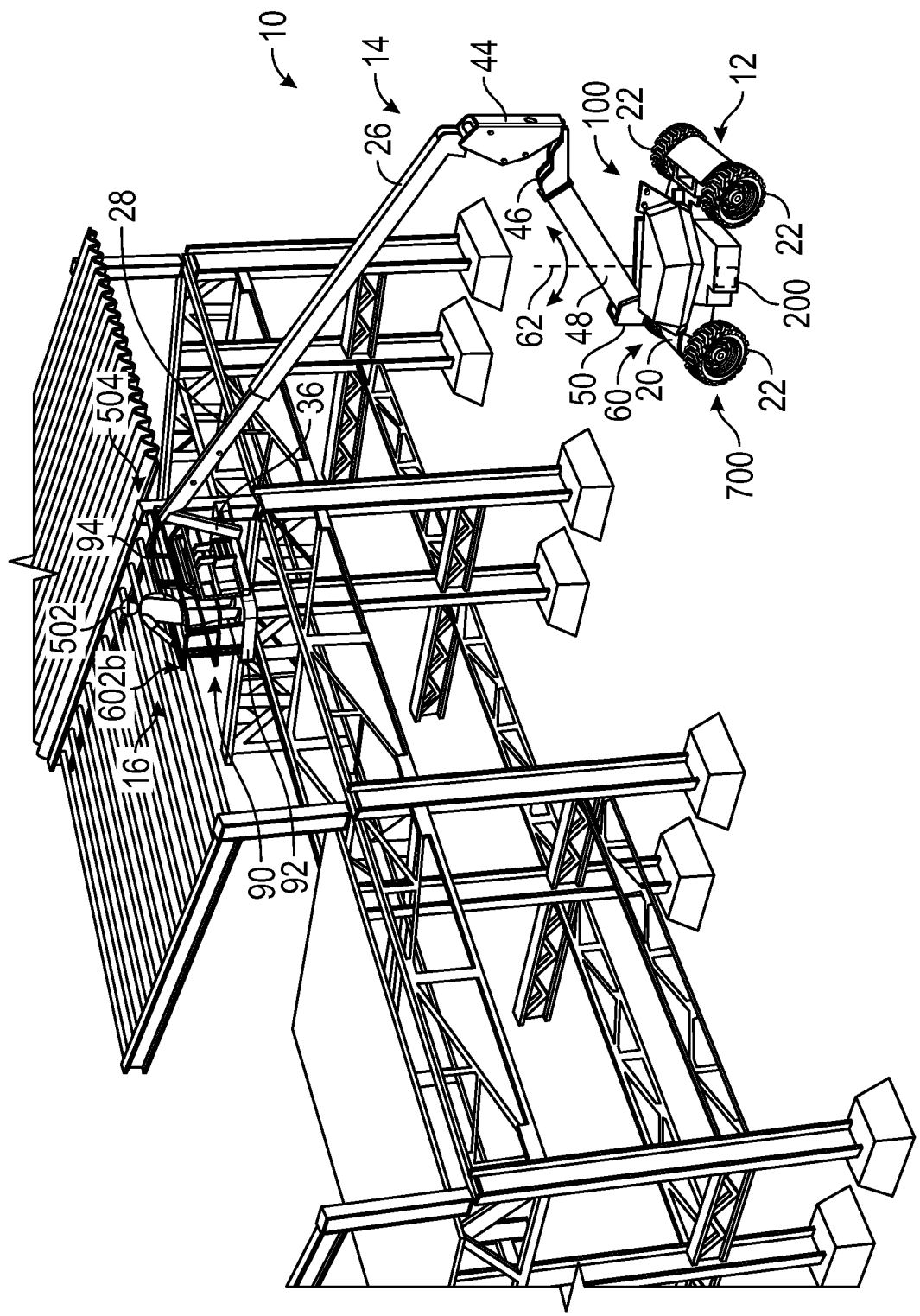
FIG. 26 is a perspective view of the lift device of FIG. 1 configured for use with a working platform, according to an exemplary embodiment.

Referring particularly to FIG. 26, lift device 10 is shown configured as a MEWP. Specifically, the implement assembly 16 that is positioned at the end of lift apparatus 14 is a platform assembly 90 including a base or a platform 92 and rails 94. Platform assembly 90 can be raised or lowered to facilitate access to an elevated location 504. Platform assembly 90 may be configured to support a worker 502. In some embodiments, when implement assembly 16 is platform assembly 90, deployable operator station 100 may be transitioned into the tucked or stowed mode or position or state. When implement assembly 16 is platform assembly 90, worker 502 may operate lift device 10 from platform assembly 90 by operating an HMI that is positioned at platform assembly 90, or by using a mobile device (e.g., a smartphone) that is wirelessly communicably coupled with controller 200. Lift device 10 can also be operated from a ground control panel when implement assembly 16 is platform assembly 90 and deployable operator station 100 is tucked or stowed. Platform assembly 90 can include fork pockets that are configured to receive forks 18 therethrough and removably couple platform assembly 90 with forks 18 to transition lift device 10 into a MEWP telehandler.

Figure 27:
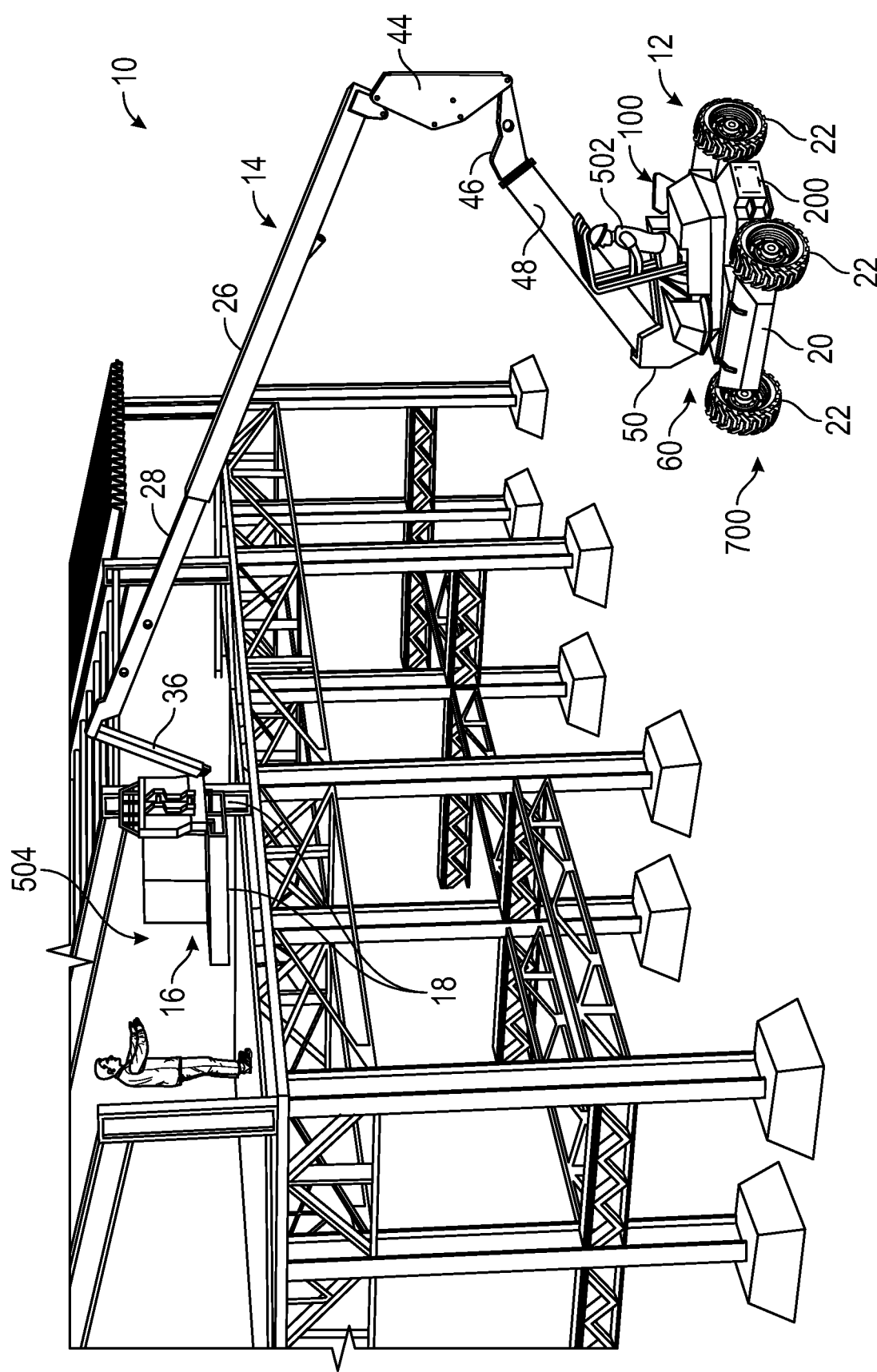
FIG. 27 is a perspective view of the lift device of FIG. 1 configured for use with a fork assembly, according to an exemplary embodiment.

Referring particularly to FIG. 27, lift device 10 is shown configured as an MH, when implement assembly 16 includes forks 18 or when platform assembly 90 is removed from forks 18. Forks 18 can be configured to facilitate removably coupling a pallet, supporting material, etc., so that the material can be placed or removed from elevated location 504. When lift device 10 is configured as a material handler with forks 18, lift device 10 may be operated from deployable work station 100. In particular, when lift device 10 is configured as a material handler, deployable work station 100 may be transitioned into the deployed state, position, or mode, so that an operator 502 can control or operate lift device 10 through various user input devices that are positioned at deployable operator station 100.

Referring again to FIGS. 2-3, deployable operator station 100 is shown positioned on a right side 150 of lift device 10. Deployable operator station 100 may be positioned on the right ride 150 of lift device 10 or may alternatively be positioned on a left side 152 of lift device 10. In a preferred embodiment, deployable operator station 100 is positioned on the right side 150 of lift device 10 as shown.

Referring again to FIGS. 1-3, lift device 10 is shown configured as a fully electric telehandler that uses linear electric actuator 52, linear electric actuator 54, linear electric actuator 30, and linear electric actuator 38 to raise or lower implement assembly 16. However, lift device 10 may similarly be configured as a hydraulic telehandler, with linear electric actuator 52, linear electric actuator 54, linear electric actuator 30, and linear electric actuator 38 being replaced with hydraulic cylinders. In other embodiments, if lift device 10 is a hybrid telehandler, one or more of linear electric actuator 52, linear electric actuator 54, linear electric actuator 30, or linear electric actuator 38 are replaced with hydraulic linear actuators. In still other embodiments, lift device 10 is configured as an electro-hydraulic or a hybrid telehandler. In some embodiments, lift device 10 is configured as a MEWP with a straight lift assembly. When lift device 10 is in the MEWP mode (as shown in FIG. 4) or the MH mode (as shown in FIG. 5), lift device 10 may be configured as a two-wheel steering telehandler so that two of tractive elements 22 (e.g., a front pair or a rear pair) are configured to receive steering inputs and indicate a direction of turn of lift device 10. In some embodiments, lift device 10 is configured as a four-wheel steering telehandler so that both pairs of tractive elements 22 (e.g., both the front pair and the rear pair) are configured to receive steering inputs to indicate a direction of turn of lift device 10. In some embodiments, lift device 10 is configured as a two-wheel drive telehandler so that only two of the tractive elements 22 receive rotational kinetic energy (e.g., from electric motor 24, or each from a corresponding electric motor 24) for transporting lift device 10. In some embodiments, lift device 10 is configured as a four-wheel drive telehandler so that all four of tractive elements 22 receive rotational kinetic energy (e.g., from electric motor 24 or each from a corresponding electric motor 24) for transporting lift device 10. In some embodiments, an electric motor 24 is positioned near each tractive element 22 so that each tractive element 22 can be independently driven by the corresponding electric motor 24. Electric motor 24 may be a high-speed, high-efficiency electric motor (e.g., an electric motor with a highest efficiency at a desired driving or transportation speed).

Steering System

Referring now to FIGS. 29-33, steering system 700 is shown in greater detail, according to an exemplary embodiment. Steering system 700 is configured to pivot tractive elements 22 to perform a turn. Steering system 700 includes one or more frame members, control arm assemblies, hub assemblies, knuckles, etc., shown as steering knuckle 706. Any of the frame members (e.g., laterally extending frame members 702/704) may be components or portions of frame 20. Tractive elements 22 are rotatably coupled with steering knuckle 706. Tractive elements 22 are configured to rotate relative to steering knuckle 706 about axis 790. Tractive elements 22 can frictionally interface with a ground surface and thereby drive lift device 10 as they are driven to rotate by electric motors 24.

Steering knuckle 706 is configured to rotate/pivot relative to laterally extending frame members 702/704 about axis 720 to facilitate steering of lift device 10. Steering knuckle 706 can rotatably couple with laterally extending frame members 702/704 with a bearing. Electric motor 24 can be configured to pivot with steering knuckle 706 as steering knuckle 706 rotates about axis 720. Steering knuckle 706 is driven to pivot about axis 720 by a tie rod, a control arm, a rigid member, etc., shown as steering member 792. Steering member 792 includes a first arcuate member 708a and a second arcuate member 708b (e.g., curved members, bowed members, arching members, etc.). Arcuate members 708 can have a generally arcuate shape, a curved shape, a constant-radius curved shape, a non-constant radius curved shape, an angled shape (e.g., two straight or curved portions angularly offset), etc. Steering member 792 is configured to pivotally couple with a connecting portion 712 of steering knuckle 706 about axis 711. Steering member 792 can be coupled with an elongated member, a cylinder, a pin, a rod, etc., shown as pin 714 that extends between first arcuate member 708a and second arcuate member 708b through a corresponding aperture of connecting portion 712. In some embodiments, pin 714 is fixedly coupled with arcuate members 708 and is rotatably coupled with an aperture/bore of steering knuckle 706. In other embodiments, pin 714 is fixedly coupled with steering knuckle 706 and is rotatably coupled with apertures/bores of arcuate members 708. First arcuate member 708a and second arcuate member 708b each include a connecting end 796, respectively. Connecting end 796 can include an aperture, bore, hole, etc., that extends therethrough and is configured to couple with pin 714. In some embodiments, a bearing (e.g., a sleeve bearing, a ball bearing, etc.) is disposed in the aperture of connecting portion 712 and is configured to couple with pin 714 that extends between first arcuate member 708a and second arcuate member 708b. The pivotal/rotatable interface between steering knuckle 706 and first and second arcuate members 708a and 708b facilitates relative rotation between steering knuckle 706 and steering member 792 about axis 711.

Electric motor 24 is configured to drive tractive element 22. Electric motor 24 can be mounted between laterally extending frame member 702 and laterally extending frame member 704. Laterally extending frame members 702/704 are end portions of one of (e.g., a front, a rear) lateral frame member 710. Lateral frame member 710 can extend along substantially an entire lateral width of lift device 10. Lateral frame member 710 provide structural support between tractive elements 22 and base assembly 12. Lateral frame member 710 extends along a lateral axis 780 of lift device 10.

Steering member 792 has a generally arcuate shape and extends between electric actuator 722 (e.g., an electric linear actuator, a linear electric steering actuator, etc.) and steering knuckle 706. Steering member 792 is configured to couple with a rod, a cylinder, an extension member, a push rod, etc., of electric actuator 722, shown as rod 726. Steering member 792 can be fixedly coupled with an end portion, a connecting portion, a clevis, an attachment portion, etc., of rod 726, shown as end portion 730. Rod 726 is configured to extend and retract relative to a body, a housing, a frame, a main member, an outer member, etc., of electric actuator 722, shown as body 724. Rod 726 can be received therewithin body 724 of electric actuator 722 and driven to extend and retract by electric motor 732. Electric motor 732 may be configured to interface with a gear that drives a drive nut (not shown). The drive nut may drive rod 726 to extend or retract.

End portion 730 of rod 726 is configured to be received therebetween first arcuate member 708a and second arcuate member 708b. First arcuate member 708a and second arcuate member 708b can be substantially parallel to each other and extend outwards between electric actuator 722 and tractive element 22. End portion 730 can be fixedly coupled with first arcuate member 708a and second arcuate member 708b. In some embodiments, end portion 730 is fixedly coupled with first arcuate member 708a and second arcuate member 708b with fasteners 728 (e.g., bolts, rivets, screws, etc.) that extend therethrough. In some embodiments, two or more fasteners 728 are used to fixedly couple end portion 730 of rod 726 with steering member 792 (i.e., with first arcuate member 708a and second arcuate member 708b). In other embodiments, end portion 730 of rod 726 and steering member 792 are integrally formed, welded, etc., or otherwise fixedly attached.

The fixed connection between end portion 730 of rod 726 and steering member 792 prevents rotation between rod 726 and steering member 792. Advantageously, this facilitates reducing transverse loads being applied to electric actuator 722. This can reduce the likelihood of any of the internal components of electric actuator 722 failing due to excessive transverse loads/forces.

Electric actuator 722 is configured to pivotally couple with longitudinally extending frame members 742. Longitudinally extending frame members 742 extend longitudinally outwards from lateral frame member 710. Longitudinally extending frame members 742 can extend from a centerpoint of lateral frame member 710. Longitudinally extending frame members 742 can extend outwards (e.g., in forwards direction 750) from lateral frame member 710. Longitudinally extending frame members 742 can be removably coupled with lateral frame member 710 (e.g., with fasteners), integrally formed with lateral frame member 710, or otherwise connected/coupled with lateral frame member 710. Electric actuator 722 is disposed between longitudinally extending frame member 742a and longitudinally extending frame member 742b. Body 724 of electric actuator 722 can be positioned between longitudinally extending frame member 742a and longitudinally extending frame member 742b.

A pin 798 may extend at least partially (or entirely) through an aperture of electric actuator 722 and corresponding apertures of longitudinally extending frame members 742. Electric actuator 722 is configured to pivot, swivel, rotate, etc., about axis 776 relative to longitudinally extending frame members 742. As electric actuator 722 extends and retracts, electric actuator 722 may pivot about axis 776 in either direction. Axis 776 can be defined as extending through pin 798. Pin 798 can be fixedly coupled with electric actuator 722 and configured to rotatably couple with bearings, mounting members, rotatable coupling members, etc., shown as coupling members 740. Coupling members 740 can be disposed on outer sides of longitudinally extending frame members 742. For example, coupling member 740a may be disposed on an upper or outer surface of longitudinally extending frame member 742a, while coupling member 740b is disposed on a bottom or outer surface of longitudinally extending frame member 742b. Pin 798 can be slidably coupled with an aperture, bore, hole, etc., of body 724 of electric actuator 722. In other embodiments, pin 798 is fixedly coupled with the bore of body 724. In still other embodiments, pin 798 is slip fit with an inner surface of the bore of body 724. Pin 798 can be rotatably coupled with coupling members 740. Coupling members 740 can each include a bearing (e.g., a ball bearing, a roller bearing, a sleeve bearing, etc.) configured to couple with pin 798. Coupling members 740 can be coupled with longitudinally extending frame members 742.

Longitudinally extending frame member 742a and longitudinally extending frame member 742b can be substantially parallel to each other and define a receiving area therebetween. The receiving area is configured to receive body 724 of electric actuator 722 therebetween. Pin 798 may extend through at least a portion or substantially an entirety of the receiving area defined between longitudinally extending frame member 742a and longitudinally extending frame member 742b.

As electric actuator 722 extends (e.g., rod 726 extends relative to body 724), electric actuator 722 may rotate about axis 776. Likewise, steering knuckle 706 and steering member 792 rotate relative to each other about axis 711. Similarly, when electric actuator 722 retracts (e.g., rod 726 retracts relative to body 724), electric actuator 722 may rotate about axis 776 and steering knuckle 706 and steering member 792 rotate relative to each other about central axis 711. In this way, extension and retraction of electric actuator 722 can drive the rotation/pivoting of steering knuckle 706 about axis 720 to turn tractive element 22. Electric actuator 722 can receive power for extending and retracting from electrical storage device(s) 40. Electric actuator 722 can receive control signals that indicate a degree of extension or retraction (and thereby indicate a degree of turn of tractive elements 22) from controller 200. Controller 200 may provide electric actuator 722 with the control signals that indicate the degree of extension or retraction in response to receiving a user input from HMI 500, or any other user input device of lift device 10. Controller 200 operates electric actuator 722 to extend or retract to indicate a direction of turn of lift device 10.

Electric motors 24 can also receive power from energy storage devices 40 to drive tractive elements 22. Electric motors 24 can receive a control signal from controller 200 to operate (e.g., a desired speed).

Arcuate members 708 have a curved shape such that when tractive elements 22 are pivoted to their angular extremes (e.g., a sharpest turn possible, when electric actuator 722 is fully extended, etc.), steering member 792 does not contact electric motors 24. This facilitates sharper turns of lift device 10 without steering member 792 contacting electric motors 24.

Referring particularly to FIG. 30, lift device 10 can include a shield, a guard, a planar member, etc., shown as guard member 731. Guard member 731 can protrude outwards from lift device 10 in a direction of travel of lift device 10. Guard member 731 provides a barrier for objects in front of lift device 10 such that electric actuator 722 does not contact the objects as lift device 10 is driven. Lift device 10 can include a front guard member 731 and a rear guard member 731 disposed at opposite ends of lift device 10. Guard members 731 can protrude outwards along longitudinal axis 778 in either forwards direction 750 or rearwards direction. For example, a front guard member 731 may protrude outwards in forwards direction 750 from a front of base assembly 12. Likewise, a rear guard member 731 may protrude in rearwards direction from a rear of base assembly 12.

It should be noted that while only one tractive element 22 is shown pivoted/rotated by steering system 700, any or all of tractive elements 82 of lift device 10 can be similarly configured. For example, steering system 700 can include a similar and symmetric electric actuator 722 at an opposite side (e.g., a right/left side) of base assembly 12 that steers tractive element 22 at the opposite side. In some embodiments, steering system 700 is positioned on an outwards facing side of lateral members 710 (e.g., a forwards facing side of a front lateral frame member 710, a rearwards facing side of a rear lateral frame member 710). In other embodiments, steering system 700 is positioned in an inwards facing side of lateral members 710 (e.g., an inwards facing side of a front lateral frame member 710, a front facing side of a rear lateral frame member 710).

Control Systems

Figure 10:
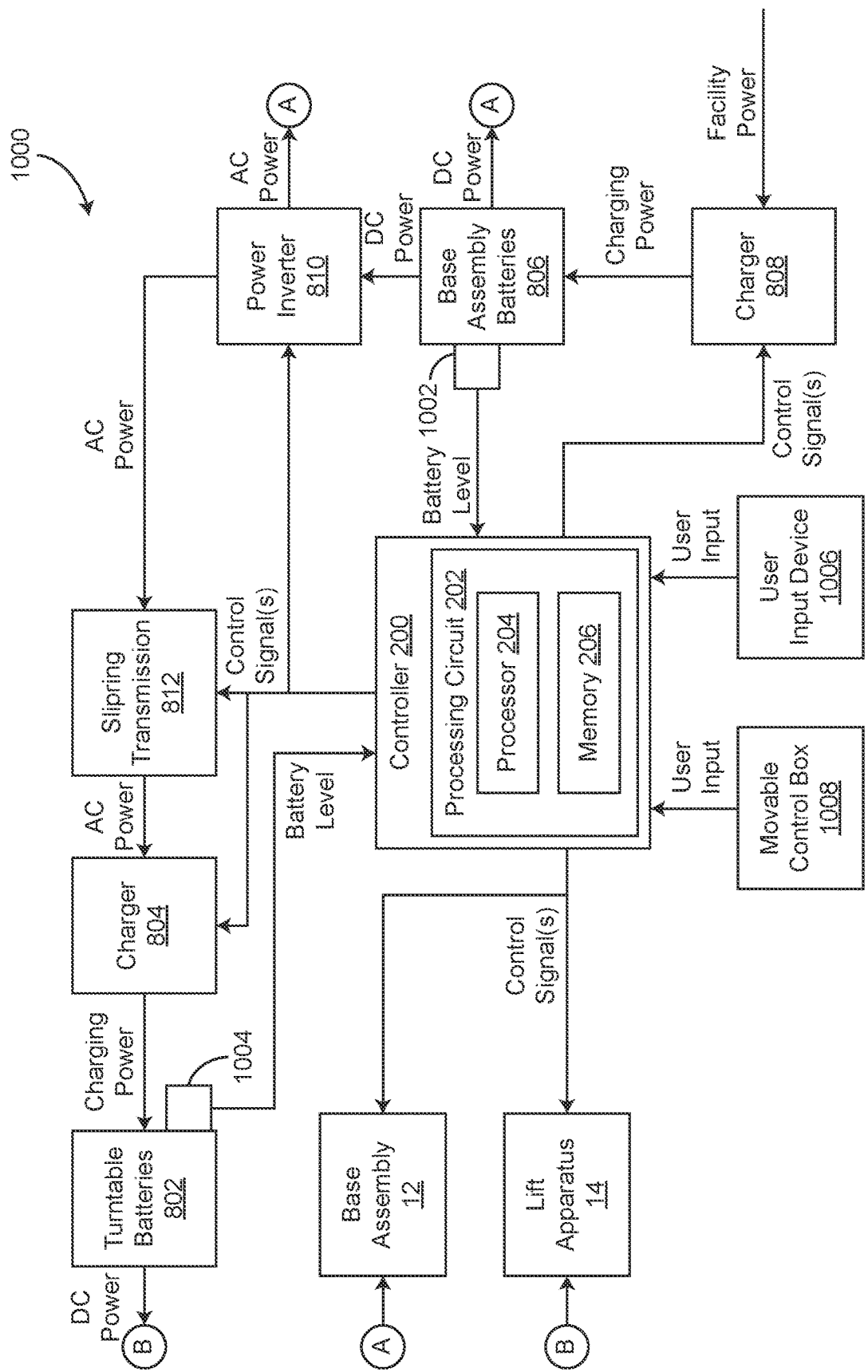
FIG. 10 is a block diagram of a control system for the lift device of FIG. 1, according to an exemplary embodiment.

Referring particularly to FIG. 10, a control system 1000 for lift device 10 includes controller 200, turntable batteries 802, charger 804, a battery sensor 1004, slip ring transmission 812, power inverter 810, base assembly batteries 806, a battery sensor 1002, charger 808, base assembly 12, and lift apparatus 14. Controller 200 can represent any of or a combination of base control module 412, turntable control module 428, traction controllers 414, steering controllers 416, base assembly controller 820, base battery management system 834, turntable battery management system 840, or turntable master controller 842, etc. Any of the functionality of base control module 412, turntable control module 428, traction controllers 414, steering controllers 416, base assembly controller 820, base battery management system 834, turntable battery management system 840, or turntable master controller 842 may be performed by controller 200. In some embodiments, any of the functionality of controller 200 as described herein is distributed across or performed by a combination of base control module 412, turntable control module 428, traction controllers 414, steering controllers 416, base assembly controller 820, base battery management system 834, turntable battery management system 840, or turntable master controller 842.

Controller 200 includes a processing circuit 202, a processor 204, and memory 206. Processing circuit 202 can be communicably connected to a communications interface such that processing circuit 202 and the various components thereof can send and receive data via the communications interface. Processor 204 can be implemented as a general purpose processor, an application specific integrated circuit (ASIC), one or more field programmable gate arrays (FPGAs), a group of processing components, or other suitable electronic processing components.

Memory 206 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 206 can be or include volatile memory or non-volatile memory. Memory 206 can include database components, object code components, script components, or any other type of information structure for supporting the various activities and information structures described in the present application. According to some embodiments, memory 206 is communicably connected to processor 204 via processing circuit 202 and includes computer code for executing (e.g., by processing circuit 202 and/or processor 204) one or more processes described herein.

Controller 200 is configured to generate control signals for base assembly 12 and/or lift apparatus 14 to perform a requested function as input by a user input device 1006. For example the user input device 1006 may be any buttons, levers, human machine interfaces, touchscreens, steering wheels, etc., that a user or operator of lift device 10 can provide the user input through. Controller 200 can receive the user input and generate control signals for base assembly 12, lift apparatus 14 or the various controllable elements (e.g., electric actuators, linear electric actuators, electric motors, etc.) to perform the requested function of base assembly 12 or lift apparatus 14 (e.g., steering operations, driving operations, lifting operations, turntable operations, etc.).

Controller 200 may receive sensor feedback from any of the systems, subsystems, electrical devices, etc., described herein through one or more sensors. Controller 200 receives a battery level of turntable batteries 802 from battery sensor 1004 and a battery level of base assembly batteries 806 from battery sensor 1002. Controller 200 may also generate and provide control signals for charger 808, power inverter 810, slip ring transmission 812, or charger 804 to perform recharging operations as described in greater detail above.

Charger 808 may be connected to a facility power source and can provide charging power to base assembly batteries 806. Controller 200 may monitor the battery level of base assembly batteries 806 and operate charger 808 to charge base assembly batteries 806 to achieve a desired level of charge. Base assembly batteries 806 can provide power to base assembly 12 or to the various electrical components of base assembly 12 so that the electrical components of base assembly 12 can operate to perform their respective functions (e.g., driving and steering functions). In some embodiments, base assembly batteries 806 provide electrical power (e.g., AC power) to base assembly 12 or the various electrical components thereof through power inverter 810.

Base assembly batteries 806 can provide DC power to power inverter 810. Power inverter 810 can provide AC power to slip ring transmission 812 so that the AC power (e.g., as supplied by charger 808 or from the facility power source) can be provided to turntable batteries 802 to recharge turntable batteries 802 (e.g., through charger 804). Controller 200 may generate control signals for charger 804 and/or slip ring transmission 812 to transfer the power from power inverter 810 to turntable batteries 802 to recharge turntable batteries 802. In some embodiments, controller 200 receives the battery level of turntable batteries 802 from battery sensor 1004 and operates charger 804, slip ring transmission 812, and power inverter 810 to charge turntable batteries 802 until turntable batteries 802 achieve at least a minimum level of charge. Controller 200 can also generate control signals for slip ring transmission 812 to rotate turntable assembly 800 relative to base assembly 12 as requested by the user input (e.g., to perform turntable operations).

It should be understood that controller 200 can be configured to operate charger 808, power inverter 810, slip ring transmission 812, and charger 804 to replenish or recharge turntable batteries 802 when charger 808 is connected to facility power or when charger 808 is not connected to facility power. For example, if controller 200 detects that the battery level as obtained by battery sensor 1004 is below a threshold level, controller 200 may operate charger 808, power inverter 810, slip ring transmission 812, and charger 804 to replenish turntable batteries 802 using energy provided by base assembly batteries 806.

Controller 200 can also restrict operation of base assembly 12 and/or lift apparatus 14 based on a connection status of charger 808 to facility power, the battery level of turntable batteries 802, and the battery level of base assembly batteries 806. For example, if controller 200 detects that turntable batteries 802 have a battery level that is below a first threshold, controller 200 may restrict operation of lift apparatus 14 to raise implement assembly 16 until turntable batteries 802 are replenished. Controller 200 may replenish turntable batteries 802 using the recharge or replenishing techniques described herein if the battery level of base assembly batteries 806 is sufficient to recharge or replenish turntable batteries 802 and/or if charger 808 is connected to facility power. If the battery level of turntable batteries 802 decreases below a second threshold level and controller 200 determines that charger 808 is still not connected to facility power and that base assembly batteries 806 do not have a sufficient battery level to replenish turntable batteries 802, controller 200 may restrict operation of base assembly 12 until charger is connected to facility power and may operate a display device or a notification system of lift device 10 to prompt the operator to connect charger 808 to facility power for recharge. Controller 200 may similarly restrict operation of base assembly 12 using the battery level of base assembly batteries 806. Controller 200 may also shut off power to lift device 10 (e.g., to base assembly 12 and/or lift apparatus 14 and/or turntable assembly 800) in response to detecting a period of user inactivity to maintain or preserve state of charge of base assembly batteries 806 and/or turntable batteries 802.

Figure 25:
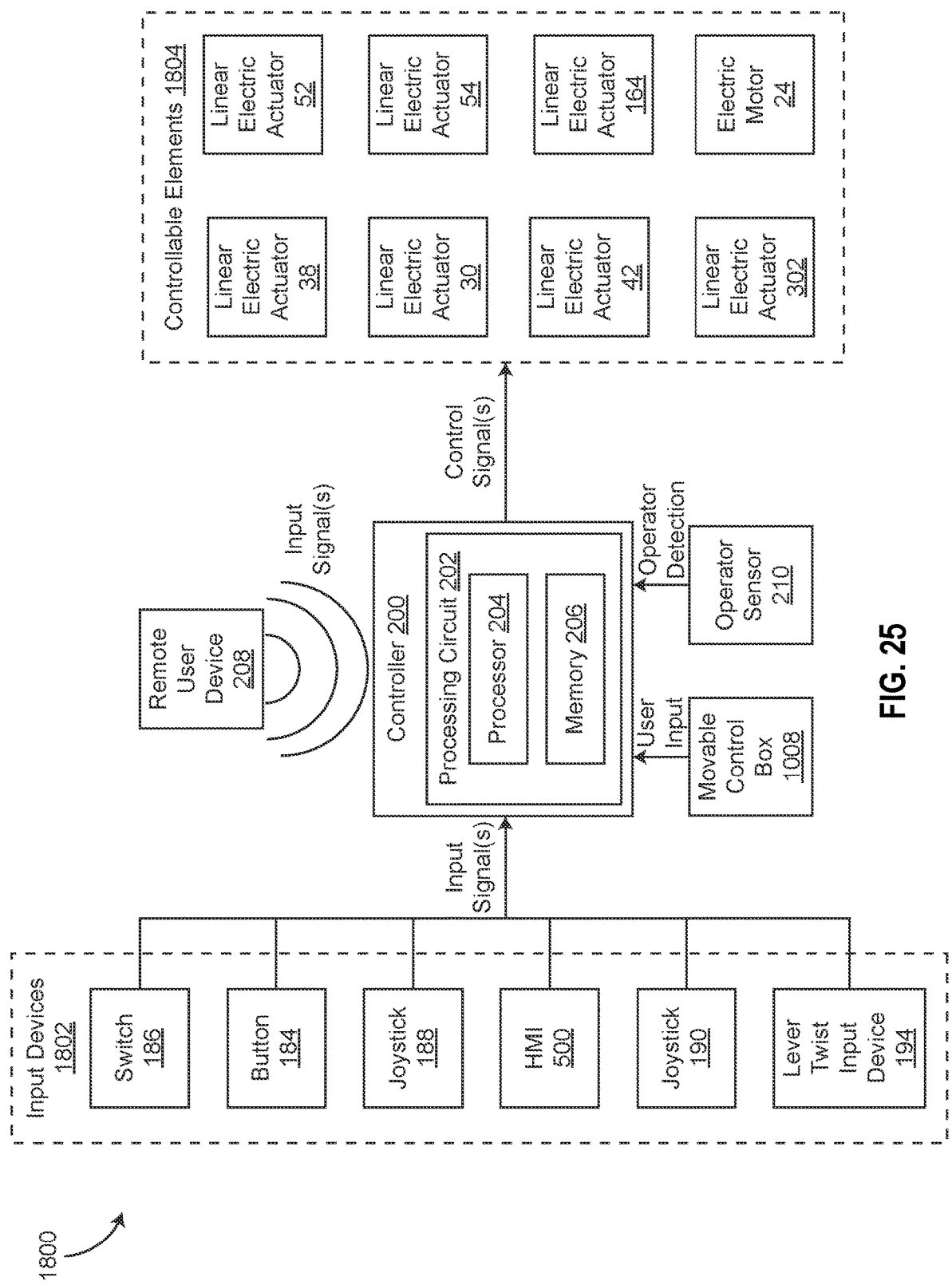
FIG. 25 is a block diagram of a control system for the lift device of FIG. 1, according to an exemplary embodiment.

Referring particularly to FIG. 25, a control system 1800 for lift device 10 includes controller 200, input devices 1802, and controllable elements 1804. In some embodiments, input devices 1802 includes, but is not limited to, switch 186, button 184, joystick 188, HMI 500, joystick 190, and lever twist input device 194. Likewise, controllable elements 1804 can include, but is not limited to, linear electric actuator 38, linear electric actuator 52, linear electric actuator 30, linear electric actuator 54, linear electric actuator 42, linear electric actuator 164, linear electric actuator 302, and electric motor 24. Controller 200 is configured to receive various input signals from the input devices 1802 and generate control signals for any of the controllable elements 1804 of lift device 10.

In some embodiments, controller 200 is wirelessly communicably coupled with a remote user device 208. Controller 200 can receive a user input or a request to deploy deployable operator station 100 from the remote user device 208. In response to receiving the user input, controller 200 can generate control signals for the various controllable elements 1804 to deploy deployable operator station 100. Advantageously, remote user device 208 and controller 200 can facilitate initiating deployment of deployable operator station 100 before the user or operator is at lift device 10 (e.g., is a distance away from lift device 10).

Figure 41:
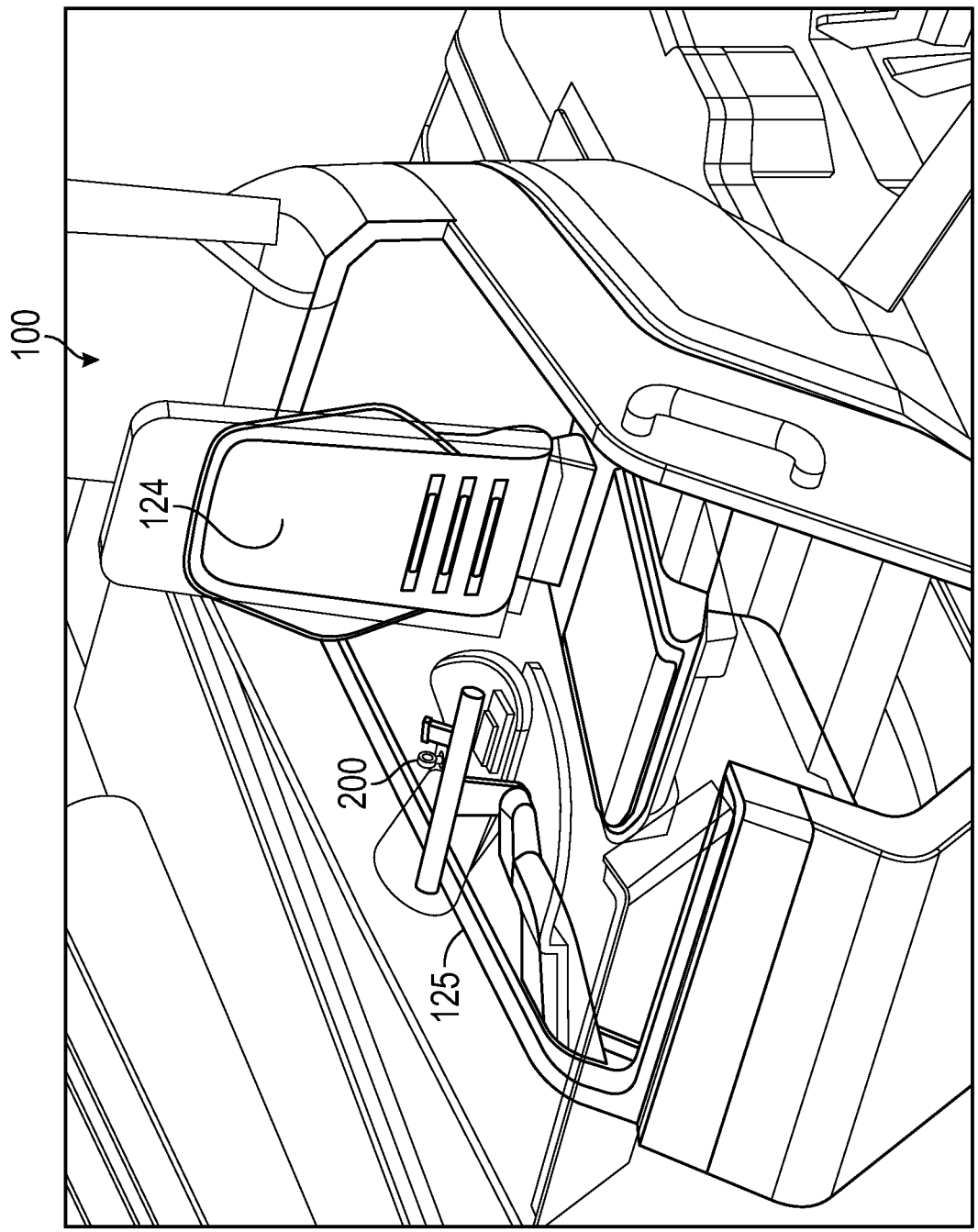
FIG. 41 is a perspective view within the deployable operator station shown in FIG. 38, detailing a control mechanism that can be used to operate the lift device, according to an exemplary embodiment.
Figure 42:
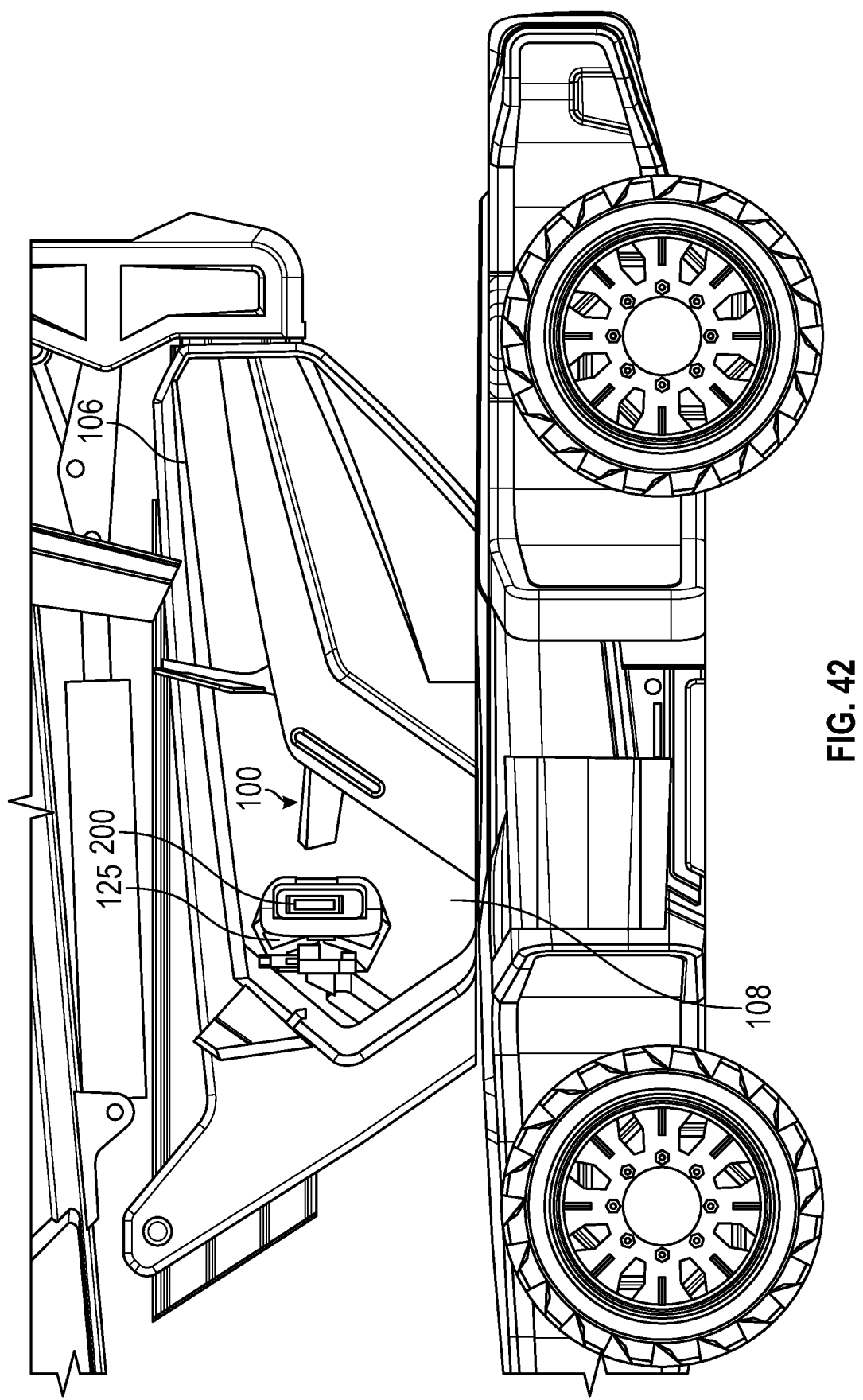
FIG. 42 is a side view of the lift device of FIG. 34, depicting an interior of the deployable operator station, according to an exemplary embodiment.
Figure 43:
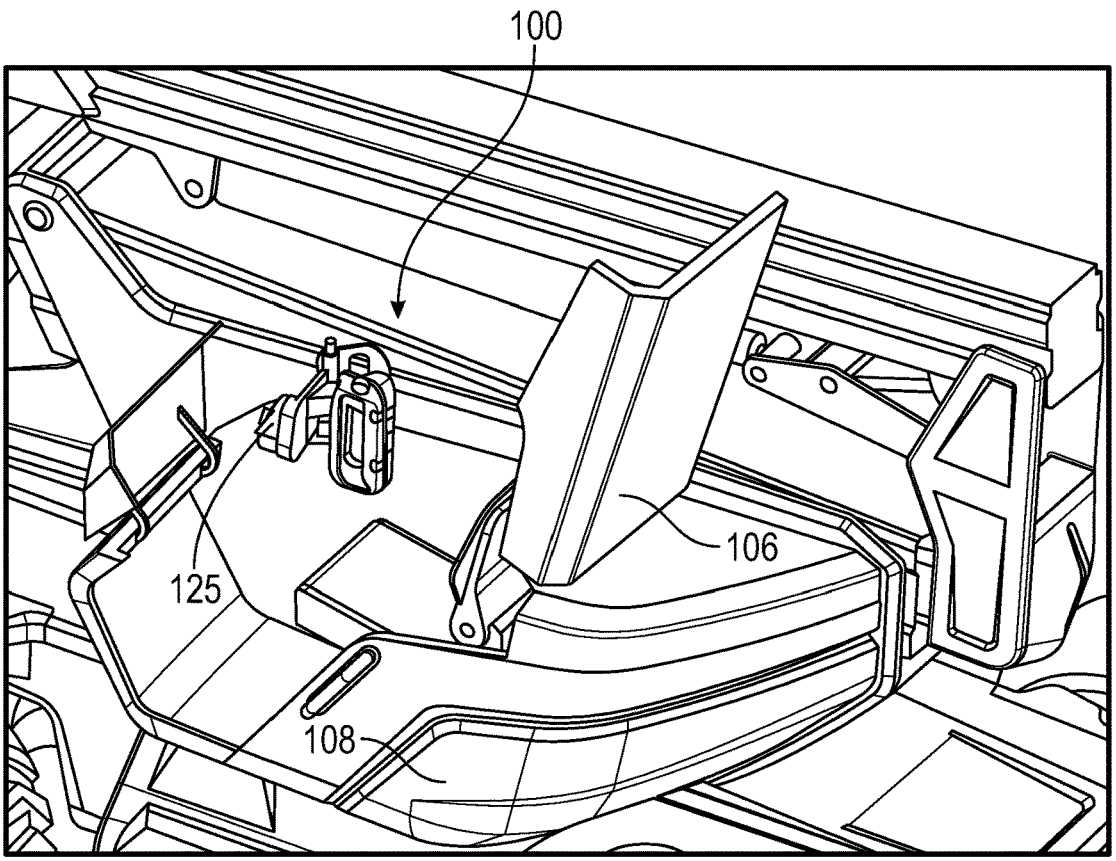
FIG. 43 is a top, rear perspective view of the lift device of FIG. 34, detailing the deployable operator station shown in FIG. 38.
Figure 44:
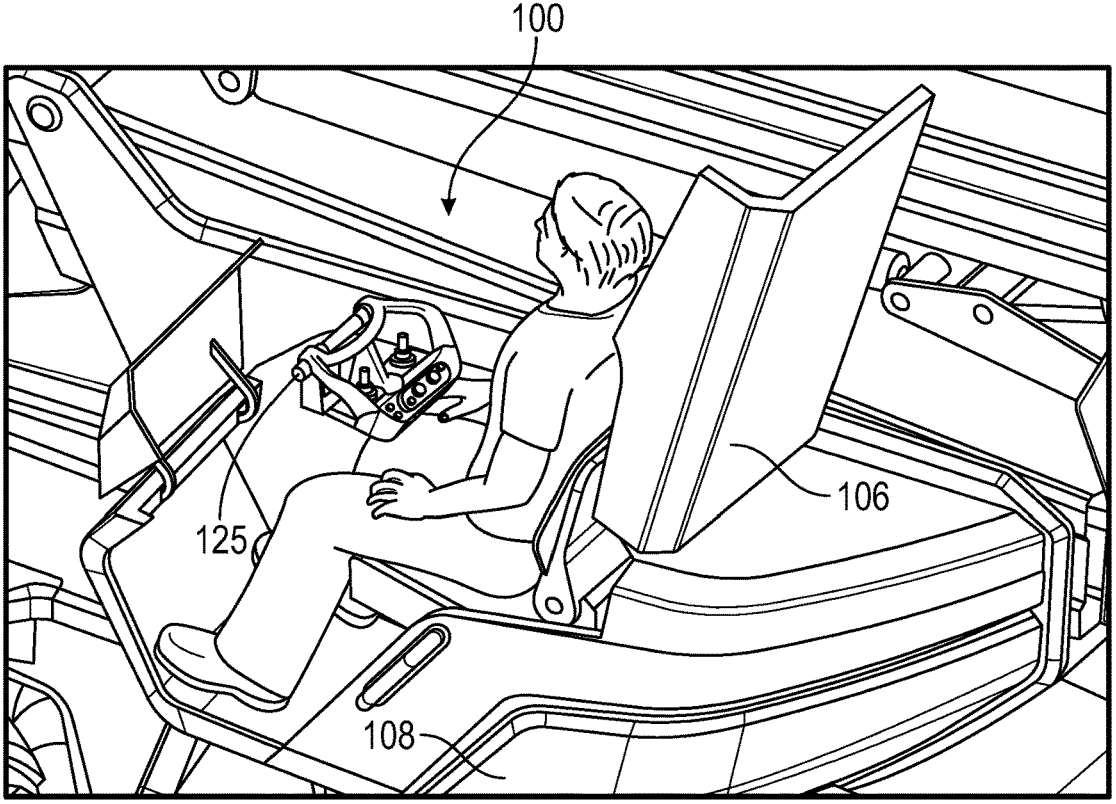
FIG. 44 is a top, rear perspective view of the lift device of FIG. 34, with an operator seated within the deployable operator station shown in FIG. 43, according to an exemplary embodiment.

Controller 200 can also be configured to restrict, prevent, or inhibit one or more functions of lift device 10 in response to receiving an indication from an operator sensor 210 that an operator is not present at deployable operator station 100. Operator sensor 210 can be a camera, a distance or proximity sensor, a motion detector, a temperature sensor, a weight sensor, an accelerometer, etc., or any other sensor that can detect a presence of an operator at deployable operator station 100. In some examples, the controller 200 can function as a key that can be used to activate one or more electric motors within the lift device 10. In some examples, and as shown in FIG. 41, a docking station 125 is positioned within the operator station 100. To activate the lift device 10, a user can first dock the remote and mobile controller 200 onto the docking station 125. Coupling the hand-held controller 200 to the docking station 125 can create a wired or otherwise reliable connection with the controller 200 to execute and communicate commands to the various systems throughout the lift device 10. When the operator is done operating the machine, the operator can remove the hand-held controller 200. The hand-held controller 200 can then be individually charged off-site, for example, to limit the current draw form the electrical energy storage devices 40 positioned onboard the lift device 10. By removing the hand-held controller 200 from the operator station 100, an operator can effectively remove the entire operating system of the lift device 10, which further prohibits unauthorized use of the lift device 10. Additional display elements can be provided to incorporate feedback from cameras positioned about the base assembly 12 of the lift device 10. The display elements can provide diagnostic or operational information that can help an operator within the operator station 100 to perform a desired task with the lift device 10.

Figure 28:
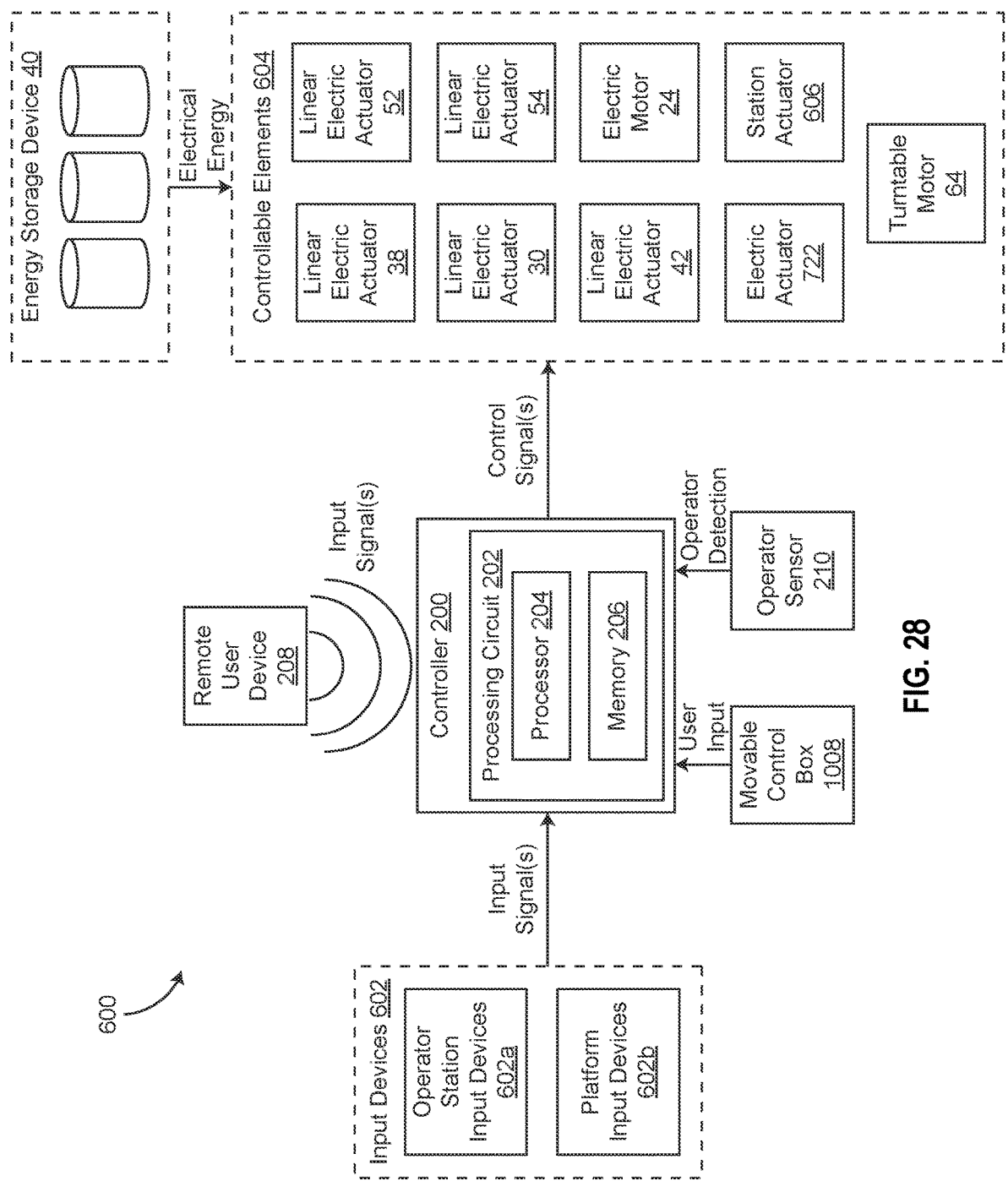
FIG. 28 is a block diagram of a control system of the lift device of FIG. 1, according to an exemplary embodiment.
Figure 31:
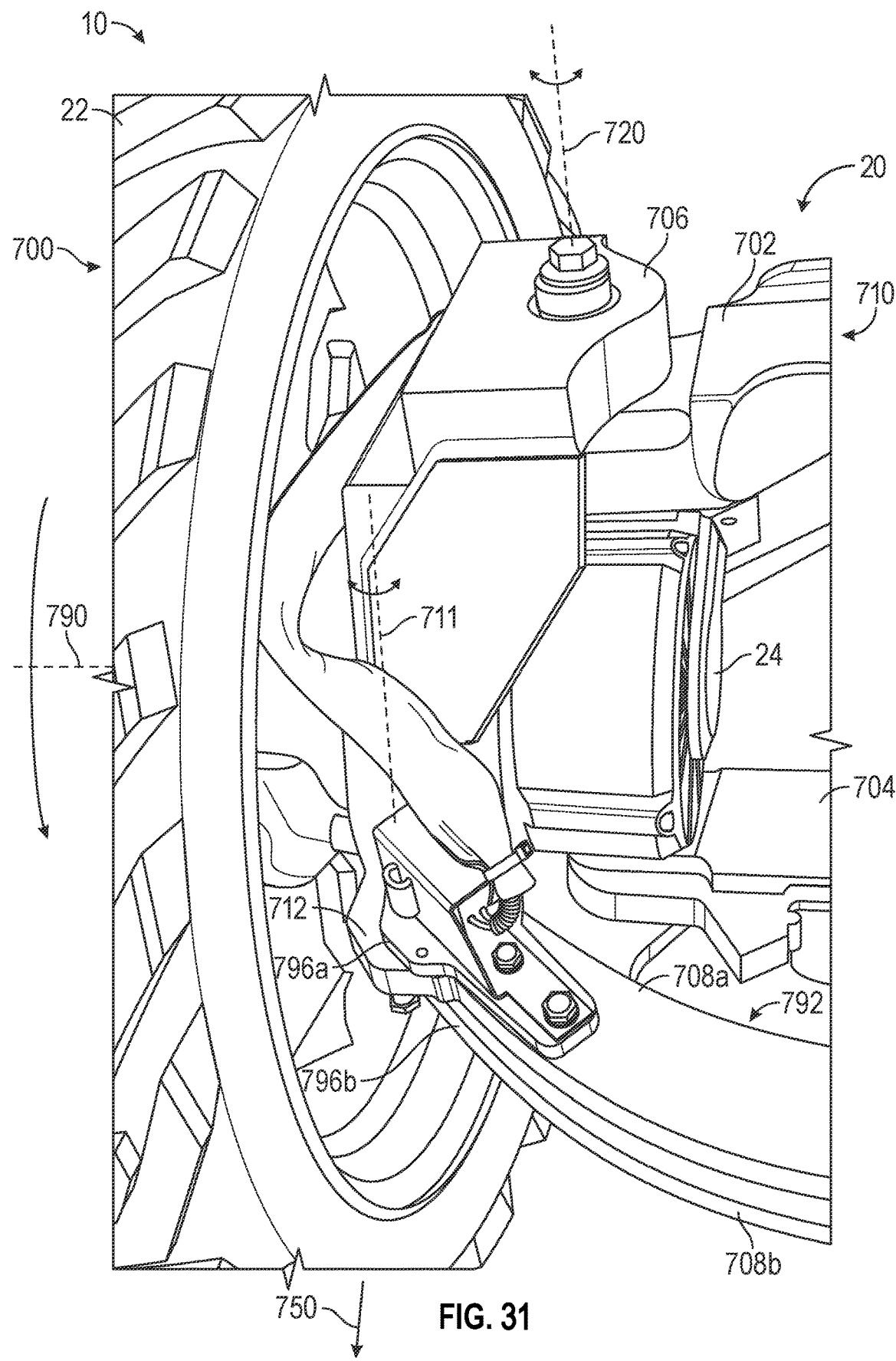
FIG. 31 is a perspective view of a portion of the steering system of the lift device of FIG. 1, according to an exemplary embodiment.
Figure 32:
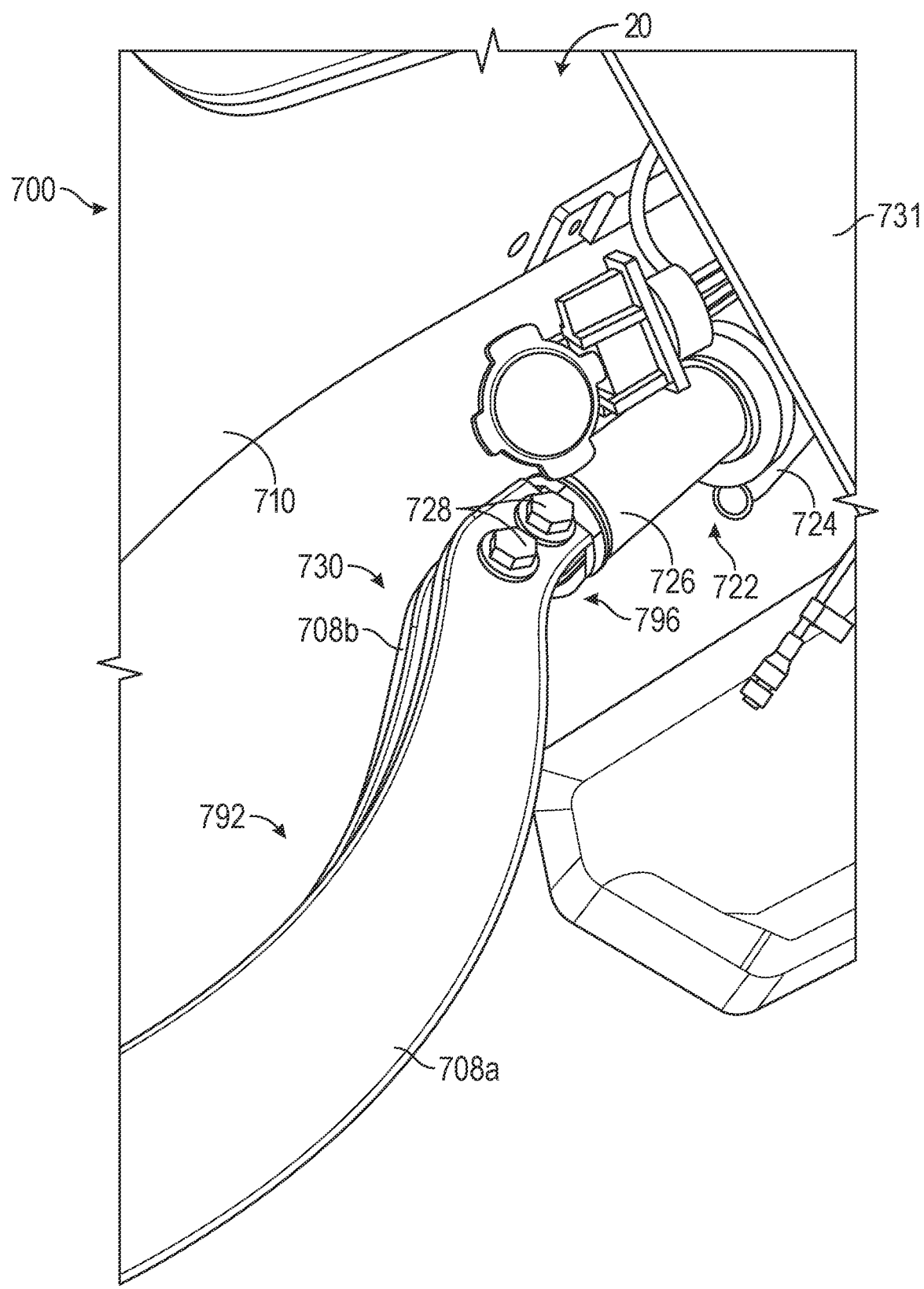
FIG. 32 is a perspective view of a portion of the steering system of the lift device of FIG. 1, according to an exemplary embodiment.
Figure 33:
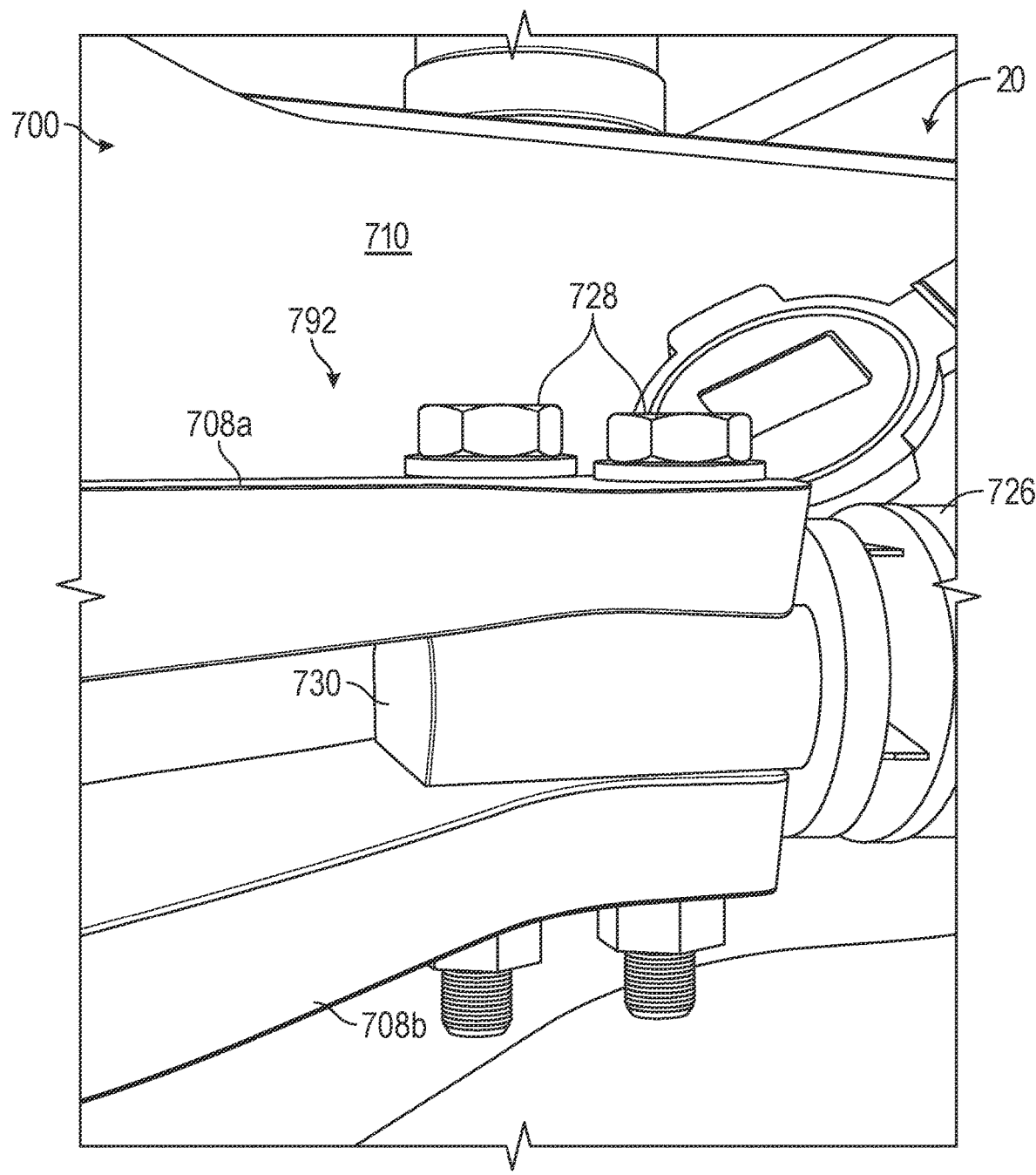
FIG. 33 is a perspective view of a portion of the steering system of the lift device of FIG. 1, according to an exemplary embodiment.

Referring particularly to FIG. 28, another control system 600 for lift device 10 includes controller 200, input devices 602, and controllable elements 604. Control system 600 can be the same as or similar to control system 1000. For example, control system 600 can include any of the input devices 1802 as shown in FIG. 25. In some embodiments, input devices 602 includes, but is not limited to, operator station input devices 602a and platform input devices 602b. Likewise, controllable elements 604 can include, but are not limited to, linear electric actuator 38, linear electric actuator 52, linear electric actuator 30, linear electric actuator 54, linear electric actuator 42, electric motor(s) 24, electric actuator 722, turntable motor 64, and/or a station actuator 606 that is configured to operate to at least partially deploy deployable operator station 100. Controller 200 is configured to receive various input signals from the input devices 602 and generate control signals for any of the controllable elements 604 of lift device 10.

In some embodiments, controller 200 is wirelessly communicably coupled with a remote user device 208. Controller 200 can receive a user input or a request to deploy deployable operator station 100 from the remote user device 208. In response to receiving the user input, controller 200 can generate control signals for the various controllable elements 604 (e.g., station actuator 606) to deploy deployable operator station 100. Advantageously, remote user device 208 and controller 200 can facilitate initiating deployment of deployable operator station 100 before the user or operator is at lift device 10 (e.g., is a distance away from lift device 10). In some embodiments, controller 200 is configured to receive input signals from remote user device 208 to operate lift device 10 (e.g., to drive or steer lift device 10). For example, if lift device 10 is configured as a MEWP, the operator may operate lift device 10 (e.g., to operate lift apparatus 14, steering system 700, driving operations, steering operations, turntable assembly 800, etc.) from platform assembly 90 using remote user device 208. The operator can also control lift device 10 through remote user device 208 when the operator is off-boarded and boarded onto the platform assembly 90. When lift device 10 is in the MEWP mode, the operator can control or operate lift device 10 through ground control and/or work platform control.

Referring still to FIG. 28, controllable elements 604 are shown consuming or receiving electrical energy from energy storage devices 40. Energy storage devices 40 can use split-battery technology or techniques to ensure continuous rotation of turntable assembly 800 and to facilitate extended battery life or improved energy consumption efficiency of controllable elements 604.

Controller 200 can operate controllable elements 604 according to various modes. For example, controller 200 may operate lift device 10 in a MEWP mode and an MH mode. When lift device 10 is configured as a MEWP, controller 200 may operate electric motor(s) 24 so that functional performance and load carrying capacities are maintained equivalent or above a traditional MEWP that is not transformable into an MH. In the MEWP mode, controller 200 may allow lift speeds that are typical for traditional MEWPs. However, controller 200 may operate electric motors 24 so that lift device 10 can travel or transport at a speed that is twice as fast as traditional MEWPs. In some embodiments, controller 200 maintains deployable operator station in the deployed state or position when lift device 10 is in the MEWP mode.

Controller 200 may also transition lift device 10 into the MH mode after platform assembly 90 has been replaced with forks 18, a material handling assembly, a glass holder, a platform configured to support materials or additional loads, etc., or any other implement. Controller 200 may operate controllable elements 604 to deploy deployable operator station 100 for the MH mode. In this way, an operator may sit at deployable operator station 100 and operate lift device 10. In some embodiments, a drive speed that lift device 10 can achieve when in the MH mode is 2-3 times greater than a maximum speed that lift device 10 can achieve when in the MEWP mode. When controller 200 operates lift device 10 according to the MH mode, a lift speed of lift apparatus 14 may be the same as or similar to a lift speed of a traditional material handler. Advantageously, lift device 10 may have a load bearing capability when in the MH mode that is greater than a traditional MH. Advantageously, deployable operator station 100 can be deployed or tucked/stowed to facilitate improved visibility. Additionally, deployable operator station 100 may provide additional or improved visibility compared to other telehandlers that use traditional cabs.

Controller 200 can also be configured to restrict, prevent, or inhibit one or more functions of lift device 10 in response to receiving an indication from an operator sensor 210 that an operator is not present at deployable operator station 100. As shown in FIG. 2, operator sensor 210 may be positioned at deployable operator station 100 (e.g., at seat 124). Operator sensor 210 can be a camera, a distance or proximity sensor, a motion detector, a temperature sensor, a weight sensor, an accelerometer, etc., or any other sensor that can detect a presence of an operator at deployable operator station 100.

Referring to FIGS. 10, 25, and 28, any of the control systems 1000, 1800, or 600 that can be implemented on the lift device 10 may include a movable control box 1008. The movable control box 1008 can be a component of the lift device 10. The movable control box 1008 can be configured to wirelessly or wiredly communicably couple with the controller 200. For example, the movable control box 1008 can be communicably coupled with the controller 200 via a wire or a plug at either the deployable operator station 800 (e.g., at the HMI 500), a fixed operator station of the lift device 10, the platform assembly 90, the implement assembly 16, etc. The movable control box 1008 can be removed and wiredly de-coupled from its plug, and moved to another location on the lift device 10 where it can be communicably coupled with a different plug. For example, the movable control box 1008 can be wiredly coupled with a plug or a quick disconnect at the deployable operator station 800 or at the implement assembly 16 (e.g., if the implement assembly 16 is provided as the platform assembly 90).

The movable control box 1008 can include various switches, buttons, levers, joysticks, etc., to facilitate providing a user input to controller 200. The movable control box 1008 can provide the user input to controller 200 to operate the lift device 10 (e.g., to drive or steer the lift device 10 or to operate the lift apparatus 14). The platform assembly 90 or the operator station 800 can include a receptacle for storing the movable control box 1008. For example, the deployable operator station 800 can include a receptacle for storage of the movable control box 1008 (or other storage) so that the movable control box 1008 can be protected and secured when the deployable operator station 800 is transitioned into the tucked or stowed position.

Advanced Worksite Control

Referring to FIGS. 46-58, the lift device 10 can be used to perform various different types of tasks at a jobsite 2000, including both autonomous, semi-autonomous, and manual tasks that can be performed by an operator while being both physically within the lift device 10 or remote. The jobsite 2000 can include a variety of different equipment, including lift devices 10 and other MEWPs and material handling vehicles 2002 that can be remotely monitored and controlled using a series of cameras and controllers positioned throughout the jobsite 2000. The cameras can be positioned on the lift devices 10, MEWPs, material handling vehicles 2002, and one or more drones 2004 that can monitor the jobsite 2000 from the air. The various vehicles and devices at the jobsite 2000 can be centrally controlled or monitored by a mobile device (e.g., a phone, tablet, computer, etc.). In some examples, several mobile devices can monitor and/or control different equipment at the jobsite 2000 simultaneously, using camera footage from different cameras on the jobsite and operational information received from equipment or the drones 2004. In some examples, the various cameras positioned throughout the worksite can record activity on the jobsite 2000. In some examples, the drones 2004 and/or other equipment can monitor environmental characteristics, such as noise and pollution, which are present at the jobsite 2000.

Figure 47:
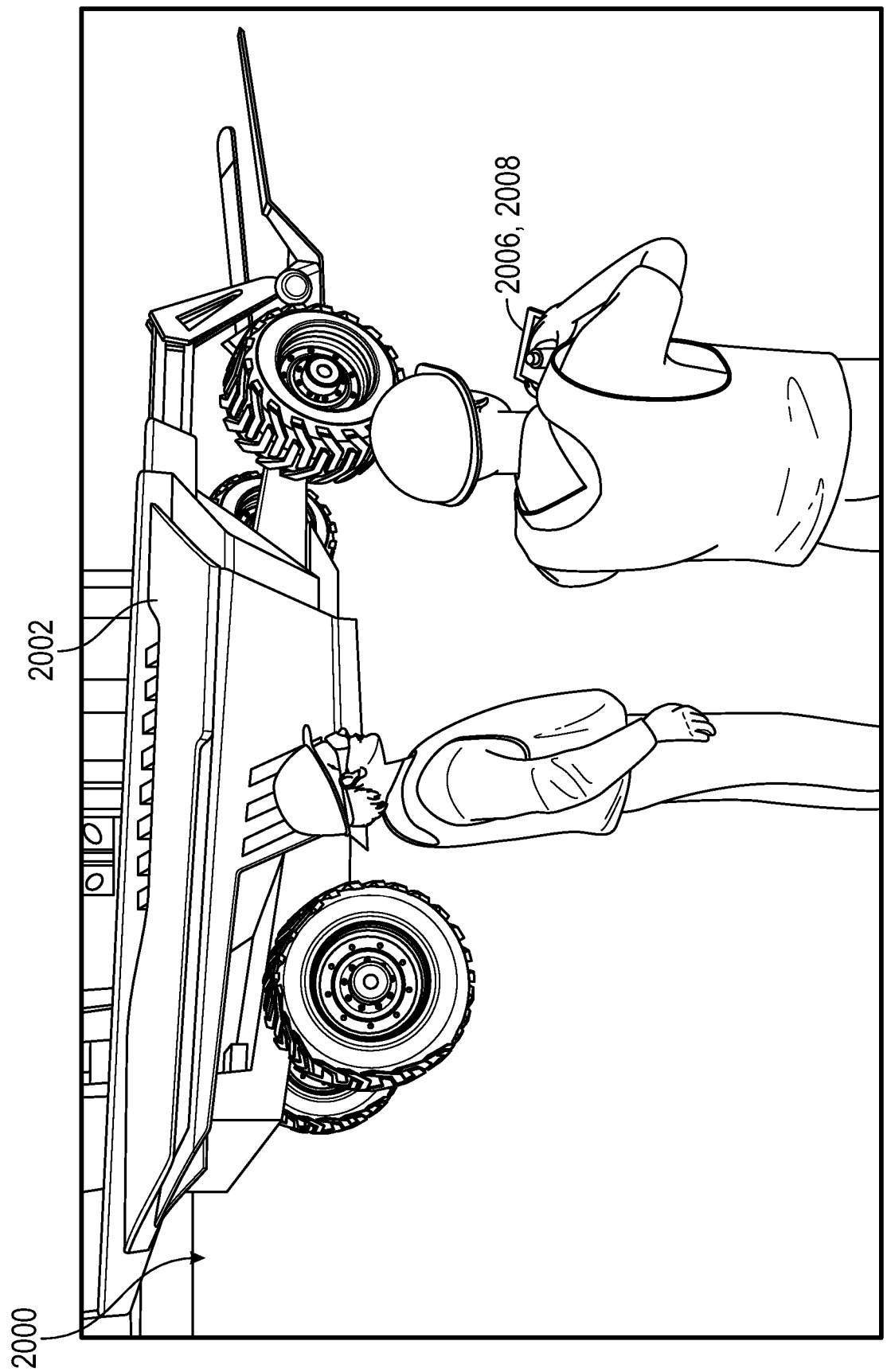
FIG. 47 is a pictorial view of a remote controller used to operate a lift device, such as the lift device of FIG. 1 or 34, according to an exemplary embodiment.
Figure 48:
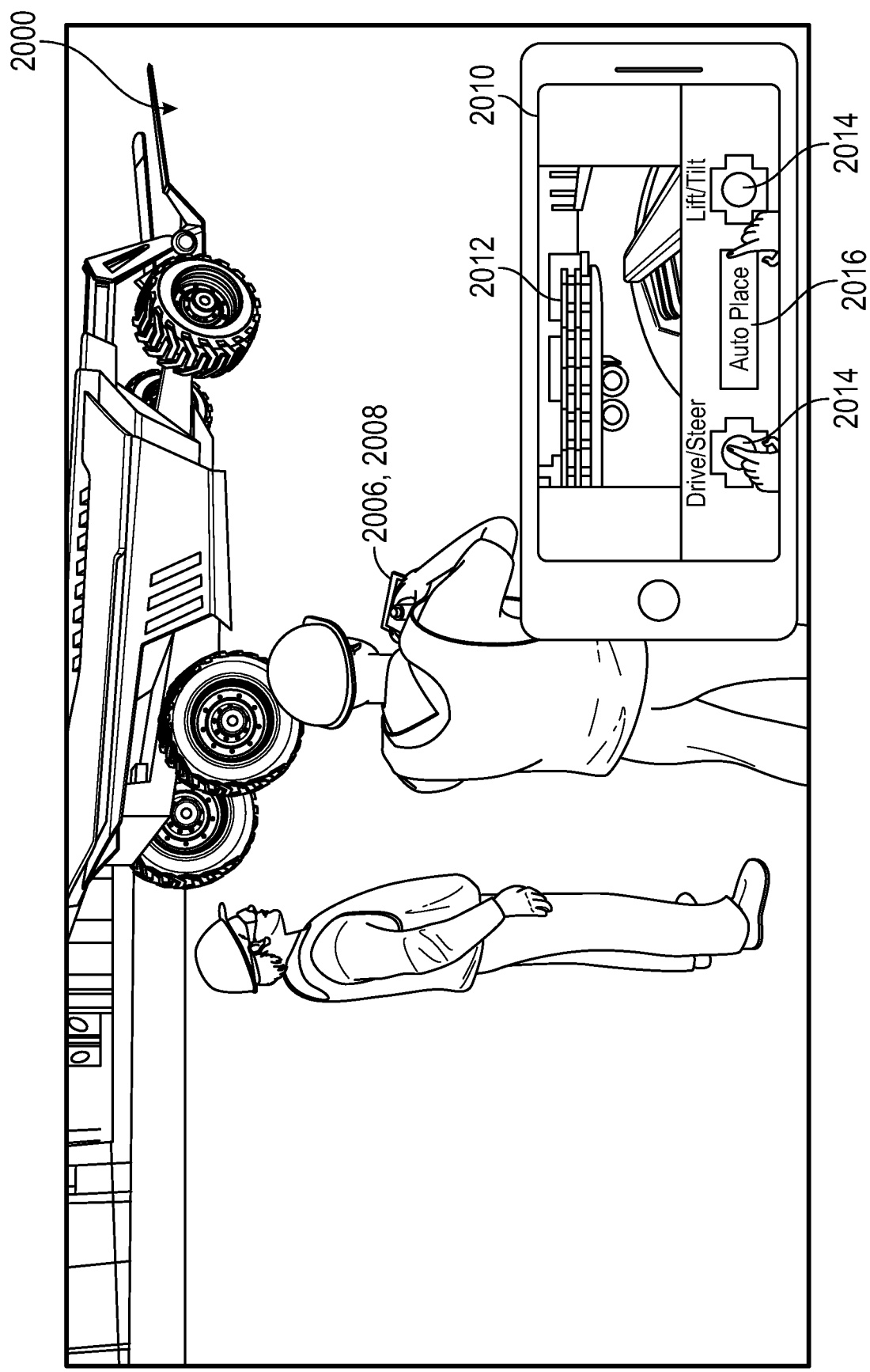
FIG. 48 is a pictorial view of an operator remotely operating a selectively autonomous or semi-autonomous lift device, such as the lift device of FIG. 1 or 34, according to an exemplary embodiment.
Figure 49:
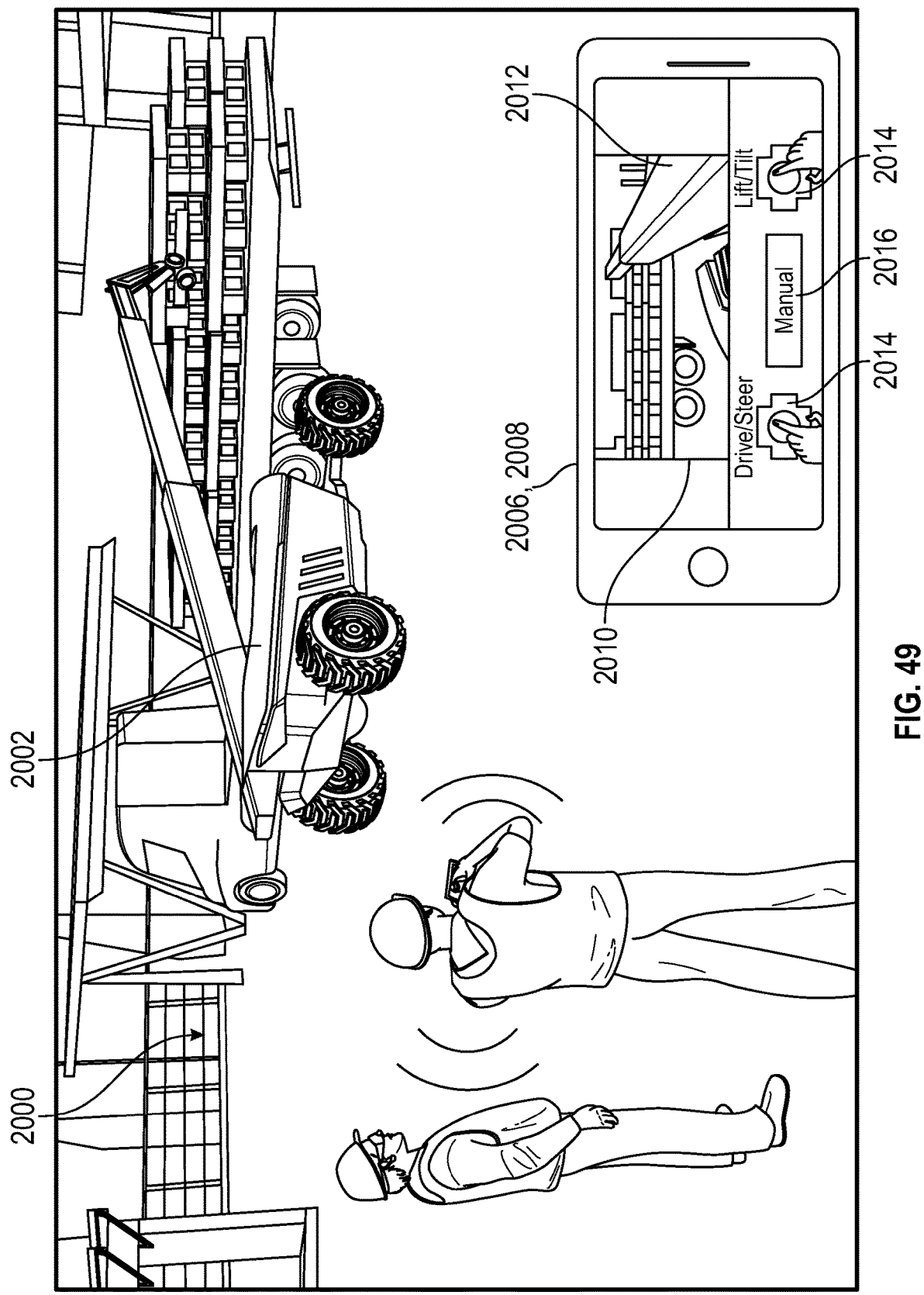
FIG. 49 is another pictorial view of an operator remotely operating a selectively autonomous or semi-autonomous lift device, such as the lift device of FIG. 1 or 34, according to an exemplary embodiment.

Referring now to FIGS. 47-49, an operator is depicted remotely controlling a material handling vehicle 2002 using a controller 2006. The various equipment throughout the jobsite 2000 can be monitored and/or controlled using the controller 2006, which can be a part of or incorporated into a handheld mobile device 2008 (e.g., a phone, a tablet, laptop, etc.). In some examples, and as depicted in FIG. 48-49, the mobile device 2008 includes a graphical user interface (GUI) 2010 that can display a variety of different data sets relating to the jobsite 2000. The data sets can include machine performance or health status, for example, and can also include real-time data feeds (performance parameters, camera views, etc.) from one or more lift devices 10, MEWPs 2002, or drones 2004 positioned throughout the jobsite 2000.

In some examples, the controller 2006 can be used to adjust a status of the one or more lift devices 10, MEWPs 2002, or drones 2004 on the jobsite 2000. For example, and as depicted in FIG. 48, the controller 2006 can be used to toggle through various different operational modes of the equipment at the jobsite 2000. In some embodiments, the different operational modes can include an autonomy level. Using the controller 2006, a user can transition a piece of equipment at the jobsite 2000 between a manual mode of operation (e.g., where someone provides driving and lifting instructions while physically present within the device), a remote manual mode of operation (e.g., where an operator provides driving and lifting instructions remotely, through the controller 2006 or other system), a semi-autonomous mode of operation (where a user controls vehicle travel but the implement assembly works autonomously), and a fully autonomous mode of operation. In some examples, the instructions to the equipment when the equipment is in the remote manual mode and/or the semi-autonomous modes of operation can be provided wirelessly using the controller 2006. Accordingly, an operator can control the position and/or operation of a piece of equipment using the controller 2006, without needing to be physically present within the lift device 10, MEWP 2002, or drone 2004. In still other examples, the controller 2006 acts as a key that can unlock the equipment to travel in the manual mode of operation when the equipment detects the controller is physically present within the deployable operator station 100.

The different operational modes available for selection by the user can also be defined by desired tasks for the lift device 10, MEWPs 2002, or drones 2004, or other equipment types to perform. For example, an operator can select the lift device 10, which can provide a number of available tasks and/or modes that can be accomplished by the lift device 10. In some examples, the different modes can include a material handling mode and an aerial work platform (AWP) mode. Depending on the selection of mode made by the user (e.g., using the controller 2006 and/or GUI 2010), the lift device 10 can determine whether it first needs to reconfigure its implement assembly 16. If the material handling mode is selected, the lift device 10 (e.g., using the controller 200) or the controller 2006 will first determine whether the appropriate implement is currently coupled to the lift apparatus 14. If the lift device 10 or controller 2006 detects that a platform assembly 90 is coupled to the lift apparatus 14 (as opposed to forks 18, for example), the lift device 10 can first travel to a nearby location to execute an implement changing operation. The platform assembly 90 can be decoupled from the lift apparatus 14 and the forks 18 can be engaged by the lift apparatus 14. With the forks 18 attached to the lift device 10, the material handling mode can be achieved. Conversely, if the AWP mode is selected, the lift device 10 and/or the controller 2006 will determine whether a suitable platform assembly 90 is coupled to the lift apparatus 14, and execute a change operation automatically if needed to transition from the material handling mode back to the AWP mode.

As depicted in FIGS. 48-49, the GUI 2010 on the mobile device 2008 can include a split configuration that provides real-time media (e.g., images, video, etc.) taken from one or more cameras positioned on the equipment, as well as controls that can be used to direct and/or drive the lift device 10 or other equipment. In some examples, the GUI 2010 is configured to provide a forward facing view 2012 from a camera positioned on the lift device 10, as well as one or more virtual joysticks 2014 or pads that can allow an operator to execute different driving, steering, lifting, or tilting operations. Accordingly, the operator can control both the primary mover and the lift apparatus 14 using the mobile device 2008 and GUI 2010. In some examples, the GUI 2010 further includes a mode selection actuator 2016 as well. Tapping the mode selection actuator 2016 can toggle the lift device 10 (or other selected equipment) through various operational modes, as discussed above.

Figure 50:
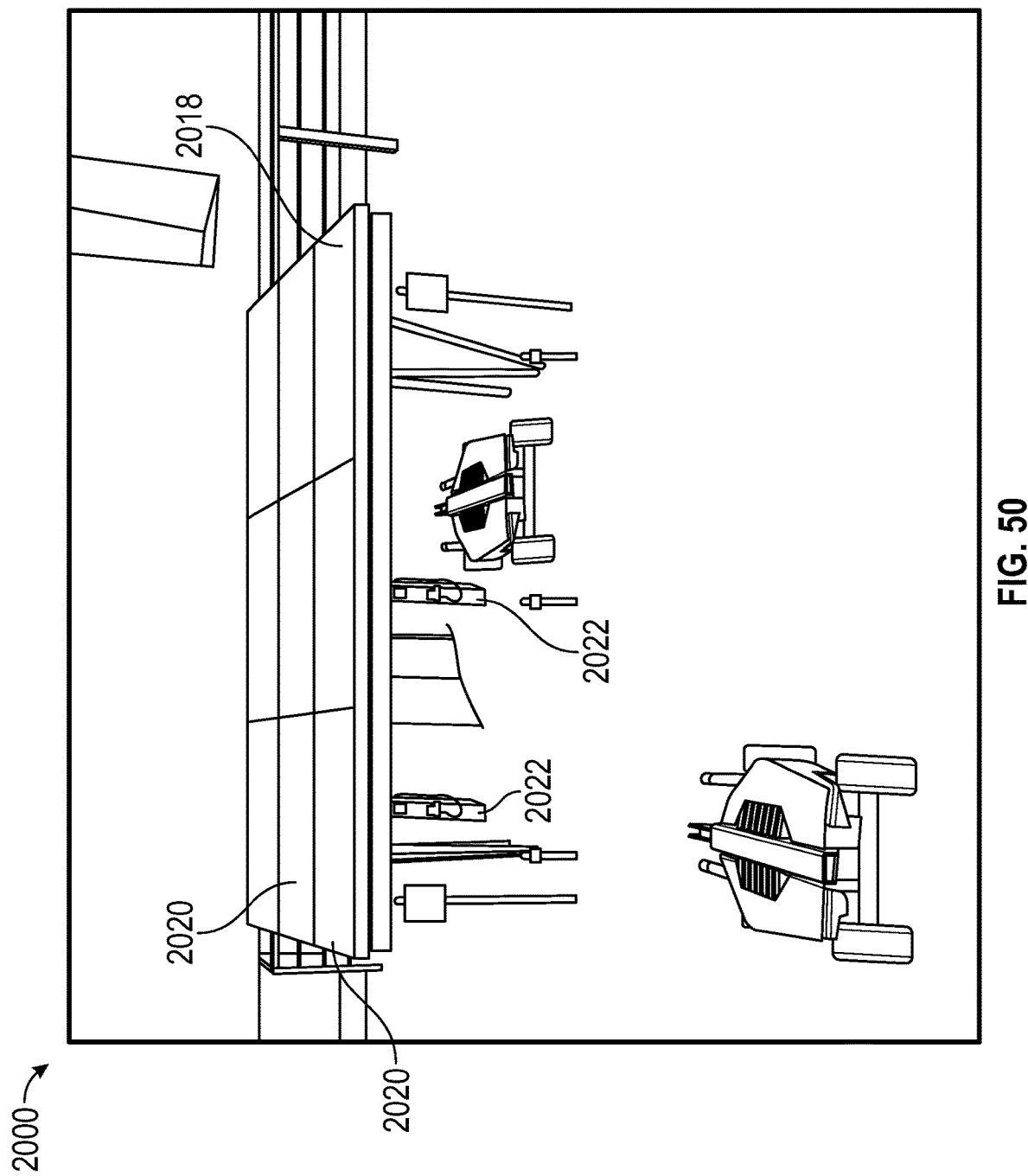
FIG. 50 is a pictorial view of lift devices traveling to a solar recharging station, according to an exemplary embodiment.
Figure 51:
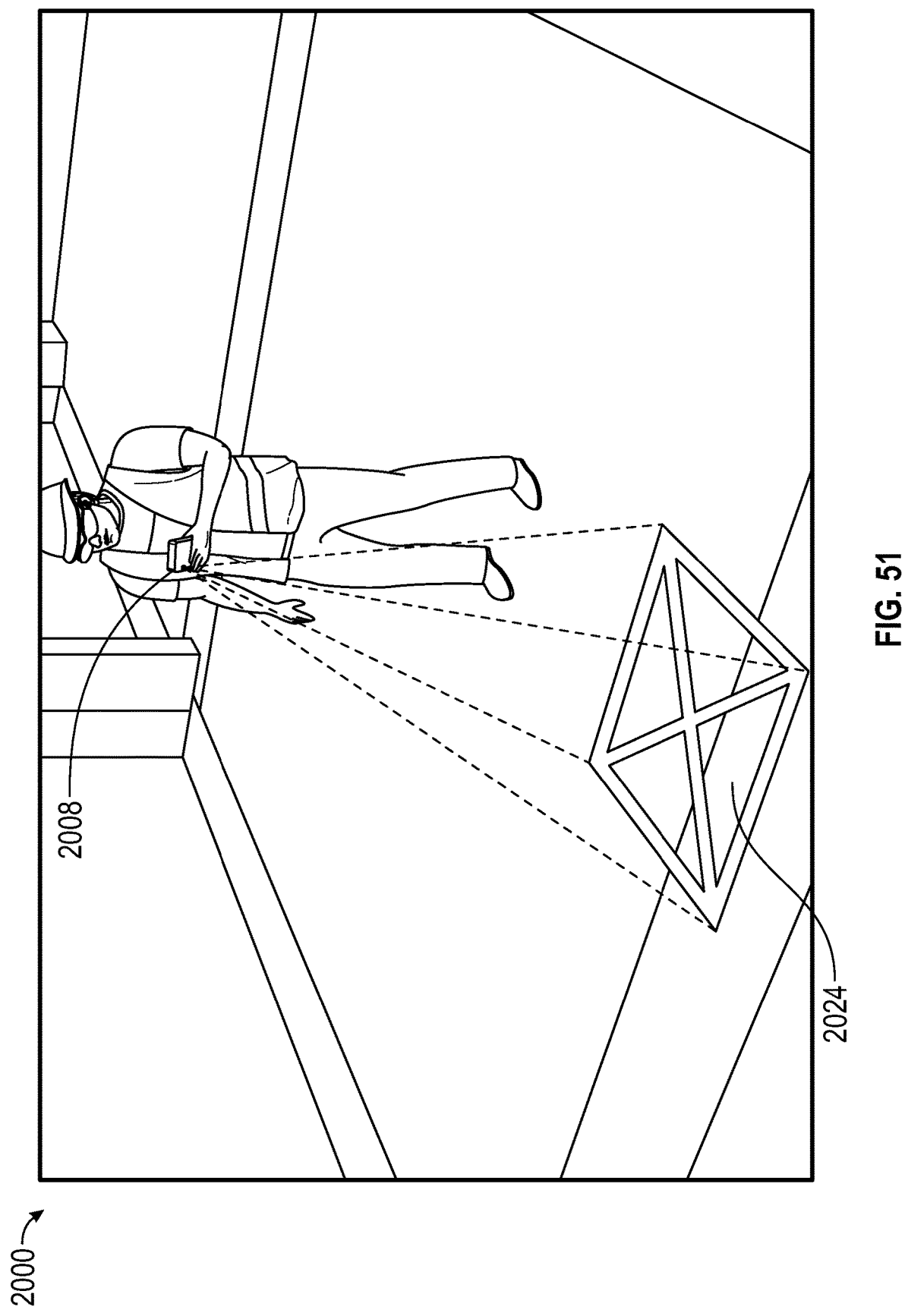
FIG. 51 is a pictorial view of an operator providing a target projection for a lift device to deliver materials to, according to an exemplary embodiment.

Referring to FIG. 50, the various equipment, including the lift device(s) 10 and MEWPs 2002 at the jobsite 2000 can be electrically powered. Accordingly, over time, the energy storage devices 40 on the various equipment will expend energy and need to be recharged. The jobsite 2000 can include a charging station 2018 that can enable quick and autonomous recharging of the various equipment. The charging station 2018 includes several solar panels 2020 that can be configured to harvest and store energy from sunlight. The harvested energy can be transmitted to the lift device(s) 10 or MEWPs 2002 positioned below or near the charging station 2018 through wired or wireless connections. In some examples, the charging station 2018 includes one or more charging cords 2022 that can be plugged into a piece of equipment to begin the charging operation. An operator can be assigned to the charging station so that the physical plug-in process can be executed to couple the equipment to the charging station 2018 using the cord 2022.

Figure 52:
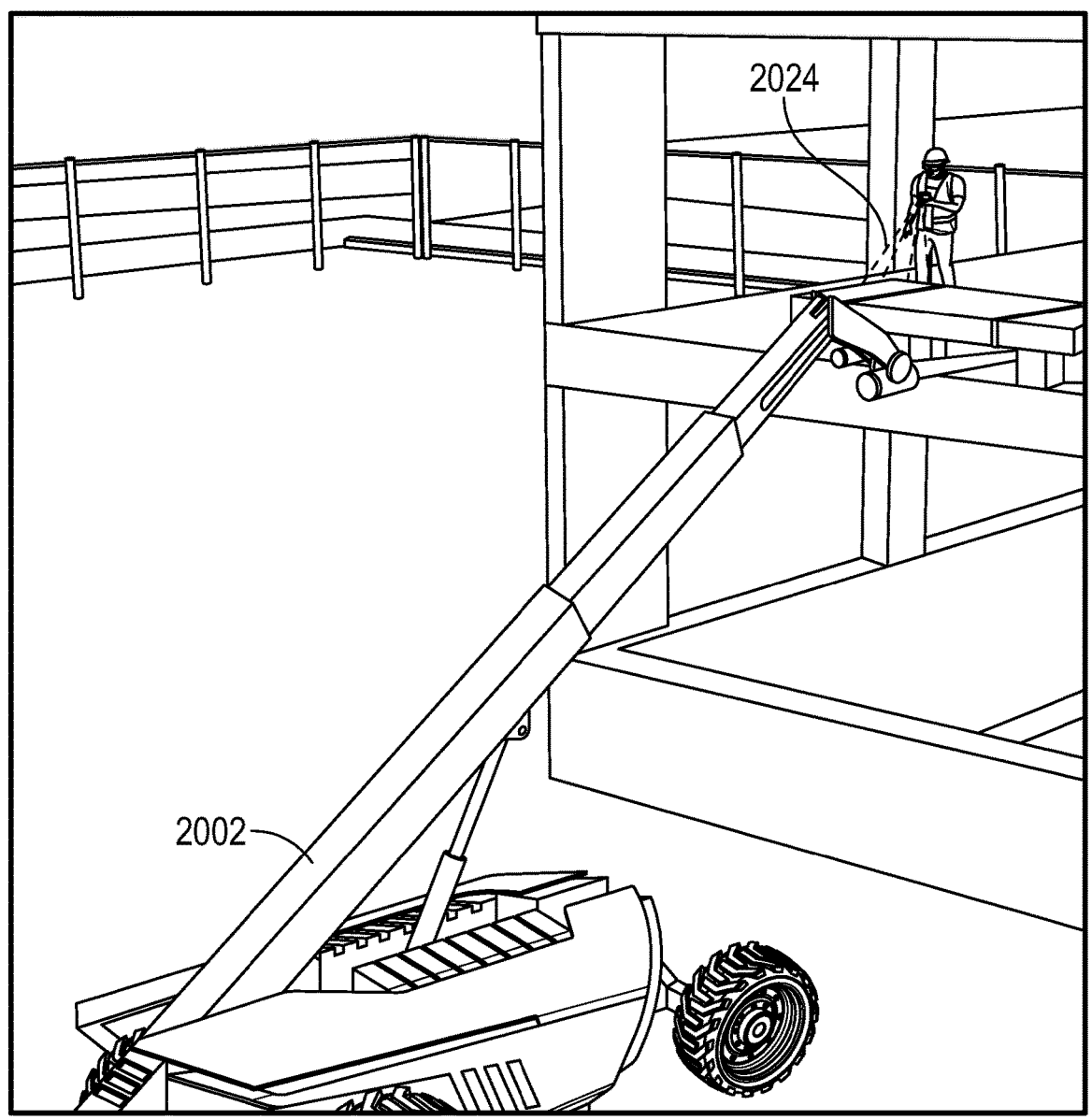
FIG. 52 is a pictorial view of a lift device, such as the lift device of FIG. 1 or 34, delivering a load to the target projection shown in FIG. 51, according to an exemplary embodiment.
Figure 57:
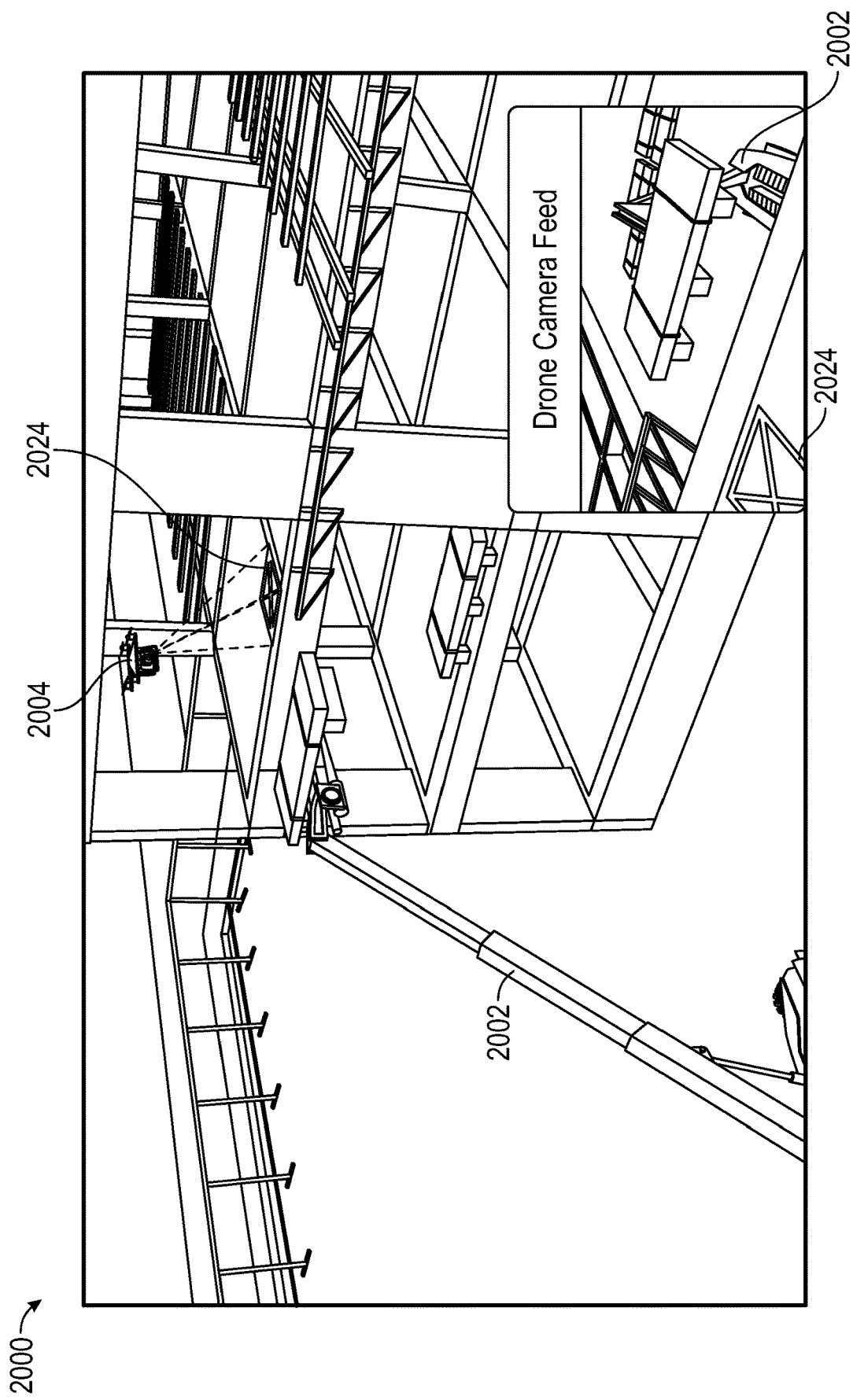
FIG. 57 is a pictorial view of a lift device, such as the lift device of FIG. 1 or 34, delivering materials to the target projection provided by the drone of FIG. 56, with the drone actively monitoring the materials as the materials are being moved toward the target projection.

Referring to FIGS. 51-52 and 55-57, the lift device 10 and/or the MEWPs 2002 can be arranged to perform tasks using target-style projections to direct the lift device 10 and/or MEWPs 2002 about the jobsite 2000. In some examples, a mobile device (e.g., the mobile device 2008 or another mobile device) can be used to provide a target projection 2024 onto an area, such as an elevated surface. The mobile device projects the target 2024 onto a surface, which can then be identified and used by the controller 200 of the lift device 10 to position the implement assembly 16 until it reaches the projected target 2024. In some examples, the drone 2004 can supply the target projection 2024. Accordingly, an operator can use the controller 2006 to select a target area. With target selected, the drone 2004 can fly toward the target area, then project the target 2024 onto the selected area below. The controller 200 can then position the lift device 10 so that the implement assembly 16 is within the projected target 2024. Once the implement assembly 16 reaches the target area 2024 (which can be done using sensor feedback, optical sensors, etc.), the implement assembly 16 can then offload materials or maintain an operator at the target location until the task is completed, as depicted in FIG. 52. In some examples, and as depicted in FIG. 57, the drone 2004 further includes a camera to monitor the lift device 10 as the load on the implement assembly 16 is moved toward the target 2024.

Figure 53:
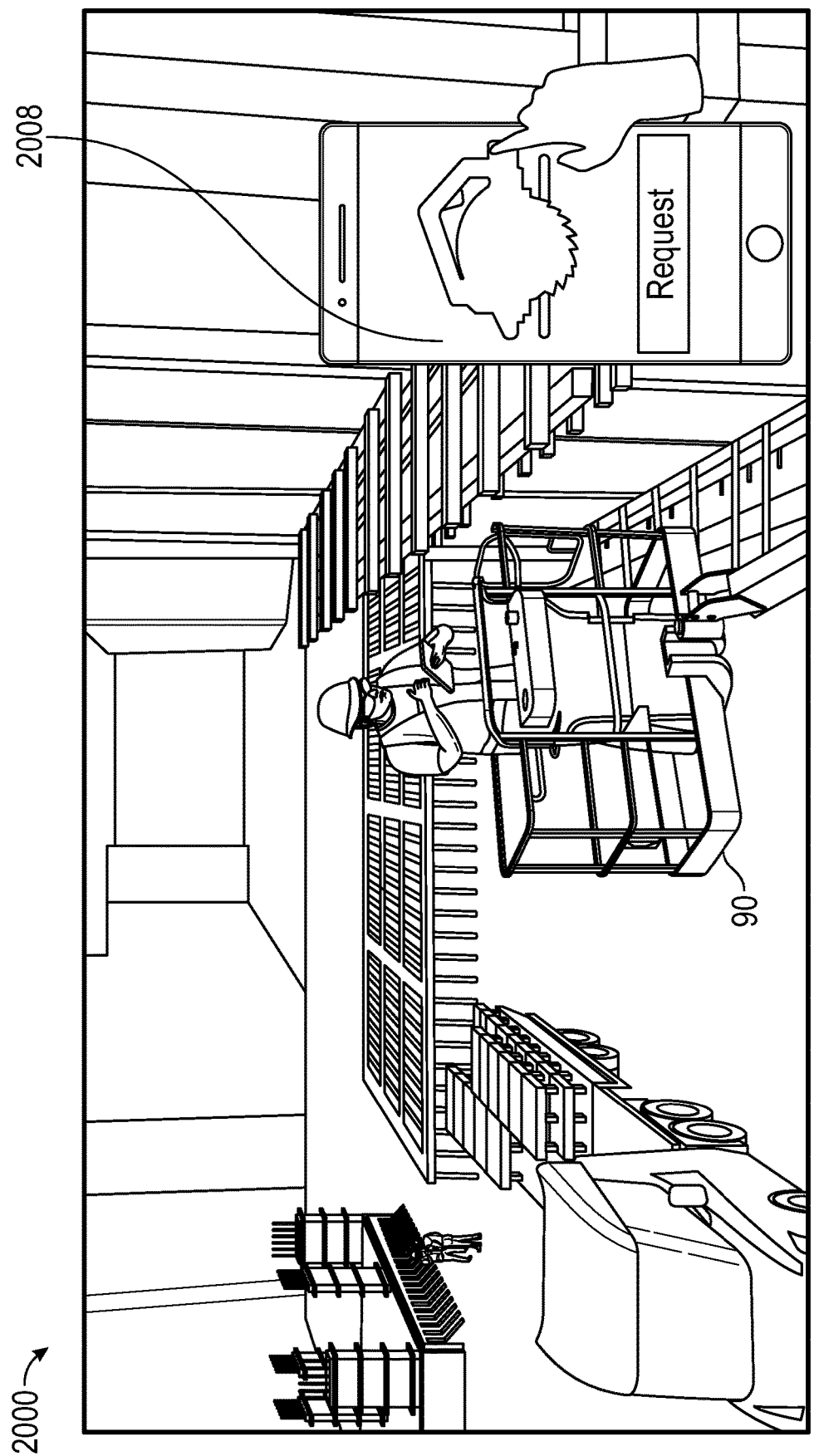
FIG. 53 is a pictorial view of an operator on a lift device, such as the lift device of FIG. 1 or 34, requesting tools through a drone delivery human machine interface, according to an exemplary embodiment.
Figure 54:
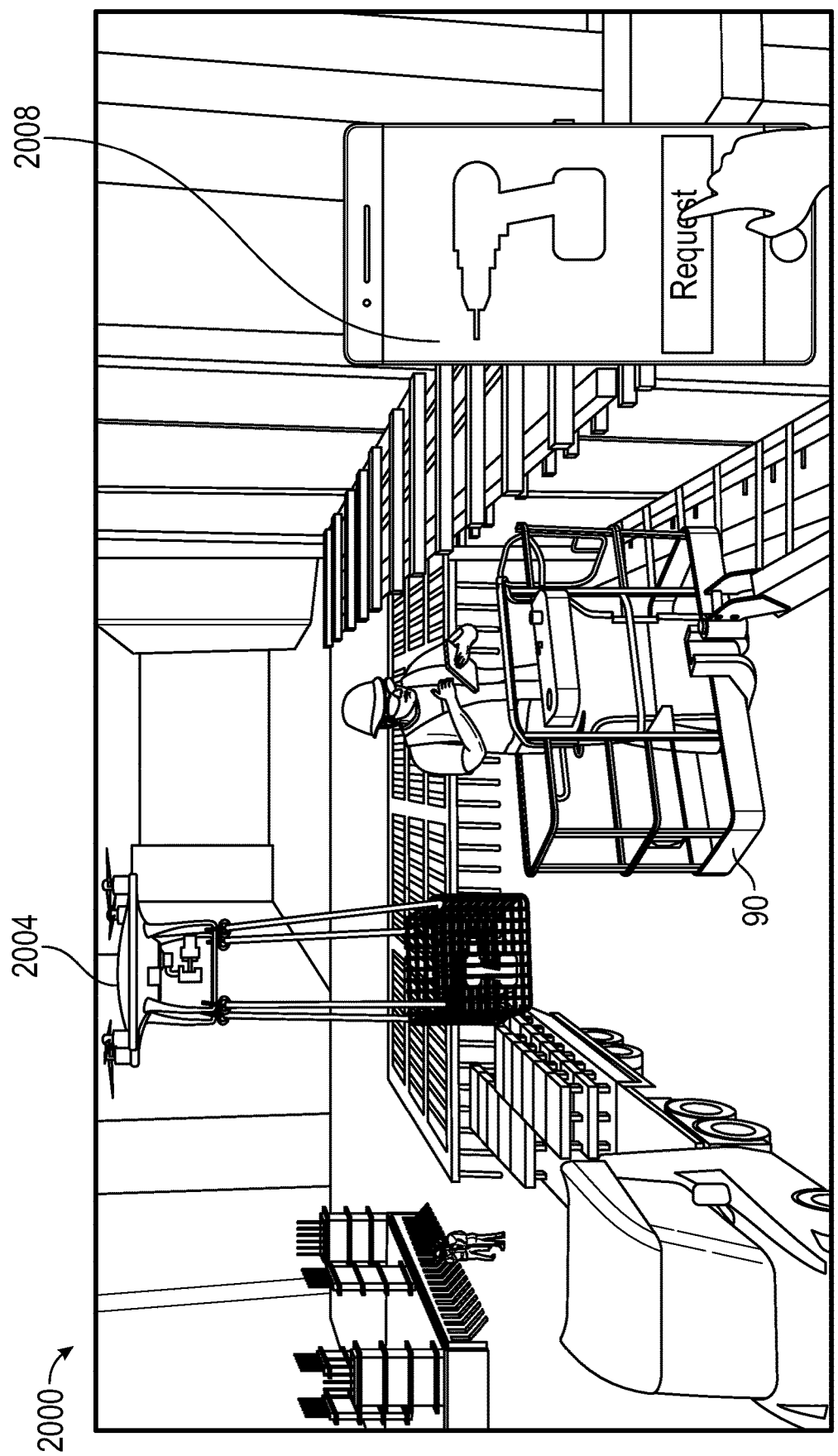
FIG. 54 is a pictorial view of the operator of FIG. 53 selecting a tool from the drone delivery interface and being delivered the selected tool by a drone, according to an exemplary embodiment.
Figure 55:
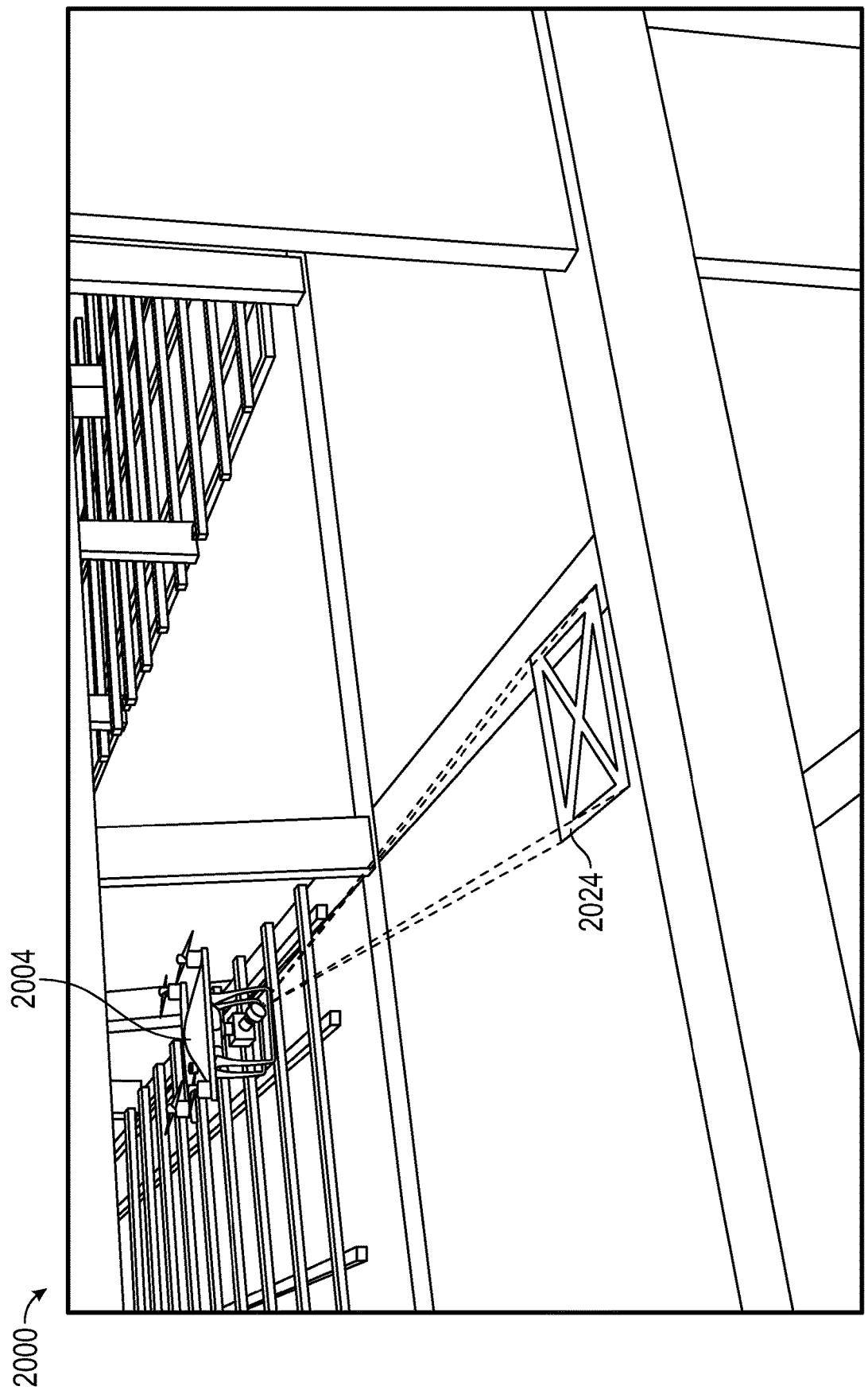
FIG. 55 is a pictorial view of a drone providing a target projection for a lift device to deliver materials to, according to an exemplary embodiment.
Figure 56:
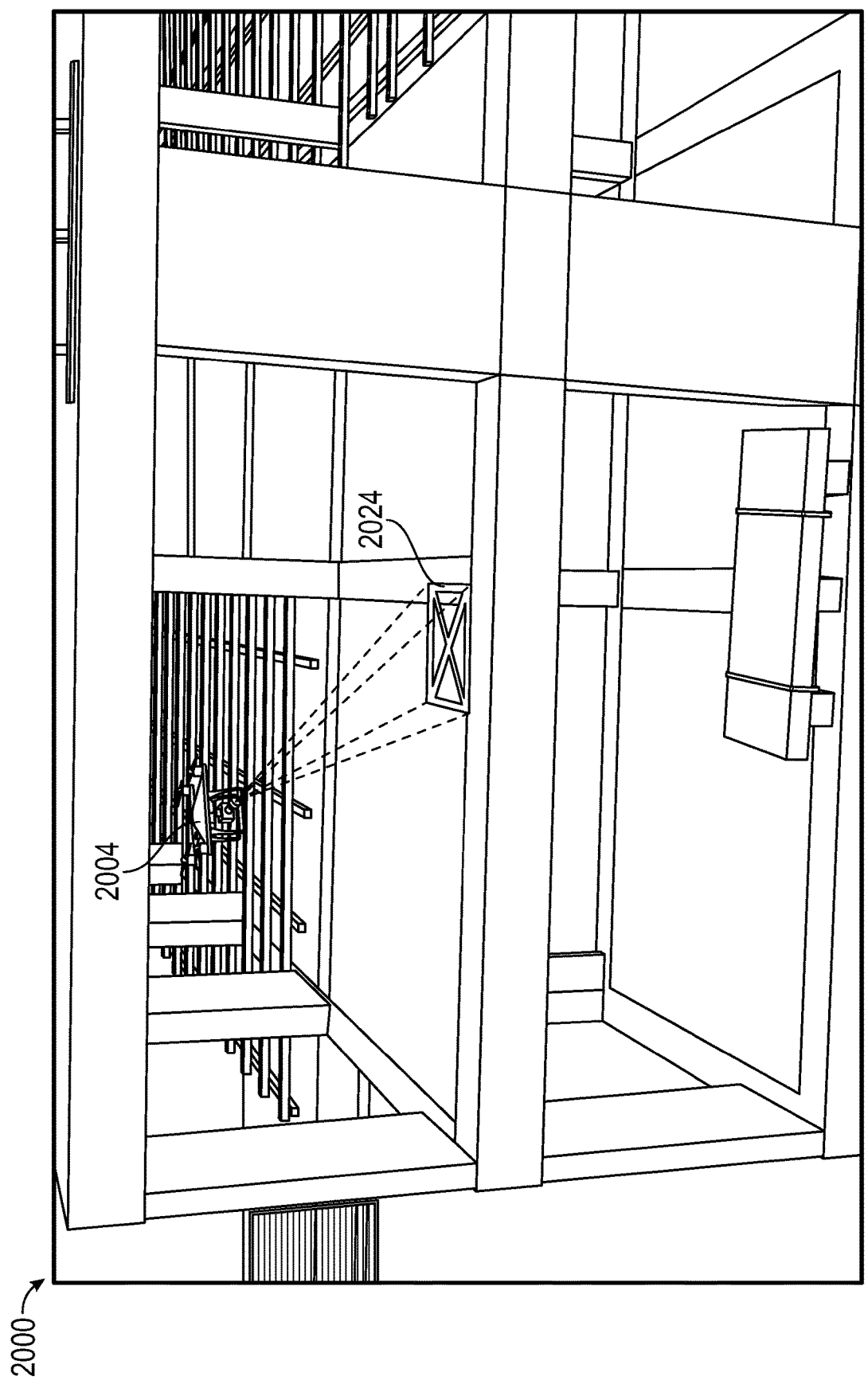
FIG. 56 is another pictorial view of the drone providing a target projection for a lift device, according to an exemplary embodiment.

With reference to FIGS. 53-54, the controller 2006 and/or drones 2004 can be used to execute tool or equipment delivery operations. Using a phone or other mobile device (e.g., the mobile device 2008), a worker on the lift device 10 or MEWP 2002 can select from a catalog of different tools that may be needed to perform a task while elevated on the work platform assembly 90. The worker can scroll through a library of different available tools, which can then be selected on the mobile device. Upon receiving a communication that one or more of the tools has been selected by the worker, the drone 2004 receives instructions (e.g., from the central controller 2006) to retrieve the selected tool and bring the selected tool to the worker at the location where the tool was requested.

Figure 58:
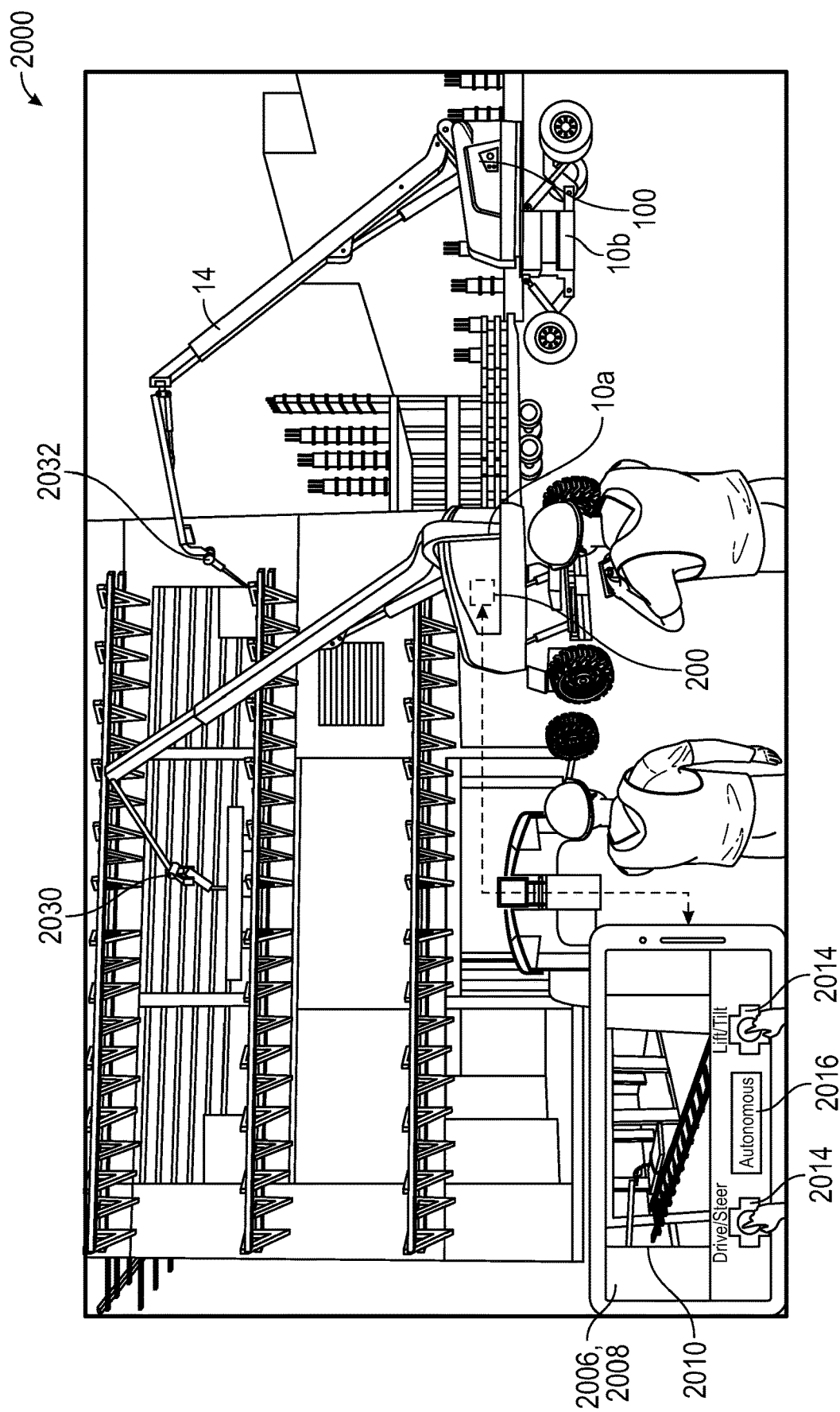
FIG. 58 is a pictorial view of an operator monitoring and remotely controlling the operation of a placing boom or a welding boom, according to an exemplary embodiment.
Figure 59:
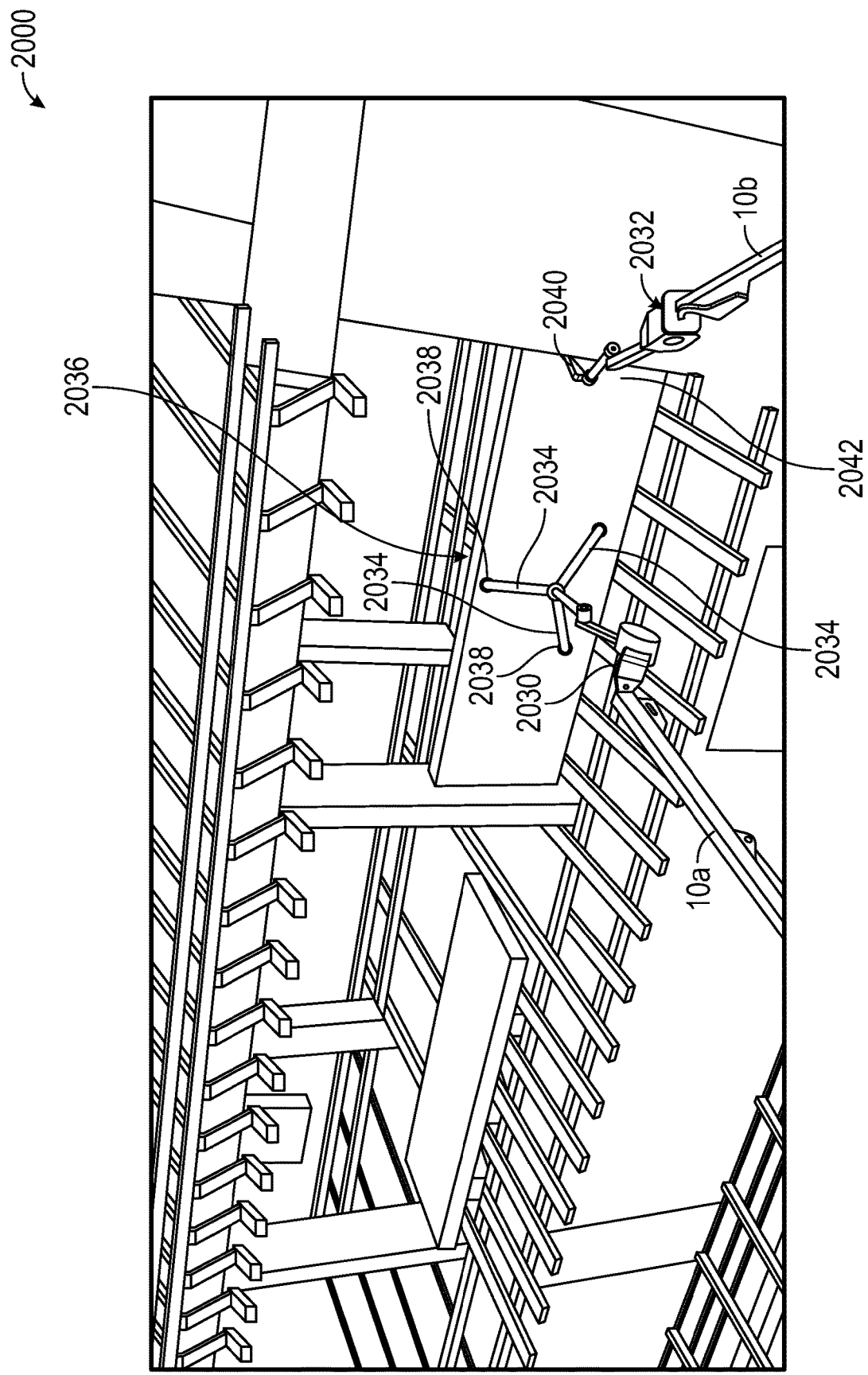
FIG. 59 is a pictorial view of the placing boom and the welding boom acting in concert to create a welded coupling in a structure, according to an exemplary embodiment.

Referring now to FIGS. 58-59, the lift device 10 is depicted with different robotic implement assemblies 2030, 2032 that can be used to perform a variety of different tasks at elevation. The robotic implement assemblies 2030, 2032 can include, among other things, one or more articulating fingers 2034 that can be manipulated to perform a variety of tasks, including positioning materials. The robotic implement assemblies 2030, 2032 have multi-axis positioning, which allows materials to be manipulated and positioned into desired locations, which can be particularly useful during construction processes. For example, a first lift device 10a can be used as a positioner while a second lift device 10b can be used as a welder. The positioner can include a three-fingered assembly 2036. The three-fingered assembly 2036 can include one or more material interfaces 2038 positioned at a distal end of each finger 2034. In some examples, the material interfaces 2038 are vacuum chambers that can create low pressure suction sufficient to selectively couple materials to the robotic implement assembly 2030. The suction force created can allow for the robotic implement assembly 2030 to raise and suspend heavy materials off the ground so that different tasks (e.g., welding, fastening, etc.) can be performed. Once the materials have been properly positioned and/or coupled to a desired location, the vacuum can be released, which decouples the robotic implement assembly 2030 from the material. Various other types of material interfaces 2038 can be used as well, including movable jaws that can grab and secure an item. In some examples, the fingers 2034 of the three fingered assembly 2036 are configured to extend and retract, which can allow the three-fingered assembly 2036 to accommodate objects of different sizes.

The robotic implement assembly 2032 is configured as a welder, and includes a welding stick 2040 positioned at its distal end. The implement assembly 2032 once again is configured with an articulating finger 2034 that is configured to move about multiple axes to perform a weld. In some examples, the implement assembly 2032 includes a self-contained weld wire supply that is fed through a supply tube 2042 within the implement assembly 2032. The position of the welding stick 2040 can be controlled by both the robotic implement assembly 2032 and the lift apparatus 14, simultaneously. In some examples, the controller 200 is configured to execute the welding operation. The robotic implement assemblies 2030, 2032 can be interchangeable, such that the first lift device 10a can also be a welder if a different robotic implement assembly 2032 is attached.

As depicted in FIG. 58, the lift devices 10a, 10b and implement assemblies 2030, 2032 can also be remotely controlled to perform various tasks. For example, using the mobile device 2008 (which can include the controller 2006), an operator can direct the one or more lift devices 10a, 10b without needing to be physically present within either lift device 10a, 10b. Cameras can be mounted to one or both of the implement assemblies 2030, 2032 to monitor and provide real-time feedback for the processes being performed by the implement assemblies 2030, 2032. If the lift devices 10a, 10b are in a fully autonomous mode, the mobile device 2008 can be used as a mechanism to monitor progress of the operations. The mobile device 2008 can be used to enter different parameters that can be performed by the robotic implement assemblies 2030, 2032. For example, the operator can enter a specific weld size call out that is to be performed automatically by the robotic implement assembly 2032. In some examples, the mobile device 2008 and controller 2006 generally can be used to control the robotic implement assemblies 2030, 2032 from the ground below. Using the GUI 2010 and virtual joysticks 2014, the operator can direct the robotic articulating fingers 2034 of each of the implement assemblies 2030, 2032 to perform different tasks (e.g., positioning, welding, etc.) at elevation. Using a camera feed and semi-autonomous or fully autonomous control, a worker can perform tasks that might otherwise be difficult to accomplish without leaving the ground below. In some examples, additional cameras mounted to the drones 2004 or other locations in the jobsite 2000 can be accessed by the mobile device 2008 to provide additional angles and views that can help the implement assemblies 2030, 2032 perform desired tasks. The GUI 2010 and/or mobile device 2008 communicates with and can provide partial or total control of these remote and autonomous, semi-autonomous, or automatic robotic implement assemblies 2030, 2032 so that tasks can be completed. Although described as a mobile device 2008, various tasks can also be assigned to or otherwise instructed by a central computer system present at the jobsite 2000 or communicably coupled to the various devices at the jobsite 2000 over the internet or other communication protocol. The robotic implement assemblies 2030, 2032 are configured to communicate with the controller 200 either wirelessly or through a wired connection established through the lift apparatus 14. In some examples, the robotic implement assemblies 2030, 2032 include wireless transceivers that are configured to receive commands from the controller 2006 through the controller 200, which can provide bi-directional data flow. Although shown as a position and a welder, various types of robotic implement assemblies 2030, 2032 can be used. For example, jackhammer attachments, nail-gun attachments, and the like can be used. In some examples, the robotic implement assembly can include or can be in communication with a pressurized water source and can be used to implement a window-washing process. In still other examples, the robotic implement assembly can be configured as a paint spray nozzle. In each example, the implement assemblies can be configured to operate automatically or autonomously, or can be configured to operate in accordance with control commands received from a remote controller 2006 (through the mobile device 2008, for example), which can at least partially eliminate the need to have a worker positioned at elevation to perform a task. In some examples, the robotic implement assemblies are configured with their own internal control systems, such that control commands issued by the controller 2006 are delivered directly to the robotic implement assemblies, rather than by way of the controller 200.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:
1. A lift device comprising:
   a lift apparatus configured to raise and lower an implement assembly; and
   a base assembly configured to support the lift apparatus, the base assembly comprising a deployable operator station transitionable between a deployed position and a stowed position;

wherein in the deployed position, the deployable operator station is configured to provide a seating and control arrangement for an operator;

wherein in the stowed position, the deployable operator station is substantially sealed from an external environment to limit access to the deployable operator station;

wherein the deployable operator station comprises:
 a first shell member pivotally coupled with the base assembly and configured to transition between a stowed orientation and a deployed orientation;
 a second shell member fixedly coupled with the base assembly;
 a third shell member pivotally coupled with the base assembly and configured to transition between a stowed orientation and a deployed orientation;
 a first frame assembly pivotally coupled with the base assembly at a first end, wherein the third shell member is fixedly coupled with the first frame assembly;
 a second frame assembly pivotally coupled with a second end of the first frame assembly;
 a seat pan pivotally coupled with the first frame assembly proximate the first end; and
 a pair of armrests each pivotally coupled with the first frame assembly proximate the first end.

2. The lift device of claim 1, wherein the deployable operator station comprises a plurality of shell members, wherein the shell members are configured to interlock with each other when the deployable operator station is transitioned into the stowed position.

3. The lift device of claim 1, wherein the deployable operator station is configured to transition from the stowed position to the deployed position by:
 the first shell member pivoting from the stowed orientation to the deployed orientation;
 the first frame assembly and the third shell member pivoting in unison from a stowed orientation to a deployed orientation;
 the second frame assembly pivoting relative to the first frame assembly to deploy; and
 the seat pan and the pair of armrests pivoting relative to the first frame assembly to deploy.

4. The lift device of claim 1, wherein the first frame assembly defines a rollover protective structure and the second frame assembly defines an overhead protective structure.

5. The lift device of claim 1, wherein the deployable operator station further comprises a linear electric actuator configured to automatically drive the first frame assembly to deploy.

6. The lift device of claim 1, wherein the deployable operator station further comprises a selective engagement mechanism, wherein the selective engagement mechanism is configured to limit relative rotation between the second frame assembly and the first frame assembly and allow relative rotation between the second frame assembly and the first frame assembly when a user presses a bar to selectively disengage the selective engagement mechanism.

* * * * *